INVENTOR.
GLENN T. McCLURE
WILLIAM K. MONG
BY
A. A. Steinmiller
ATTORNEY

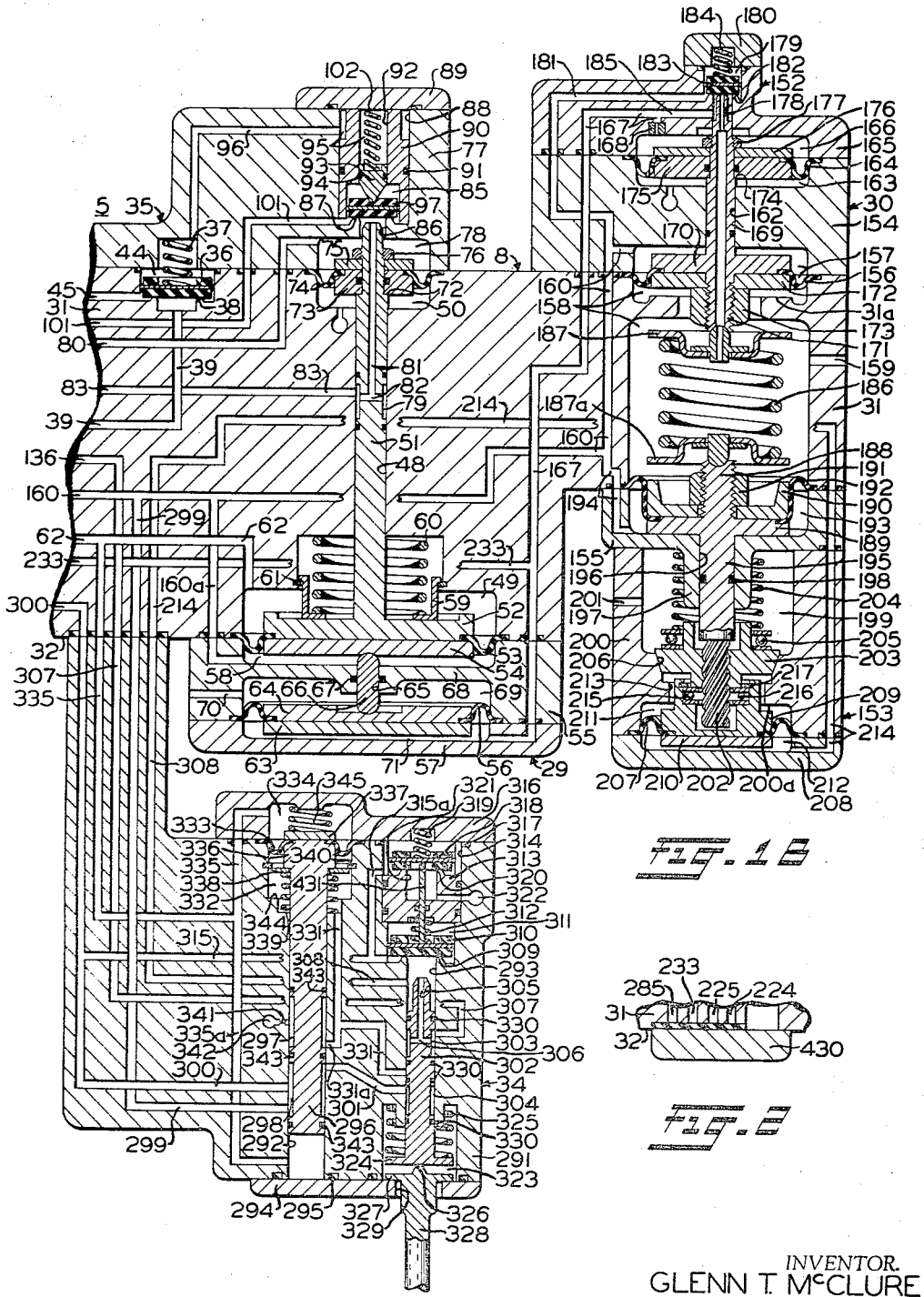

United States Patent Office 3,370,893
Patented Feb. 27, 1968

3,370,893
FLUID PRESSURE BRAKE CONTROL
APPARATUS
Glenn T. McClure, McKeesport, and William K. Mong, Irwin, Pa., assignors to Westinghouse Air Brake Company, Wilmerding, Pa., a corporation of Pennsylvania
Filed May 25, 1966, Ser. No. 552,966
19 Claims. (Cl. 303—36)

ABSTRACT OF THE DISCLOSURE

A fluid pressure operated railway car brake control apparatus having a brake-pipe-pressure controlled valve mechanism for supplying fluid under pressure from a control reservoir to one side of one of a pair of identical and coaxial movable abutments of a diaphragm stack of a service valve device to provide a constant force on the diaphragm stack notwithstanding a reduction in control reservoir pressure, as the result of leakage, effective on the corresponding side of the other abutment of the diaphragm stack.

---

Figure 1:
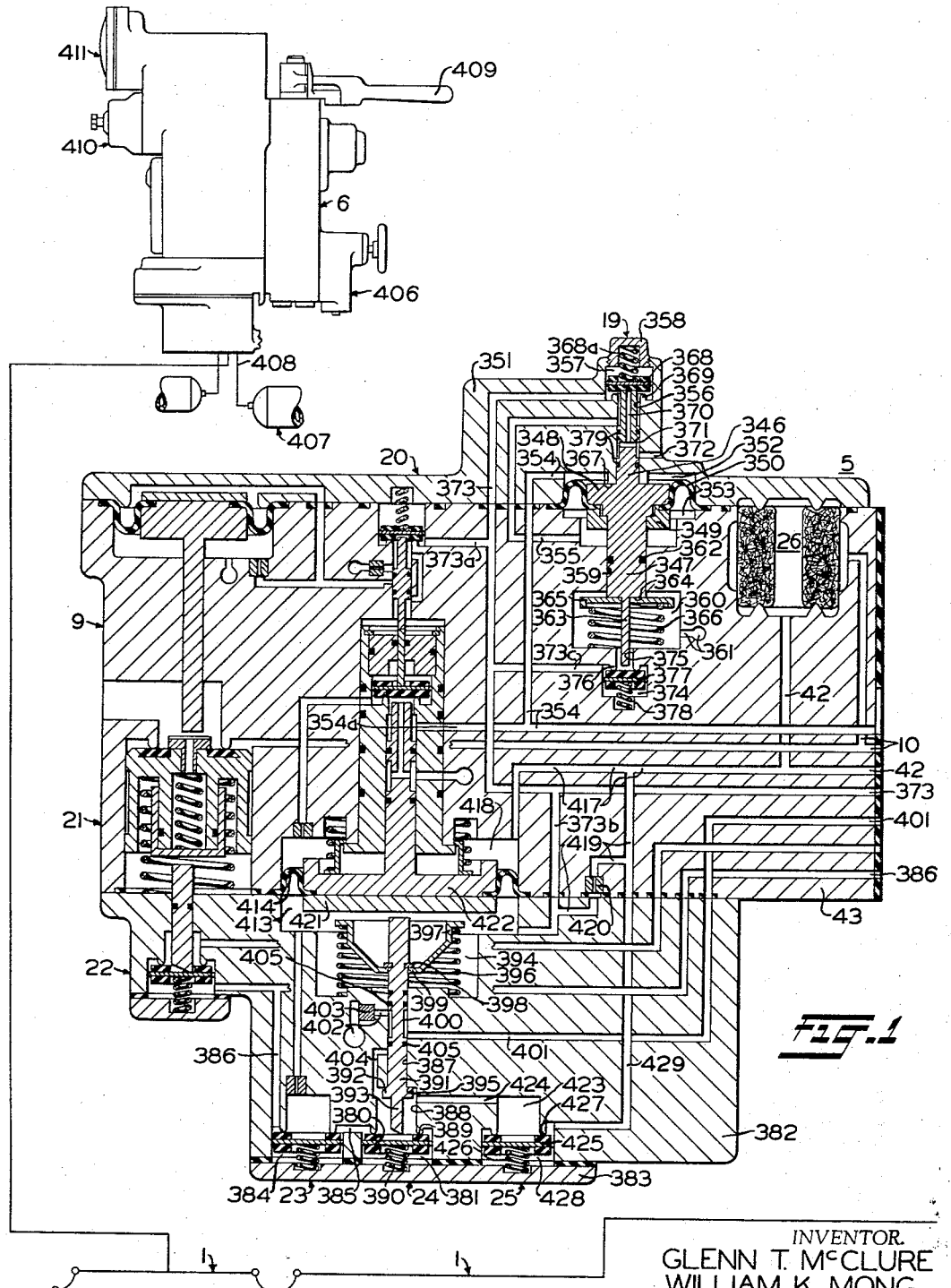

Present day freight cars are conventionally equipped with the familiar AB air brake control valve device, a direct release type of valve device, which operates responsively to initiation of a small increase in brake pipe pressure following a brake application to a brake release position, thus effecting promptly a complete release of the brakes on the train.

In United States Patent No. 3,208,801, issued Sept. 28, 1965, to Glenn T. McClure and assigned to the assignee of this application, there is disclosed and claimed a brake control valve device which may be converted readily from a direct release type valve device operable compatibly with cars equipped with direct release type control valve devices to a valve device of the graduated application and graduated release type suitable for use on either freight or passenger cars. This control valve device includes a service valve device operable to supply fluid under pressure to a brake cylinder device by a control reservoir pressure effective on one side of a removable abutment in response to a reduction in brake pipe pressure effective on the opposite side. However, since no means is provided to maintain a constant pressure in the control reservoir against undesirable leakage therefrom, such leakage will effect an undesired brake release.

It is the general purpose of this invention to provide an improved, inexpensive and lightweight railway car brake control valve device having a novel brake-pipe-pressure controlled valve mechanism for supplying fluid under pressure from a control reservoir to one side of one of a pair of identical and coaxial movable abutments of a diaphragm stack of a service valve device to provide a constant force on the diaphragm stack notwithstanding a reduction in control reservoir pressure, as the result of leakage, effective on the corresponding side of the other abutment of the diaphragm stack.

According to the present invention, this novel brake control valve device represents an improvement over the brake control valve device described in the aforementioned United States Patent No. 3,208,801 and includes both the above-mentioned brake-pipe-pressure controlled valve mechanism and a new and improved fluid pressure operated direct release valve mechanism that controls a communication between the control reservoir and a new and improved inshot valve device. This inshot valve device is operable when effecting a brake application, upon brake cylinder pressure reaching a chosen value, to cut off communication between the brake pipe and both the control reservoir and the brake-pipe-pressure controlled valve mechanism and vent the latter to atmosphere via the diaphragm chamber of an interlock valve device thereby rendering the brake-pipe-pressure controlled valve mechanism operable to supply fluid under pressure from the control reservoir to maintain the above-mentioned constant force on the diaphragm stack of the service valve device notwithstanding control reservoir leakage. This interlock valve device is interposed between the inshot valve device and the control reservoir and is operable to a cut-off position upon initiating an application of the brakes by fluid under pressure vented from the brake pipe in response to an initial quick service reduction in the pressure in the brake pipe without inhibiting further quick service activity. Furthermore, the inshot valve device is so constructed and interlocked with the fluid-pressure operated direct release valve mechanism that when the latter is operated, upon a slight increase in brake pipe pressure subsequent to a brake application, to open the above-mentioned communication from the control reservoir to the inshot valve device, fluid under pressure is supplied from the control reservoir to the inshot valve device via this communication to cause the inshot valve device to be quickly returned to its original position to effect the resupply of fluid under pressure from the brake pipe to the brake-pipe-pressure controlled valve mechanism and to the control reservoir.

More particularly, according to the present invention, the novel brake-pipe-pressure controlled valve mechanism of the brake control valve device constituting the present invention is essentially a "memory" in that it comprises a self-lapping valve device operable to supply fluid under pressure from the control reservoir to the one side of the one movable abutment of the aforementioned diaphragm stack of the service valve device to provide a constant force thereon in accordance with the normal fully charged control reservoir pressure at the time a brake application is initiated notwithstanding a subsequent reduction in control reservoir pressure as a result of leakage. This self-lapping valve device is provided with a control spring interposed between two movable abutments of equal effective area and subject on their respective sides opposite the control spring to control reservoir pressure. One of these movable abutments is operably connected to a third movable abutment, these abutments thereby constituting a diaphragm stack of this self-lapping valve device, and to a supply and an exhaust valve mechanism which is operated by these two abutments to control the supply of fluid under pressure to and from the one side of the one movable abutment of the aforementioned diaphragm stack of the service valve device. The other of these abutments is connected to a "fast travel" or "non-self-locking" type of screw having screw-threaded engagement with a nut of the same type that constitutes one element of a fluid pressure operated lock in the form of a two-element cone type clutch. This one element of the fluid pressure operated lock is movable into clutching contact with the other upon operation of the inshot valve device by brake cylinder pressure to vent fluid under pressure from the fluid pressure operated lock thereby preventing a reduction in the compression of the control spring of the self-lapping valve device as a result of a reduction in control reservoir pressure.

Furthermore, more particularly according to the present invention, the new and improved fluid pressure operated direct release valve mechanism embodied in the brake control valve device constituting the present invention comprises a supply and release valve mechanism for controlling flow of fluid under pressure from the control reservoir to the inshot valve device when effecting a direct release of the breaks. This supply and release valve mechanism is actuated by a diaphragm stack of the direct release valve mechanism through the intermediary of a novel double clutch device and a "fast travel" or "non-self-locking" type of nut and screw mechanism whereby the supply and release valve mechanism is opened upon initial movement of this diaphragm stack in one direction in response to a slight increase in brake pipe pressure and closed upon subsequent initial movement of this diaphragm stack in the opposite direction in response to a decrease in brake pipe pressure.

Figure 1A:
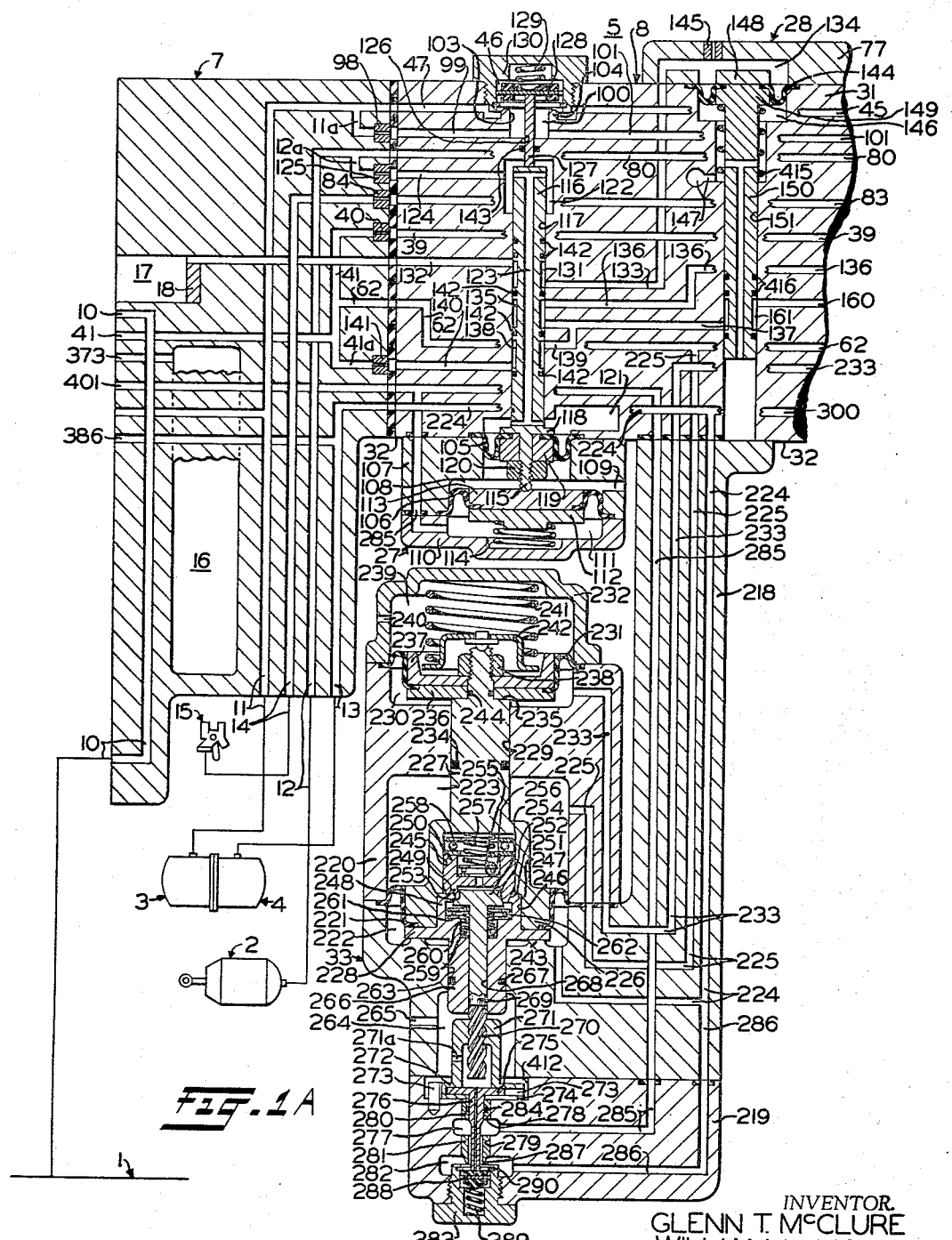

In the accompanying drawings:

FIG. 1, FIG. 1A and FIG. 1B, when taken together such that the right-hand edge of FIG. 1 is matched with the left-hand edge FIG. 1A, and the right-hand edge of FIG. 1A is matched with the left-hand edge of FIG. 1B, constitute a diagrammatic view of a railway train fluid pressure brake system embodying the invention and comprising an engineer's brake valve device of known construction connected by the usual brake pipe to a novel direct release type of railway car fluid pressure operated brake control valve device.

FIG. 2 is a partial cross-sectional view showing a fragment of the fluid pressure operated brake control valve device shown in FIGS. 1, 1A and 1B with the direct release mechanism removed and replaced by a cover plate or blanking pad.

DESCRIPTION

Referring to the drawings, the railway train fluid pressure brake system embodying the invention comprises a brake pipe 1 that extends from the locomotive back through each car in the train on each of which cars is provided a brake cylinder device 2, an auxiliary reservoir 3, a control reservoir 4, and a car brake control valve device 5 connected to the brake pipe 1, the brake cylinder device 2, the auxiliary reservoir 3, and the control reservoir 4 on the respective car, and an engineer's brake valve device 6 located on the locomotive and connected to the brake pipe 1 extending from car to car through the train for controlling the pressure therein.

The brake control valve device 5 shown in FIGS. 1, 1A and 1B comprises a pipe bracket portion 7 to the opposite faces of which is secured in sealed relation therewith, a service application valve portion 8 and an emergency portion 9, respectively.

The pipe bracket portion 7 is provided with passageways 10, 11, 12, 13 and 14 therein, which passageways are connected respectively by corresponding pipes bearing the same numerals to the brake pipe 1, the auxiliary reservoir 3, the brake cylinder device 2, the control reservoir 4, and to atmosphere or to a retaining valve device 15. Formed in the lower portion of the pipe bracket 7 and open to the left-hand face thereof through a passageway therein, as viewed in FIG. 1A, is a quick action chamber 16 for storing fluid under pressure supplied thereto from the brake pipe 1 through the emergency application portion 9 in a manner hereinafter described in detail. Formed in the pipe bracket portion 7 and opening to the left-hand face thereof is a quick service volume 17 to which fluid under pressure is supplied from the brake pipe 1 by operation of a hereinafter-mentioned quick service and emergency pilot valve device. The capacity of the quick service volume 17 can be varied in accordance with the length of the brake pipe 1 on the car by the insertion of a plug 18, the thickness of which corresponds to the length of the brake pipe 1 on the particular car.

The emergency application portion 9 comprises a continual quick service valve device 19, a quick service and emergency pilot valve device 20, a vent valve device 21, a high pressure valve device 22, a spill-over check valve device 23, a back-dump check valve device 24, a backflow check valve device 25 and a brake pipe strainer device 26. The quick service and emergency pilot valve device 20, the vent valve device 21, the high pressure valve device 22, the spill-over check valve device 23, the backflow check valve device 25 and the brake pipe strainer device 16 are substantially the same in construction and operation as the corresponding devices of the emergency application valve portion 8 of the car brake control valve device 5 shown in the hereinbefore-mentioned Patent No. 3,208,801. Accordingly, a detailed description of these devices is believed to be unnecessary.

The service application valve portion 8 comprises an inshot valve device 27 (FIG. 1A), an interlock valve device 28, a service valve device 29 (FIG. 1B) and a brake pipe pressure controlled valve mechanism 30 which is essentially a "memory" in that it is operable to provide, by means of fluid under pressure supplied from the control reservoir 4, a constant force on a diaphragm stack of the service valve device 29 in accordance with the pressure present in the control reservoir 4 at the time that a service brake application is initiated notwithstanding a subsequent reduction in control reservoir pressure as a result of leakage therefrom.

These four valve devices are embodied in a common casing section 31 provided on its lower side with a bolting face 32. Secured respectively in spaced-apart relation on the bolting face 32 of the casing section 31 by any suitable means (not shown) is a direct release valve mechanism 33 (FIG. 1A) and a manually operated brake cylinder release valve device 34 (FIG. 1B) which also includes manual release means for effecting a manual release of fluid under pressure from the control reservoir 4 to atmosphere as will be hereinafter explained in detail.

The service application valve portion 8 is further provided with an auxiliary reservoir charging check valve device 35 (FIG. 1B) through which the auxiliary reservoir 3 is charged with fluid under pressure from the brake pipe 1. The auxiliary reservoir charging check valve device 35 comprises a flat disc-type valve 36 that is urged by a light biasing spring 37 into seating contact with an annular valve seat 38 formed adjacent one end of a passageway 39 in the casing section 31, the opposite end of which passageway 39 is connected through an auxiliary charging choke 40 (FIG. 1A) to a first branch of a passageway 41 in the pipe bracket portion 7. The passageway 41 extends through the pipe bracket portion 7 and at its left-hand end is connected to a passageway 42 (FIG. 1) in a casing section 43. Upon brake pipe pressure in the passageway 39 (FIG. 1B) building up sufficiently to overcome the biasing force of the spring 37, the flat disc-type valve 36 is moved against the yielding resistance of the spring 37 away from the valve seat 38 to permit a one-way flow of fluid under pressure from the passageway 39 to an outlet chamber 44. The chamber 44 is in constant communication with the auxiliary reservoir 3 by way of a passageway 45 and a chamber 46 (FIG. 1A) in the casing section 31, and a passageway 47 extending from the chamber 46 through the casing section 31 and communicating with the passageway 11 in the pipe bracket portion 7 which passageway 11 is connected by a correspondingly numbered pipe to the auxiliary reservoir 3.

During the initial charging of the auxiliary reservoir 3 and during the charging of this reservoir after a brake application, whenever the pressure of fluid in the brake pipe 1 exceeds the pressure of fluid in the auxiliary reservoir 3 by an amount in excess of the biasing force of the spring 37 (FIG. 1B), the valve 36 will be unseated from the valve seat 38 against the yielding resistance of the spring 37 whereupon fluid under pressure will flow from the brake pipe 1 to the auxiliary reservoir 3 via pipe and passageway 10 (FIG. 1A), brake pipe strainer 26 (FIG. 1), passageway 42, passageway 41 (FIG. 1A), auxiliary reservoir charging choke 40, passageway 39, past the unseated valve 36 (FIG. 1B) to the chamber 44 and then through the passageway 45, chamber 46 (FIG. 1A) passageway 47, and passageway and corresponding to pipe 11 until the auxiliary reservoir 3 is charged to substantially the pressure normally carried in the brake pipe 1.

The service valve device 29 (FIG. 1B) serves to control the supply of fluid under pressure from the auxiliary reservoir 3 to the brake cylinder device 2, when a brake application is effected, and from the brake cylinder to atmosphere upon effecting a release of the brakes, and is constructed to be responsive to variations in brake pipe pressure to be movable to a service position, a lap position, and a brake release position.

The casing section 31 is provided with a bore 48 which opens at one end into a chamber 49 adjacent the end of the casing section 31 upon which the bolting face 32 is formed and opens at the other end into an atmospheric chamber 50 in the casing section 31 at the opposite end thereof. Slidably mounted in the bore 48 is a valve stem 51 which has formed integral therewith at the end thereof that extends into the chamber 49 a diaphragm follower 52. The inner periphery of a first diaphragm 53 of a diaphragm stack is clamped between the diaphragm follower 52 and a diaphragm follower plate 54 by any suitable means (not shown) provided for securing this plate to the follower 52. The outer periphery of the diaphragm 53 is clamped between the bolting face 32 of the casing section 31 and one side of a second casing section 55 that is secured to the casing section 31 by any suitable means (not shown). The outer periphery of a second diaphragm 56 of the diaphragm stack is clamped between the other side of the second casing section 55 and a cover 57 which is secured to the casing section 55 by any suitable means (not shown).

The diaphragm 53 cooperates with the casing sections 31 and 55 to form within the service valve device 29 and on opposite sides of the diaphragm the chamber 49 and a chamber 58. Disposed within the chamber 49 between the casing section 31 and a hollow spring seat 59, and in surrounding relation to the valve stem 51, is a spring 60 for biasing an inturned flange on the spring seat 59 against the diaphragm follower 52 and an out-turned flange on this spring seat against a snap ring 61 that is inserted in a groove formed in the casing section 31. The spring 60 is thus effective to normally bias the valve stem 51 and the diaphragm 53 downward to the position shown in FIG. 1B. The chamber 49 above the diaphragm 53 is connected by a passageway 62 formed in the casing section 31 and pipe bracket 7 to the passageway 41 in the pipe bracket so that the chamber 49 is charged with fluid under pressure from the brake pipe 1 via pipe and passageway 10 (FIG. 1A), strainer 26 (FIG. 1), and passageways 42, 41 (FIG. 1A) and 62. The chamber 58 below the diaphragm 53 is connected to the control reservoir 4 via the brake cylinder release valve device 34 in a manner hereinafter explained.

The inner periphery of the second diaphragm 56 of the diaphragm stack is clamped between two diaphragm followers 63 and 64 that are secured together by any suitable means (not shown). The second casing section 55 is provided with a bore 65 in which is slidably disposed a stem 66 that is interposed between the diaphragm follower plate 54 and the diaphragm follower 64 to provide an impositive connection therebetween. An O-ring 67 disposed in a groove formed in a wall 68 of the second casing section 55 encircles the stem 66 in sealing and sliding relation to prevent flow of fluid under pressure from the chamber 58 to a chamber 69 above the diaphragm 56 and open to atmosphere via a short passageway 70 in the casing section 55.

The diaphragm 56 cooperates with the casing section 55 and cover 57 to form within the service valve device 29 and on the opposite sides of the diaphragm 56 the chamber 69 and a chamber 71 to which fluid under pressure is supplied by operation of the valve mechanism 30 in a manner hereinafter described in detail.

The end of the stem 51 that extends into the chamber 50 is provided with a portion of reduced diameter to form a shoulder 72 on the stem against which shoulder rests an annular diaphragm follower 73. The diaphragm follower 73 is operatively connected to the center of a diaphragm 74 by means such as an annular diaphragm follower plate 75 through which the stem 51 extends and nut 76 having screw-threaded engagement with a screw-threaded portion of the stem 51. The outer periphery of the diaphragm 74 is clamped between the upper side of the casing section 31 and a third casing section 77 of the service valve device 29 which casing section 77 is secured to the casing section 31 by any suitable means (not shown).

The diaphragm 74 cooperates with the casing sections 31 and 77 to form within the service valve device 29 and on the opposite sides of the diaphragm the hereinbefore mentioned chamber 50 and a chamber 78.

The valve stem 51 has formed thereon intermediate its ends a peripheral annular groove 79 which, as shown in FIG. 1B illustrating the relative position of the parts of the service valve device 29 in the brake release position, is so located and arranged that the brake cylinder device 2 (FIG. 1A) is open to atmosphere via the pipe and corresponding passageway 12 in the pipe bracket portion 7 and a passageway 80 extending through the casing sections 31 and 77 and opening into the chamber 78 (FIG. 1B) which in turn is connected through a passageway 81 extending from the upper end of the valve stem 51 longitudinally therethrough to the location therein of a passageway 82 extending crosswise of the stem 51 and opening at each end to the peripheral surface of the groove 79, thence via a passageway 83 in the casing section 31, a brake cylinder exhaust control choke 84 (FIG. 1A) in the pipe bracket 7 and the passageway and corresponding pipe 14 which is connected, as hereinbefore stated, to the hereinbefore-mentioned retaining valve device 15 which it may be assumed is in a position to open the pipe 14 to atmosphere.

The chamber 78 (FIG. 1B) is connected to a chamber 85 formed in the casing section 77 by a bore 86 at the upper end of which is formed an annular valve seat 87. The casing section 77 is provided with a counterbore 88 that is coaxial with the bore 86 and annular valve seat 87 and coextensive with the chamber 85. Disposed in the counterbore 88, the outer end of which is closed by a cover 89 secured to the casing section 77 by any suitable means (not shown), is a bushing 90 having a groove formed in the periphery thereof, in which groove is carried an O-ring 91 to prevent leakage of fluid under pressure along the bore 88 between the bushing 90 and the wall of the bore 88 in the casing section 77. The bushing 90 is provided with a bore 92 in which is slidably mounted a piston 93 that is provided with a peripheral annular groove in which is disposed an O-ring 94 to prevent leakage of fluid under pressure from the chambers 85 below the piston 93 to a chamber 95 above the piston 93, which chamber 95 is connected by a passageway 96 in the casing section 77 to the outlet chamber 44 of the auxiliary reservoir charging check valve device 35 in order that fluid under pressure supplied from the brake pipe 1 to the auxiliary reservoir 3 past the check valve 36 may flow to the chamber 95 and act on top of the piston 93 to balance pressure acting on a flat disc-type valve 97 disposed in the chamber 85 when this valve is unseated from the valve seat 87 since the chamber 85 is constantly supplied with fluid under pressure from the auxiliary reservoir 3 via the pipe and corresponding passageway 11 and a branch 11a thereof, a service choke 98 carried by the pipe bracket portion 7, a passageway 99 in the casing section 31 extending from the service choke 98 to a chamber 100 which chamber is connected by another passageway 101 extending through the casing sections 31 and 77 to the chamber 85. A spring 102 is interposed between the cover 89 and the upper side of the piston 93 to bias this piston and the valve 97 downward so that the valve 97 is moved into contact with the valve seat 87 except when unseated therefrom in a manner hereinafter described in detail.

The chamber 100 (FIG. 1A) is connected to the chamber 46 by a bore 103 at the upper end of which is formed a valve seat 104 that constitutes a part of the hereinbefore-mentioned inshot valve device 27 which will now be described.

The inshot valve device 27 further comprises a diaphragm stack consisting of two coaxial and oppositely arranged spaced apart diaphragms 105 and 106 of unequal effective area. The outer periphery of the smaller diaphragm 105 is clamped between the bolting face 32 on the lower side of the casing section 31 and the upper side of a fourth casing section 107 secured thereto by any suitable means (not shown). This casing section 107 cooperates with the two diaphragms 105 and 106 to form therebetween a chamber 108 that is open to atmosphere via a short passageway 109 in this casing section. The outer periphery of the larger diaphragm 106 is clamped between the lower side of the fourth casing section 107 and a cover 110 secured thereto by any suitable means (not shown). The cover 110 and the diaphragm 106 cooperate to form on the lower side of the diaphragm a chamber 111 to which fluid under pressure is supplied in a manner hereinafter described in detail. The inner periphery of the diaphragm 106 is clamped between two diaphragm followers 112 and 113 by any suitable means (not shown).

Disposed in the chamber 111 and interposed between the cover 110 and follower 112 is a spring 114 that is effective to bias the follower 113 against the lower end of a screw-threaded stem 115 formed at the lower end of a spool-type inshot valve 116 that is slidably disposed in a bore 117 provided in the casing section 31. Formed integral with the inshot valve 116 adjacent the upper end of the stem 115 is a diaphragm follower 118 against which the inner periphery of the smaller diaphragm 105 is clamped by a diaphragm follower plate 119 and a nut 120 that has screw-threaded engagement with the screw-threaded stem 115.

The smaller diaphragm 105 cooperates with the casing section 31 to form on the upper side of the diaphragm a chamber 121 between which and a chamber 122 formed in the casing section 31 the above-mentioned bore 117 extends. The chamber 121 is in constant communication with the chamber 122 via a passageway 123 that extends substantially longitudinally through the inshot valve 116 and at its respective opposite ends extends crosswise so as to open into these chambers. The chamber 122 is connected to the brake cylinder passageway and pipe 12 via a passageway 124 in the casing section 31, a choke 125 carried in the pipe bracket portion 7 and a branch passageway 12a also in the pipe bracket portion.

The chambers 122 and 100 in the casing section 31 are connected by a bore 126 therein which bore is coaxial with the bore 117. A stem 127 is slidably mounted in the bore 126 and is interposed between the upper end of the inshot valve 116 and the lower side of a flat disc-type valve 128 disposed in the chamber 46. A spring 129 also disposed in the chamber 46 is interposed between the upper side of the valve 128 and a screw-threaded plug 130 that has screw-threaded engagement with a screw-threaded bore in the casing section 31 to close the open end of the chamber 46.

The spring 129 is weaker than the spring 114. Consequently, the spring 114 is normally effective via the diaphragm followers 112 and 113 and the stem 115 to maintain the inshot valve 116, stem 127 and valve 128 in the position shown in FIG. 1A in which position the stem 127 is effective to maintain the valve 128 unseated from the valve seat 104 against the biasing force of the spring 129.

Also, while the inshot valve 116 is maintained in the position shown in FIG. 1A by the spring 114, a first elongated peripheral annular groove 131 thereon is effective to establish a communication between that end of a passageway 132 that opens at the wall surface of the bore 117 and that end of a passageway 133 that also opens at the wall surface of the bore 117 below the opening of the passageway 132 at this wall surface a distance equal to the length of this groove 131. The opposite end of the passageway 132 opens into the quick service volume 17 and the opposite end of the passageway 133 opens into a chamber 134 in the interlock valve device 28 which will be hereinafter described in detail.

Furthermore, while the inshot valve 116 occupies the position in which it is shown in FIG. 1A of the drawings, a second elongated peripheral annular groove 135 thereon is effective to establish a communication between that end of a first pair of passageways 136 and 137 that at one end open respectively one above the other at the wall surface of the bore 117 below the opening of the passageway 133 at this wall surface.

The passageway 136 extends through the casing section 31 and at its other end opens at the surface of the bolting face 32 (FIG. 1B) on the lower side of this casing section where it registers with a corresponding passageway hereinafter described in detail in the brake cylinder release valve device 34. The passageway 137 (FIG. 1A) extends through the casing section 31 and is connected to the interlock valve device 28 in a manner hereinafter described.

Moreover, while the inshot valve 116 occupies the position in which it is shown in FIG. 1A, a third elongated peripheral annular groove 138 thereon is effective to establish a communication between that end of a second pair of passageways 139 and 140 that at one end open respectively one above the other at the wall surface of the bore 117 below the opening of the passageway 137 at this wall surface.

The passageway 139 extends through the casing section 31 and is connected to the passageway 137 intermediate the ends thereof. The passageway 140 extends through the casing section 31 to one end of a choke 141 carried in the pipe bracket portion 7. The opposite end of the choke 141 is connected by a branch 41a to the passageway 41 in the pipe bracket portion 7.

In order to prevent leakage of fluid under pressure along the bore 117 from one of the elongated peripheral annular grooves on the inshot valve 116 to another, from the upper and lower end of these grooves to the respective chambers 122 and 121, and from one to another of the passageways opening at the wall surface of the bore 117, the inshot valve 116 is provided with five spaced-apart peripheral annular grooves in each of which is carried an O-ring 142 that forms a seal with the wall surface of the bore 117. Furthermore, in order to prevent leakage of fluid under pressure between the chambers 100 and 122, the wall of the bore 126 is provided with an internal annular groove in which is disposed an O-ring 143 that surrounds the stem 127 and forms a seal therewith.

The hereinbefore-mentioned interlock valve device 28 comprises a diaphragm 144, the outer periphery of which is clamped between the casing sections 31 and 77 to form on the opposite sides of this diaphragm the hereinbefore-mentioned chamber 134 that is open to atmosphere via a choke 145 carried by the casing section 77, and a chamber 146 that is also open to atmosphere via a passageway and port 147 in the casing section 31. The inner periphery of the diaphragm 144 is secured by any suitable means (not shown) between a diaphragm follower plate 148 and a diaphragm follower 149 formed integral with the upper end of an interlock valve 150 that is slidably mounted in a bore 151 formed in the casing section 31. The construction and operation of the interlock valve 150 is substantially identical to that of the corresponding interlock valve stem of the interlock valve device of the service application portion 7 of the car brake control valve device 5 shown in the hereinbefore-mentioned Patent No. 3,208,-801. Accordingly, further description of the interlock valve device 28 is believed to be unnecessary.

The brake pipe pressure controlled valve mechanism 30 (FIG. 1B), as hereinbefore-mentioned, is essentially a "memory" and comprises a self-lapping valve device 152 and a locking mechanism 153.

The self-lapping valve device 152 serves to automatically control the supply of fluid under pressure from the control reservoir 4, as the pressure therein and in the chamber 58 in the service valve device 29 is reduced as the result of leakage therefrom, to the chamber 71 below the diaphragm 56 of the aforementioned diaphragm stack of the service valve device 29 to maintain a constant force on this diaphragm stack which also includes the diaphragm 53.

The self-lapping valve device 152 comprises a sectionalized casing which includes a portion of the hereinbefore-mentioned casing section 31 and two other casing sections 154 and 155. The valve device 152 further comprises a diaphragm stack that includes a first diaphragm 156 the outer periphery of which is clamped between the upper side of the casing section 31 and the lower side of the casing section 154 which is secured to the casing section 31 by any suitable means (not shown).

The diaphragm 156 cooperates with the casing sections 154 and 31 to form within the self-lapping valve device 152 and on opposite sides of the diaphragm two chambers 157 and 158 the latter being constantly open to atmosphere via a passageway 159 in the casing section 31. Opening into the chamber 157 is one end of a passageway 160 that extends through the casing sections 154 and 31 and opens at its opposite end at the wall surface of the hereinbefore-mentioned bore 151 (FIG. 1A) above the location at which the other end of the hereinbefore-mentioned passageway 137 opens at the wall surface of this bore 151. The passageway 160 has a branch 160a (FIG. 1B) that extends through the casing sections 31 and 55 and opens into the hereinbefore-mentioned chamber 58. The interlock valve 150 (FIG. 1A), which is slidably mounted in the bore 151, as aforestated, is provided with an elongated peripheral annular groove 161 thereon which, while the interlock valve 150 occupies the position in which it is shown in FIG. 1A, establishes a communication between the passageways 137 and 160 in order that fluid under pressure may flow from the brake pipe 1 to the chamber 157 and the control reservoir 4 in a manner hereinafter described in detail.

The casing section 154 (FIG. 1B) is provided with a bore 162 which opens at one end into the chamber 157 and at the other into an atmospheric chamber 163 formed by the cooperative relationship between the casing section 154 and a diaphragm 164 the outer periphery of which is clamped between the casing section 154 and a cover member 165 that is secured to the casing section 154 by any suitable means (not shown). The cover member 165 cooperates with the diaphragm 164 to form a chamber 166 above this diaphragm which chamber 166 is connected to the chamber 71 below the diaphragm 56 of the service valve device 29 via a passageway 167 extending through the cover member 165, casing sections 154, 31 and 55, and cover 57. The passageway 167 has therein at the end thereof opening into the chamber 166 a choke 168.

The diaphragms 156 and 164 are connected together to form the diaphragm stack of the self-lapping valve device 152 by means of a hollow cylindrical stem 169 that is slidably mounted in the bore 162 and extends into the chambers 157 and 163.

That portion of the stem 169 extending into the chamber 157 has formed integral therewith a diaphragm follower 170 from which extends a hollow screw-threaded stem 171 that passes through a smooth bore in a diaphragm follower plate 172 and receives a nut 173 which is effective to cause the plate 172 to clamp the inner periphery of the diaphragm 156 between this plate and the diaphragm follower 170.

That portion of the stem 169 extending into the chamber 163 is provided with a shoulder 174 against which rests a second annular diaphragm follower 175 between which a second diaphragm follower plate 176, the inner periphery of the diaphragm 164 is clamped by means of a second nut 177 that has screw-threaded engagement with corresponding external screw-threads formed on a portion of the stem 169 extending above the plate 176 and into a bore 178 formed in the cover member 165.

The bore 178 connects the chamber 166 to a supply valve chamber 179 formed in the upper end of the cover member 165 and closed by a cap member 180 secured to the cover member 165 by any suitable means (not shown). A passageway 181 extending through the cover member 165 and casing section 154 connects the supply valve chamber 179 to the hereinbefore-mentioned passageway 160 which is connected to the control reservoir 4 in a manner hereinafter described in detail.

Formed at the upper end of the bore 178 is an annular valve seat 182 against which a flat disc-type valve 183 disposed in the supply valve chamber 179 is normally biased by a spring 184 that is interposed between this valve 183 and the cap member 180. While so seated, the valve 183 cuts off communication between the supply valve chamber 179 and the interior of the bore 178 at the wall surface of which opens one end of a short passageway 185 that extends through the cover member 165 and at its other end is connected to the passageway 167 in this cover member.

Included in the self-lapping valve device 152 is a control spring 186 that is disposed in the atmospheric chamber 158 and interposed between two oppositely arranged spring seats 187 and 187a. As shown in FIG. 1B, the spring seat 187 which is hollow rests against the lower end of the hollow screw-threaded stem 171 and the spring seat 187a rests against the upper end of a screw-threaded stem 188 that is formed integral with a diaphragm follower 189. Screw-threaded stem 188 extends through a smooth bore in a diaphragm follower plate 190 and receives a nut 191 which is effective to cause the plate 190 to clamp the inner periphery of a long-travel type of diaphragm 192 between this plate and the diaphragm follower 189.

The outer periphery of the diaphragm 192 is clamped between the lower side of the casing section 31 and the upper side of the casing section 155 which is secured thereto by any suitable means (not shown).

The diaphragm 192 cooperates with the casing section 31 and diaphragm 156 to form on the upper side of the diaphragm 192 the atmospheric chamber 158. Furthermore, the diaphragm 192 cooperates with the casing section 155 to form on the lower side of this diaphragm a chamber 193 into which opens the end of a passageway 194 that extends through the casing sections 155 and 31 and at its other end is connected to the hereinbefore-mentioned passageway 160 in the casing section 31.

As shown in FIG. 1B, the locking mechanism 153 of the brake pipe pressure controlled valve mechanism 30 comprises a stem 195 that is integral with the diaphragm follower 189 and extends downward therefrom through a bore 196 in a boss 197 that is integral with the casing section 155. The stem 195 is provided with a peripheral annular groove in which is disposed an O-ring 198 that forms a seal with the wall surface of the bore 196 to prevent leakage of fluid under pressure from the chamber 193 to a chamber 199 formed in a casing section 200 secured to the casing section 155 by any suitable means (not shown) and open to atmosphere via a short passageway 201 formed in the casing section 200.

The lower portion of the stem 195 extends into the chamber 199 and has a non-self-locking type of screw thread 202 formed thereon. This lower screw-threaded portion 202 of the stem 195 has screw-threaded engagement with internal screw-threads of the non-self-locking type formed in a movable cone-type clutch element 203. It will be understood that the pitch (Pitch—amount of advance of a screw-thread in a single turn) of these internal and external screw-threads is great enough to provide for rotation of the movable clutch elements 203 on the screw-threaded portion 202 of the stem 195 by a spring 204 that is interposed between the casing section 155 and a thrust-type ball bearing element 205 supported on the movable clutch element 203 when this clutch element is moved out of clutching contact in a manner hereinafter described with a stationary conical surface 206 formed on the casing section 200 and constituting the second clutch element of a two-element cone-type clutch by brake-pipe-pressure-operated means now to be described.

As shown in FIG. 1B, the outer periphery of a diaphragm 207 is clamped between the lower side of the casing section 200 and a cover 208 secured thereto by any suitable means (not shown). The inner periphery of this diaphragm 207 is clamped between a cup-shaped diaphragm follower 209 and a diaphragm follower plate 210 secured thereto by any suitable means (not shown).

The diaphragm 207 cooperates with the casing section 200 and cover 208 to form within the locking mechanism 153 and on opposite sides of the diaphragm two chambers 211 and 212. The chamber 211 is open to the atmospheric chamber 199 via a bore 213 in the casing section 200. Opening into the chamber 212 below the diaphragm 207 is one end of a passageway 214 that extends through the cover 208, casing sections 200, 155 and 31 and at its opposite end opens at the surface of the bolting face 32 on the lower side of the casing section 31 where it registers with a corresponding passageway hereinafter described in detail in the brake cylinder release valve device 34.

As shown in FIG. 1B, the cup-shaped diaphragm follower 209 is provided with a counterbore 215 in which is disposed a thrust-type ball bearing 216. This ball bearing 216 is retained in the counterbore 215 by a snap ring 217 that is inserted in a groove formed in the wall surface of this counterbore. It will be understood that a turning fit is provided between the snap ring 217 and the upper plate of the ball bearing 216 on which the movable clutch element 203 is supported when disengaged from the stationary conical surface 206 since the clutch element 203 rotates or spins on the non-self-locking screw-threads 202 when so disengaged and this upper plate therefore rotates or spins with this clutch element.

The direct release valve mechanism 33, shown in FIG. 1A of the drawings, is preferably built up of a first casing section 218 which has its upper end secured to the bolting face 32 of the casing section 31 by any suitable means (not shown), a second casing section 219 which is secured to the lower end of the first casing section 218 by any suitable means (not shown), and a third casing section 220 secured to the upper end of an upper cup-shaped portion of the first casing section 218 by any suitable means (not shown) to clamp therebetween the outer periphery of a long-travel type of diaphragm 221. This diaphragm 221 cooperates respectively with the casing sections 218 and 220 to form on the opposite sides of the diaphragm and within the direct release valve mechanism 33 two chambers 222 and 223. The chamber 222 is connected to the control reservoir 4 via a passageway 224 extending through the casing sections 218 and 31 to the passageway 13 in the pipe bracket portion 7 which passageway 13 is connected by the correspondingly numbered pipe to the control reservoir 4, as hereinbefore described. Consequently, the pressure in the chamber 222 increases simultaneously as the pressure in the control reservoir 4 increases when this reservoir is charged in a manner hereinafter described in detail. The chamber 223 is connected to the hereinbefore-mentioned passageway 62 in the casing section 31 via a passageway 225 extending through the casing sections 220, 218 and 31, which passageway 62 is connected to the brake pipe 1, as hereinbefore described. Therefore, fluid under pressure supplied from the brake pipe 1 to the passageway 62 flows therefrom through the passageway 225 to the chamber 223 so that the pressure therein increases simultaneously as the pressure in the brake pipe 1 increases.

The inner periphery of the diaphragm 221 is operatively connected to an annular cup-shaped diaphragm follower 226 formed at the lower end of a stem 227 by a cup-shaped diaphragm follower plate 228 that is secured to the follower 226 by any suitable means (not shown).

The stem 227 is slidably mounted in a bore 229 that extends through the casing section 220 from the chamber 223 to a chamber 230 that is formed by the cooperative relationship between the casing section 220 and a diaphragm 231 the outer periphery of which is clamped between the casing section 220 and a cover 232 secured thereto by any suitable means (not shown). The chamber 230 is connected via a passageway 233 extending through the casing sections 220, 218 and 31 to the hereinbefore-mentioned passageway 167 (FIG. 1B) in the casing sections 31, 55 and 154, cover member 165 and cover 57 which passageway 167 connects the chamber 166 in the self-lapping valve device 152 and the chamber 71 in the service valve device 29, as hereinbefore described. Therefore, a part of the fluid under pressure supplied by the self-lapping valve device 152 to the chamber 71 in the service valve device 29 via the passageway 167 flows from this passageway 167 through the passageway 233 to the chamber 230 (FIG. 1A) so that as the pressure in the chamber 58 in the service valve device 29 and in the chamber 222 in the direct release valve mechanism 33 reduces as a result of leakage of fluid under pressure from the control reservoir 4, the fluid under pressure supplied by the self-lapping valve device 152 to the chamber 230 in the direct release valve mechanism 33 maintains a constant force on the diaphragm or abutment stack comprising the diaphragms 221 and 231 the same as the fluid under pressure supplied to the chamber 71 in the service valve device 29 maintains a constant force on the diaphragm stack comprising the diaphragm 53 and 56.

Intermediate its ends the stem 227 is provided with a peripheral annular groove in which is disposed an O-ring 234 that forms a seal with the wall surface of the bore 229 to prevent leakage of fluid under pressure from either of the chambers 223 and 230 to the other.

That portion of the stem 227 that extends into the chamber 230 is provided with a shoulder 235 against which rests an annular diaphragm follower 236 between which and an annular diaphragm follower plate 237, the inner periphery of the diaphragm 231 is clamped by means of a nut 238 that has screw-threaded engagement with corresponding external screw-threads formed on a portion of reduced diameter of the stem 227 extending above the plate 237.

Disposed in a chamber 239 formed by the cooperative relationship of the diaphragm 231 and the cover 232 which is provided with a short passageway 240 that opens the chamber 239 to atmosphere, is a spring 241 that is interposed between a spring seat 242, which rests against the upper end of the stem 227, and the cover 232. This spring 241 is normally effective via the stem 227 to bias the diaphragm follower plate 228 against a stop 243 formed integral with the casing section 218.

In order to prevent leakage of fluid under pressure from the chamber 230 below the diaphragm 231 to the atmospheric chamber 239 above this diaphragm, that portion of the stem 227 that extends through the annular diaphragm follower plate 236 is provided with a peripheral annular groove in which is disposed an O-ring 244 that forms a seal with the wall surface of annular plate 236.

The cup-shaped diaphragm follower 226 is provided with a bottom bore 245 and a coaxial counterbore 246 the upper end of which forms a shoulder 247 against which rests the upper end of an annular member 248 that is integral with the upper end of the cup-shaped diaphragm follower plate 228 and has formed thereon adjacent its upper end a clutch face or surface 249.

Slidably mounted in the bottom bore 245 in follower 226 is a double cone clutch member 250 that has formed adjacent its lower end an external clutch face 251 for clutching contact with the clutch face 249 on the annular member 248 and an internal clutch face 252 for clutching contact with an external clutch face 253 formed on a single cone clutch member 254.

Extending downward from the upper end of the double cone clutch member 250 is a counterbore 255 in which is disposed a first thrust-type ball bearing element 256 between the upper plate of which and the upper end of the bottom bore 245 is interposed a spring 257 that acts in the direction to bias the external clutch face 251 on the double cone clutch member 250 into clutching contact with internal clutch face 249 on the annular member 248. Disposed within the bottom bore 245 and resting against the upper end of the double cone clutch member 250 is a second thrust-type ball bearing member 258 that supports the double cone clutch element 250 for rotation within the bottom bore 245 while the external clutch face 251 on the double bore clutch member 250 is out of clutching contact with the clutch face 249 on the annular member 248.

Disposed within the cup-shaped diaphragm follower plate 228 is a third thrust-type ball bearing element 259 between the upper plate of which and the lower side of the single cone clutch element 254 is interposed a spring 260 which acts in the direction to bias the external clutch face 253 on the single cone clutch element 254 into clutching contact with the internal clutch face 252 on the double cone clutch member 250.

Disposed within the annular member 248 in surrounding relation to the spring 260 and resting against a shoulder 261 formed on the cup-shaped diaphragm follower plate 228 is a fourth thrust-type ball bearing element 262. The upper plate of this ball bearing element 262 supports the single cone clutch member 254 for rotation therewith in a manner hereinafter described upon upward deflection of the diaphragm 221 which is effective to move the cup-shaped diaphragm follower plate 228 and the annular member 248 integral therewith upward so that the annular member 248 is effective, via the clutch face 249 thereon and the external clutch face 251 on the double cone clutch member 250, to lift the internal clutch face 252 on the clutch member 250 out of clutching contact with the external clutch face 253 on the clutch member 254 thereby to allow the single cone clutch member 254 to rotate or "spin" by reason of its connection via a non-self-locking screw and nut mechanism to a valve device now to be described.

As shown in FIG. 1A of the drawings, the casing section 218 is provided with a bore 263 that extends from the chamber 222 to a chamber 264 formed by the cooperative relationship of the casing sections 218 and 219 which chamber 264 is open to atmosphere via a short passageway 265 in the casing section 218. Also, as shown in FIG. 1A, formed integral with the lower side of the diaphragm follower 228 is a cylindrical member 266 that extends downward through the bore 263 into the chamber 264 and is provided with a peripheral annular groove in which is disposed an O-ring 267 that forms a seal with the wall surface of the bore 263 to prevent leakage of fluid under pressure from the chamber 222 to the atmospheric chamber 264.

The cylindrical member 266 is provided with a central bore 268 through which extends a stem 269 the upper end of which is integral with the single cone clutch member 254. The lower portion of this stem 269 extends into the chamber 264 and has a non-self-locking type of screw-thread 270 formed thereon that has screw-threaded engagement with internal screw threads of the non-self-locking type formed in a nut member 271 disposed in the chamber 264.

As shown in FIG. 1A, the nut member 271 is in the shape of an inverted U that has a port 271a in one leg thereof and an outturned flange 272 formed integral therewith at the lower end thereof. The outer periphery of the flange 272 is provided with a semicircular recess in which is disposed the upper portion of a dowel pin 273 that is anchored in the casing section 219 the purpose of this dowel pin being to prevent rotation of the nut member 271.

The flange 272 is provided with two coaxial semicircular recesses 273 and 274 of unequal radius the recess 273 having the greater radius and being just above the recess 274 as shown in FIG. 1A. Received in the upper recess 273 is a cylindrical head 275, the diameter of which is slightly less than twice the radius of the upper recess 273, this head 275 being integral with the upper end of a hollow stem 276. The diameter of the upper portion of the stem 276 is only slightly less than twice the radius of the lower recess 274 in which this upper portion is disposed.

As shown in FIG. 1A, the casing section 219 has formed therein a chamber 277 into which opens from opposite directions two coaxial bores 278 and 279 formed in the casing section 219 and being of the same diameter. A first bushing 280 is press-fitted into the bore 278 and a second bushing 281 is press-fitted into the bore 279. The stem 276 extends downward from the cylindrical head 275 through the bushing 280, the chamber 277, the bushing 281 and into a chamber 282 formed by the cooperative relationship of the casing section 219 and a screw-threaded plug 283 that has screw-threaded engagement with a screw-threaded bore in the casing section 219.

The inside wall surface of the bushing 280 is provided with an internal annular groove in which is disposed an O-ring 284 that forms a seal with the upper portion of the stem 276 to prevent leakage of fluid under pressure from the chamber 277, which is connected to the hereinbefore-mentioned chamber 111 in the inshot valve device 27 by a passageway 285 extending through the casing sections 219, 218, 31 and 107, and the cover 110, to the atmospheric chamber 264.

The lower portion of the stem 276 is smaller in diameter than the upper portion thereof so that it extends with clearance through the bushing 281 into the chamber 282 into which opens one end of a passageway 286 that extends through the casing sections 219 and 218 and at its opposite end opens into the hereinbefore-mentioned passageway 224 intermediate the ends thereof. Formed at the lower end of the bushing 281 is an annular valve seat 287 toward which a flat disc-type valve 288 disposed in a counterbore formed the plug 283 is biased by a spring 289 interposed between the plug 283 and the lower side of the valve 288. The valve 288, while in the position shown in FIG. 1A, is held out of seating contact with the valve seat 287 by the stem 276. A snap ring 290, which is inserted in a groove formed in the wall surface of the counterbore in the plug 283, retains the valve 288 in this counterbore to enable the removal of the plug 283, the spring 289 and the valve 288 as a unit.

The manually operated brake cylinder release valve device 34 shown in FIG. 1B of the drawings comprises a casing section 291 which is secured to the bolting face 32 of the casing section 31 by any suitable means (not shown) and in parallel spaced-apart relation to the first casing section 218 (FIG. 1A) of the direct release valve mechanism 33. The casing section 291 is provided with two parallel spaced-apart bores 292 and 293 the lower ends of which are closed by a bottom cover 294 that is secured to the casing section 291 by any suitable means (not shown). The lower end of the casing section 291 is provided with an annular groove which surrounds the lower end of the bore 292. An O-ring 295 disposed in this groove forms a seal with the casing section 291 and the bottom cover 294 to prevent leakage of fluid under pressure from the interior of the bore 292 to atmosphere. Slidably mounted in the bore 292 is a spool-type valve 296 which is provided intermediate its ends with a first elongated peripheral annular groove 297 and a second elongated peripheral annular groove 298 spaced along the valve 296 below the first groove 297.

One end of a passageway 299 extending through the casing sections 31 and 291 opens into the hereinbeforementioned passageway 160 intermediate the ends thereof. The opposite end of this passageway 299 opens at the wall surface of the bore 292 at a location intermediate the ends thereof such that while the valve 296 occupies the intermediate one of three positions, in which intermediate position it is shown in FIG. 1B of the drawings, the peripheral annular groove 298 on the valve 296 establishes a communication between the passageway 299 and two passageways 300 and 301 in the casing section 291, one end of each of which passageways opens, one slightly above the other, at the wall surface of the bore 292 above the opening of the passageway 299 at the wall surface of this bore. The passageway 300 extends through the casing sections 291 and 31 and at its opposite end opens into the hereinbefore-mentioned passageway 224 (FIG. 1A) intermediate the ends thereof which passageway 224 is connected by the passageway and corresponding pipe 13 to the control reservoir 4.

The other end of the passageway 301 opens at the wall surface of the bore 293 in which is slidably mounted a spool-type valve 302 that is provided intermediate its ends with a first elongated peripheral annular groove 303 and a second elongated peripheral annular groove 304 spaced along the valve 302 below the first groove 303 and registering with the other end of the passageway 301 while valve 302 occupies the position shown. The upper end of the valve 302 has formed integral therewith a portion of reduced diameter through which a longitudianl passageway 305 extends to a crosswise passageway 306 formed in the valve 302 the opposite ends of which passageway 306 open at the surface of the groove 303 on the valve 302.

While the valve 302 occupies the position shown in FIG. 1B, the groove 303 thereon establishes a communication between the crosswise passageway 306 and a passageway 307 that opens at one end at the wall surface of the bore 293 and extends through the casing section 291 to the bolting face 32 on the bottom of the casing section 31 where the other end of this passageway 307 registers with the hereinbefore-mentioned other end of the passageway 136 that opens at the surface of the bolting face 32.

Opening at the wall surface of the bore 293 adjacent the upper end thereof is one end of a passageway 308 that also extends through the casing section 291 to the bolting face 32 on the bottom of the casing section 31 where the other end of this passageway 308 registers with the hereinbefore-mentioned opposite end of the passageway 214 that opens at the surface of the bolting face 32.

The upper end of the bore 293 has formed thereon an annular valve seat 309 against which a flat disc-type valve 310 disposed in a chamber 311 formed in the casing section 291 is normally biased by a spring 312 interposed between the valve 310 and the bottom of a valve seat member 313 that rests against a shoulder formed by the end of a counterbore 314 in the casing section 291. The chamber 311 is connected to the aforementioned passageway 300 intermediate the ends thereof by a passageway 315 that has a branch 315a that opens at the wall surface of the counterbore 314 above the valve seat member 313.

The upper end of the counterbore 314 is closed by a cover member 316 between which and the casing section 291 is disposed an O-ring 317 that forms a seal between the casing section and cover member to prevent leakage of fluid under pressure from the upper end of the counterbore 314 to atmosphere.

Disposed in the counterbore 314 above the valve seat member 313 is a flat disc-type control reservoir release valve 318 between which and the cover member 316 is interposed a spring 319 that normally biases the valve 318 against an annular valve seat 320 formed at the upper end of a counterbore 321 in the valve seat member 313. The interior of the counterbore 321 is open to atmosphere via a passageway 322 that extends through the valve seat member 313 and the casing section 291.

The lower end of the valve 302 extends into a chamber 323 formed in the casing section 291, the open end of which is closed by the bottom cover 294. This lower end of the valve 302 has formed integral therewith a collar 324 between which and the casing section 291 is disposed in surrounding relation to the valve 302 a spring 325 that is effective to normally bias the valve 302 to the position shown in FIG. 1B of the drawings in which position the collar 324 abuts a central boss 326 formed on the upper side of a flange 327 that is integral with the upper end of a manually operated release valve stem 328 that extends through a bore 329 in the bottom cover 294. The lower end of the manually operated release valve stem 328 may be operatively connected to pull rods (not shown) which extend to each side of a freight car. As viewed in FIG. 1B of the drawings, the spool-type valve 302 is provided adjacent the upper and lower ends of each of the elongated peripheral annular grooves 303 and 304 thereon with a peripheral annular groove in each of which is carried an O-ring 330.

While the valve 302 occupies the position shown in FIG. 1B, the two O-rings 330 adjacent the upper and lower end of the elongated peripheral annular groove 304 thereon are disposed respectively above and below that end of the passageway 301 that opens at the wall surface of the bore 293 and make a seal with this wall surface to prevent leakage of fluid under pressure from the passageway 301 along the periphery of the valve 302 to respectively, the chamber 323 and a passageway 331 formed in the casing section 291 one end of which passageway 331 opens at the wall surface of the bore 293 above the opening of the passageway 301 at the wall surface of this bore. The opening of the passageway 331 at the wall surface of bore 293 is at such a location that, while the valve 302 occupies the position shown in FIG. 1B, the two central O-rings 330 carried by valve 302 form a seal with the wall surface of the bore 293 respectively above and below the opening of this passageway 331 at this wall surface thereby to prevent flow of fluid under pressure from either the passageway 301 or the passageway 307 to the passageway 331.

The other end of the passageway 331 opens into a chamber 332 below a diaphragm 333, hereinafter referred to as a lockup diaphragm, that has its outer periphery clamped between the casing section 291 and the cover member 316. The diaphragm 333 and cover member 316 cooperate to form above the diaphragm a chamber 334 into which opens one end of a passageway 335 that extends through the cover member 316 and casing sections 291 and 31 and at its opposite end opens into the hereinbeforementioned passageway 62 intermediate the ends thereof. Since the passageway 62 is connected to the brake pipe 1 in the manner hereinbefore explained, fluid under pressure 62 will flow from this passageway 62 to the chamber 334 via the passageway 335 to charge this chamber to the pressure carried in the brake pipe 1. The passageway 335 has a branch passageway 335a that opens at the wall surface of the bore 292 adjacent the lower end thereof in order that both ends of the valve 296 slidably mounted in the bore 292 are subject to brake pipe pressure to thereby balance this valve 296.

Formed integral with and at the upper end of the valve 296 is a diaphragm follower 336 to which the inner periphery of the diaphragm 333 is clamped by a diaphragm follower plate 337 that is secured to the diaphragm follower 336 by any suitable means (not shown). Disposed within the chamber 332 and in surrounding relation to the valve 296 is an annular spring seat 338 between which and the casing section 291 and in surrounding relation to the valve 296, is interposed a spring 339 that is effective, in the absence of fluid under pressure in the chamber 334, to bias the spring seat 338 into contact with a snap ring 340 that is inserted in a groove formed in the wall of the chamber 332. The passageway 331 has a branch passageway 331a that opens at the wall surface of the bore 292 intermediate the ends thereof and above the opening of the passageway 301 at the wall surface of this bore. This opening is so located as to be in registry with the groove 297 on the valve 296 in its intermediate position shown and in a lowermost position below the position shown in FIG. 1A. While the valve 296 occupies the position in which it is shown in FIG. 1B, the groove 297 thereon establishes a communication between the branch passageway 331a and a choke 341, the outlet of which is open to the atmosphere via a passageway and port 342 in the casing section 291. Since the branch passageway 331a is connected to the chamber 332 via the passageway 331, this chamber is vented to atmosphere while the valve 296 occupies the position shown in FIG. 1B and also in its aforementioned lowermost position.

An O-ring 343 is carried by the spool-type valve 296 in each of three spaced-apart peripheral annular grooves which are spaced along the length of the valve 296 so that while it occupies the position shown in FIG. 1B, the O-ring 343 adjacent the upper end of the groove 298 prevents leakage of fluid under pressure from the control reservoir 4 (FIG. 1A) to the groove 297, via pipe and passageway 13, and passageways 224 and 300, and thence to atmosphere via the groove 297, choke 341 and passageway and port 342. Likewise, the O-ring seal 343 adjacent the lower end of the groove 298 prevents leakage from the control reservoir 4 to the bottom of the bore 292 into which opens the branch passageway 335a that is normally charged to brake pipe pressure.

Upon brake pipe pressure in the chamber 334 increasing above thirty pounds per square inch, the diaphragm 333 will be deflected downward against the yielding resistance of the spring 339 to move the valve 296 downward to the lowermost of its three positions in which the spring seat 338 abuts a stop 344 formed integral with the casing section 291. While the valve 296 occupies this lowermost position, the middle O-ring 343 on the valve 296 is disposed below the opening of the passageway 301 at the wall surface of bore 292 and above the opening of the passageway 300 at the wall surface of this bore to prevent flow of fluid under pressure from the control reservoir 4 (FIG. 1A) via pipe and passageway 13, and passageways 224 and 300 (FIG. 1B) and groove 298, to the passageway 301 to thereby insure that fluid under pressure cannot be supplied to the chamber 332 if a malicious person, subsequent to the pressure in the brake pipe 1 being reduced to some value in excess of thirty pounds per square inch to effect a brake application, by exerting a pull on either one of the pull rods connected to the release valve stem 328, moves the valve 302 upward from the position shown in FIG. 1B to a position in which the groove 304 on this valve 302 establishes a communication between the passageways 301 and 331. If the passageway 331 were not thus cut off from the passageway 300, then, upon the malicious person moving the valve 302 upward to the position in which the groove 304 thereon establishes a communication between the passageways 301 and 331, fluid under pressure would flow from the control reservoir 4 to the chamber 332. Since the control reservoir pressure would be higher than the reduced brake pipe pressure present in the chamber 334, as the result of having previously reduced brake pipe pressure to effect a brake application, this higher pressure supplied to the chamber 332 would be effective to deflect the diaphragm 333 upward to move the valve 296 to the upper most of its three positions, in which position the lower O-ring 343 carried by the valve 296 would be disposed above the opening of the passageway 299 at the wall surface of the bore 292. If the valve 296 were thus moved to the uppermost of its three positions, a communication would be established via bore 292 between the passageway 299, which is connected to the chamber 58 below the diaphragm 53 of the service valve device 29 via passageway 160 and branch 160a, and the branch passageway 335a which is connected to the chamber 49 above the diaphragm 53 of the service valve device 29 via passageways 335 and 62. Consequently, the pressures on opposite sides of the diaphragm 53 would become equalized which, assuming no control reservoir leakage and therefore no fluid under pressure in the chamber 71 below the diaphragm 56 of the service valve device 29, would cause an undesired direct and complete release of the brakes on the car in a manner hereinafter described in detail.

In humping operations, it is often desirable that a trainman effect a release of the brakes. Since the chamber 334 is void of fluid under pressure at this time, as a result of the venting of the brake pipe at the time the car was cut out of the train for humping, the trainman can effect a release of the brakes by exerting a pull on one of the push rods connected to the release valve stem 328 to effect movement of the valve 302 to its upper position in which the groove 304 on this valve establishes a communication between the passageways 301 and 331 whereupon fluid under pressure flows from the control reservoir 4 to the chamber 332. Fluid under pressure thus supplied to the chamber 332 deflects the diaphragm 333 upward to move the valve 296 upward, against the yielding resistance of a spring 345 interposed between the diaphragm follower plate 337 and the cover member 316, to the uppermost of its three positions. In this uppermost position of the valve 296, the O-ring 343 adjacent the upper end of the groove 298 is disposed above the opening of the branch passageway 331a at the wall surface of the bore 292 and below the choke 341, and the O-ring 343 adjacent the lower end of the valve 296 is disposed below the opening of the passageway 300 at the wall surface of the bore 292. Therefore, the groove 298 establishes a communication between the passageway 300 and the branch passageway 331a so that the chamber 332 will remain charged with fluid under pressure from the control reservoir 4 upon the trainman releasing the pull rod connected to the release valve stem 328 to render the spring 325 effective to move the valve 302 downward to the position shown in FIG. 1B of the drawings, in which position communication is closed between the passageways 301 and 331.

While the valve 296 occupies its uppermost position, the O-ring 343 thereon above the upper end of the groove 297 prevents leakage of fluid under pressure from the chamber 332 along the periphery of the valve 296 to the groove 297 thereon and thence via choke 341 and passageway and port 342, to atmosphere. Therefore, the valve 296 will remain in its uppermost position until the chamber 334 is subsequently charged from the brake pipe 1 to a pressure that is substantially equal to the control reservoir pressure present in the chamber 332 whereupon the spring 345 is rendered effective to deflect the diaphragm 333 downward and move the valve 296 from its uppermost position to its intermediate position in which it is shown in FIG. 1B.

Referring now to the emergency application portion 9 of the brake control valve device 5, it will be seen from FIG. 1 of the drawings that the continual quick service valve device 19 of the emergency application portion 9 comprises a pair of valve stems 346 and 347 are formed integral with an extend in opposite directions from a diaphragm follower 348 to which is secured by any suitable means (not shown) a diaphragm follower plate 349 to clamp the inner periphery of a diaphragm 350 between this follower and plate. The outer periphery of the diaphragm 350 is clamped between the casing section 43 and a cover member 351 that is secured to the upper end of the casing section 43 by any suitable means (not shown) to form on the opposite sides of the diaphragm and within the continual quick service valve device 19 two chambers 352 and 353.

The chamber 352 above the diaphragm 350 is connected to the hereinbefore-mentioned quick service volume 17 (FIG. 1A) by a passageway 354 extending through the cover member 351 and casing section 43. This passageway 354 has a branch passageway 354a that connects this passageway 354 to the quick service and emergency pilot valve device 20.

Opening at one end into the chamber 353 below the diaphragm 350 is a passageway 355 that extends through the casing section 43 and cover member 351 and opens at its opposite end at the wall surface of a bore 356 formed in the cover member 351 and extending from the chamber 352 to a chamber 357 that is formed in the cover member 351 and has its open end closed by a screw-threaded plug 358 that has screw-threaded engagement with a screw-threaded bore formed in the casing section 351.

The valve stem 346 is slidably disposed in the bore 356 and the valve stem 347 is slidably disposed in a bore 359 extending from the chamber 353 to a chamber 360 formed in the casing section 43 and open to atmosphere via a short passageway and port 361 in this casing section. Intermediate its ends the valve stem 347 is provided with a peripheral annular groove in which is disposed an O-ring 362 that forms a seal with the wall surface of the bore 359 to prevent flow of fluid under pressure from the chamber 353 to the atmospheric chamber 360.

Formed integral with the lower end of the valve stem 347 and coaxial therewith is a stem 363 having a diameter substantially less than that of the stem 347 so as to form a shoulder 364 against which rests an annular valve seat 365 through which the stem 363 extends. Disposed in the atmospheric chamber 360 in surrounding relation to the stem 363 and interposed between the spring seat 365 and the bottom of the chamber 360 is a spring 366 that is normally effective, via the stem 347, to bias the diaphragm follower 348 against a stop 367 formed on the cover member 351.

The length of the valve stem 346 is such that while the diaphragm follower 348 is biased against the stop 367 by the spring 366, the upper end of the valve stem 346 is effective to hold a flat disc-type valve 368 disposed in the chamber 357 out of seating contact with an annular valve seat 369 formed at the upper end of the bore 356 against the yielding resistance of a spring 368a interposed between the valve 368 and plug 358 so that the chamber 357, and the chamber 353 connected thereto via the passageway 355 and the bore 356, are cut off from atmosphere via a passageway 370 extending downward from the upper end of the valve stem 346 to the location thereon at which an elongated peripheral annular groove 371 is formed and thence crosswise the valve stem 346 so as to open at the surface of this groove, and a passageway 372 in the cover member 351.

The chamber 357 is connected to the hereinbefore-mentioned quick action chamber 16 (FIG. 1A) via a passageway 373 extending through the cover member 351 (FIG. 1), casing section 43 and pipe bracket portion 7 (FIG. 1A). This passageway 373 has first and second branch passageways 373a and 373b each connected to the quick service and emergency pilot valve device 20, and a third branch passageway 373c connected to a chamber 374 formed in the casing section 43 beneath the atmospheric chamber 360 in this casing section.

The atmospheric chamber 360 is connected to the chamber 374 by a bore 375 formed in the casing section 43 and having at its lower end an annular valve seat 376 against which a flat disc-type valve 377 disposed in the chamber 374 is normally biased by a spring 378 interposed between this valve 377 and the casing section 43. As shown in FIG. 1, the stem 363 extends down into the bore 375 and terminates just above the valve 377 so that the stem 363 is effective to move the valve 377 out of seating contact with the valve seat 376 when the diaphragm 350 is deflected downward in a manner hereinafter described in detail to move the valve stems 346 and 347 and stem 363 downward.

In order to constantly prevent leakage of fluid under pressure from the chamber 352 to atmosphere and, while the valve 368 is unseated, from the chamber 357 to atmosphere, the valve stem 346 is provided adjacent each end of the groove 371 thereon with a peripheral annular groove in each of which is disposed an O-ring 379 that forms a seal with the wall surface of the bore 356 to prevent flow of fluid under pressure between the periphery of the stem 346 and the wall surface of the bore 356.

The back-dump valve device 24 comprises a flat disc-type valve 380 that is disposed in a chamber 381 formed by the cooperative relationship between a casing section 382 that is secured to the casing section 43 by any suitable means (not shown), and a cover 383 that is secured to the casing section 382 by any suitable means (not shown). The chamber 381 is connected to a chamber 384 in the spill-over check valve device 23 by a passageway 385 formed in the casing section 382 so that the chamber 381 is constantly charged with fluid under pressure at the same pressure existing in the control reservoir 4 which is connected to the chamber 384 by a passageway 386 that extends through the casing sections 382 and 43 and the pipe bracket portion 7 and is connected to passageway 13 in the pipe bracket portion 7 (FIG. 1A). The casing section 382 (FIG. 1) is provided with a bore 387 and a coaxial counterbore 388 at the lower end of which is formed an annular valve seat 389. A spring 390 is disposed in the chamber 381 and interposed between the valve 380 and the cover 383 to normally bias the valve 380 into seating contact with the seat 389 to close communication between the chamber 381 and the interior of the counterbore 388.

Slidably mounted in the bore 387 is a piston valve 391 that has at its lower end a collar 392 from which extends in the direction of the valve 380 a stem 393. The upper end of the piston valve 391 extends into a chamber 394 in the quick service and emergency pilot valve device 20. The collar 392 is normally biased against a shoulder 395 formed at the upper end of the counterbore 388 by a spring 396 that is disposed in the chamber 394 and interposed between the casing section 382 and a spring seat 397 that is secured to the piston valve 391 by a snap ring 398 that is inserted in a groove formed in the outer periphery of that portion of the piston valve 391 that extends into the chamber 394. It will be seen from FIG. 1 that the spring seat 397 is in the form of a saucer having a bottom 399 in which is provided an aperture through which the piston valve 391 extends. As can also be seen from FIG. 1, spring 396 normally biases the saucer-like spring seat 397 to a position in which the bottom 399 thereof is in contact with the lower side of the snap ring 398 through which the force of the spring is transmitted to the piston valve 391 to move it upward to the position shown in FIG. 1 in which the collar 392 thereon is in contact with the shoulder 395.

As shown in FIG. 1, the piston valve 391 is provided intermediate its ends with an elongated peripheral annular groove 400 which, while the piston valve 391 occupies the position shown in FIG. 1, establishes a communication between a first passageway 401, one end of which opens at the wall surface of the bore 387, and a second passageway 402, one end of which opens at the wall surface of the bore 387 above the location at which the one end of the passageway 401 opens at this wall surface. The passageway 401 extends through the casing sections 382 and 43, the pipe bracket portion 7 (FIG. 1A), and the casing section 31 and at its opposite end opens into the hereinbefore-mentioned passageway 285 intermediate the ends thereof. The passageway 402 (FIG. 1) extends through the casing section 382 to the exterior thereof and has disposed therein a removable plug 403 which, while disposed in the passageway 402 serves to close communication between the passageways 401 and atmosphere. Since the passageway 401 is connected to the passageway 285 (FIG. 1A) and thereby the chamber 111 in the inshot valve device 27 and the chamber 277 in the direct release valve mechanism 33, the chambers 111 and 277 are likewise cut off from atmosphere.

As shown in FIG. 1 of the drawings, formed in the casing section 382 is a passageway 404 that at one end opens at the wall surface of the bore 387 below the location at which the one end of the passageway 401 opens at this wall surface. The opposite end of the passageway 404 opens at the wall surface of the counterbore 388 at the upper end thereof.

The piston valve 391 is provided adjacent the lower end of the groove 400 thereon with a peripheral annular groove and adjacent the upper end of this groove with a pair of spaced-apart peripheral annular grooves. An O-ring 405 is disposed in each of these three peripheral annular grooves and forms a seal with the wall surface of the bore 387 to prevent leakage of fluid under pressure from the passageways 401 and 402 to respectively the passageway 404 and the chamber 394.

When the plug 403 is removed, as hereinafter explained, and the piston valve 391 is then moved downward from the position shown in FIG. 1 to a second position in which the two upper spaced-apart O-rings 405 are disposed respectively, above and below the opening of the passageway 402 at the wall surface of the bore 387, these O-rings respectively prevent leakage from the chamber 394 to atmosphere, and from the passageway 401 and chambers 111 and 277 to atmosphere.

The engineer's brake valve device 6 shown in FIG. 1 of the drawings is identical in construction and operation to the engineer's brake valve device 6 shown and described in detail in the hereinbefore-mentioned Patent No. 3,208,801. Therefore a detailed description of this brake valve device is believed to be unnecessary since reference may be had to Patent No. 3,208,801 for the details of this brake valve device.

OPERATION

(A) Direct release operation

With the direct release valve mechanism 33 secured to the bolting face 32 provided on the lower end of casing section 31, as shown in FIG. 1A of the drawings and the plug 403 (FIG. 1) disposed in the passageway 402, the brake control valve device 5 is conditioned for direct release operation.

With a manually positionable selector valve device 406 (FIG. 1) of the engineer's brake valve device 6 located on a locomotive set in that one of its positions referred to in Patent No. 2,958,561, issued Nov. 1, 1960, to Harry C. May and assigned to the assignee of the present invention, as freight position, this brake valve device is conditioned to so control the brakes on the cars in a train hauled by the locomotive, when some cars are equipped with a brake control valve device 5 conditioned for direct release operation and the remaining cars are equipped with the well-known AB brake control valve device, as to provide for only a direct release of the brakes on all the cars.

INITIAL CHARGING

Assume initially that all the passageways and chambers in the brake control valve device 5 shown in FIGS. 1, 1A and 1B of the drawings are devoid of fluid under pressure, that the various parts of the brake control valve device 5 are in the respective positions in which they are shown in the drawings, that one or more of the cars in a train are equipped with the brake control valve device 5, and that the remaining cars are equipped with the well-known AB control valve device which is of the direct release type, that a main reservoir 407 (FIG. 1) connected to a chamber (not shown) in the engineer's brake valve device 6 by a pipe 408 in the manner described in detail in hereinbefore-mentioned Patent No. 3,208,801, is charged with fluid under pressure to a chosen pressure, which for example, may be one hundred and forty pounds per square inch, and that it is desired to initially charge the brake equipment on all the cars in the train.

To effect initial charging of the brake equipment on all the cars in the train, the engineer will move a handle 409 (FIG. 1) of the brake valve device 6 to its running (i.e., release) position to cause operation of a self-lapping control valve device 410 of the brake valve device 6 in the manner described in the hereinbefore-mentioned Patent No. 2,958,561 to effect the supply of fluid under pressure from the main reservoir 407 to a relay valve device 411 which is operated thereby in the manner described in the aforesaid Patent No. 2,958,561 to effect the supply of fluid under pressure from the main reservoir 407 to the train brake pipe 1 that extends from car to car through the train at the usual normal rate to effect charging of the train brake pipe in the manner described in detail in hereinbefore-mentioned Patent No. 3,208,801. On each car in the train that is equipped with a brake control valve device 5, fluid under pressure flows from the brake pipe 1 to the pipe and passageway 10 (FIG. 1A), which passageway leads through the pipe bracket portion 7 of the respective brake control valve device 5 to the brake pipe strainer 26 (FIG. 1). The fluid under pressure, after passing through the strainer 26, flows to the passageway 42 in the casing section 43. One branch of the passageway 42 registers with the passageway 41 (FIG. 1A) in the pipe bracket portion 7, which passageway 41 is connected through the choke 40 to the passageway 39 in the casing section 31. Fluid under pressure thus supplied from the brake pipe 1 to the passageway 39 flows therefrom to the auxiliary reservoir 3 via the auxiliary reservoir charging check valve device 35 (FIG. 1B) to effect charging of the auxiliary reservoir 3 in the manner described in detail in the hereinbefore-mentioned Patent No. 3,208,801 until the pressure in the auxiliary reservoir 3 is substantially the same as the normal full charged pressure carried in the brake pipe 1, which, for example, may be seventy pounds per square inch.

Fluid under pressure is also supplied to the upper side of the piston 93 via the passageway 96 and to the chamber 85 below the piston 93 via the passageway 101 in the manner explained in hereinbefore-mentioned Patent No. 3,208,801 so that the pressures acting on the opposite sides of this piston are equal. Therefore, the valve 97 is only biased into contact with the valve seat 87 by the force of the comparatively light spring 102 and the fluid under pressure acting on the upper side of valve 97 over an area equal to the area of the valve seat 87.

Fluid under pressure supplied from the brake pipe 1 to the passageway 41 (FIG. 1A) in the pipe bracket portion 7 will also flow to the passageway 62 in the casing section 31, which passageway opens into the chamber 49 (FIG. 1B) above the diaphragm 53 so that the pressure in this chamber is increased to the normal value of the pressure carried in the brake pipe 1 when fully charged.

Fluid under pressure supplied to the passageway 62 also flows therefrom through the passageway 335 (FIG. 1B) in the casing sections 31 and 291 to the chamber 334 above the diaphragm 333 of the brake cylinder release valve device 34, and through the branch passageway 335a to the bottom of the bore 292. The strength of spring 339 is such that diaphragm 333 and valve 296 connected thereto remain in the position shown in FIG. 1B until the pressure in the chamber 334 exceeds thirty pounds per square inch at which time diaphragm 333 and valve 296 are moved downward to a position in which groove 298 closes communication between passageway 300 and passageway 301 to prevent a malicious person from effecting a direct release of the brakes in the manner explained in hereinbefore-mentioned Patent No. 3,208,801 so long as brake pipe pressure exceeds thirty pounds per square inch.

The fluid under pressure that is supplied from the brake pipe 1 to the passageway 41 (FIG. 1A) in the pipe bracket portion 7 also flows through the branch 41a, the choke 141, the passageway 140 in casing section 31, groove 138 on the inshot valve 116, while it occupies the position shown in FIG. 1A, and thence through the passageways 139 and 137 in the casing section 31, groove 161 on interlock valve 150 to passageway 160 in the casing section 31. Fluid under pressure thus supplied to the passageway 160 flows to the chamber 58 (FIG. 1B) below the diaphragm 53 of the service valve device 29 via the branch 160a.

Since the chamber 58 below the diaphragm 53 is charged from the brake pipe 1 via the groove 138 on the inshot valve 116 and the groove 161 on the interlock valve 150 while they occupy the repsective positions in which they are shown in FIG. 1B of the drawings, and the chamber 49 is simultaneously supplied with fluid under pressure from the brake pipe 1 via the pipe 10 and passageways 10, 42, 41 and 62, it will be understood that the pressures in the chambers 58 and 49 increase concurrently so that the diaphragm 53 and valve stem 51 of the service valve device 29 remain in the position shown in FIG. 1B during initial charging of the equipment.

Fluid under pressure supplied from the brake pipe 1 to the passageway 160, in addition to flowing to the chamber 58 in the service valve device 29, also flows from this passageway 160 to the control reservoir 4 via the passageway 299, groove 298 on valve 296, passageways 300, 224 (FIG. 1A) and 13, and pipe 13 to effect the charging thereof, at a rate controlled by the size of the choke 141, until the pressure in the control reservoir 4 is the same as the normal fully charged pressure carried in the brake pipe 1.

Furthermore, as can be seen from FIG. 1B, the fluid under pressure supplied from the brake pipe 1 to the passageway 160 flows directly to the chamber 157 above the diaphragm 156 of the self-lapping valve device 152. Fluid under pressure also flows from passageway 160 via the passageway 181 to the chamber 179 in this valve device 152, and via the passageway 194 to the chamber 193 below the diaphragm 192 of this valve device.

Referring to FIG. 1B of the drawings, it will be seen that the passageway 300 in the casing section 291 is connected by the passageway 315 in this casing section to the chamber 311 above the valve 310. Furthermore, the branch 315a connects the passageway 315 to the upper end of the bore 314. Consequently, the chamber 311 and the upper end of the bore 314 are simultaneously charged with fluid under pressure from the control reservoir 4.

Fluid under pressure supplied from the brake pipe 1 to the passageway 137 (FIG. 1A) in the maner explained above, in addition to flowing to the passageway 160 via the groove 161 on the interlock valve 150, also flows, while the inshot valve 116 occupies the position shown in FIG. 1A, to the passageway 136 in the casing section 31 via the groove 135 on the inshot valve 116. The passageway 136 extends through the casing section 31 to the bolting face 32 (FIG. 1B) on the lower side thereof and there registers with the hereinbefore-mentioned other end of the passageway 307 in the casing section 291. Consequently, fluid under pressure will flow from the passageway 136 to the chamber 212 in the locking mechaism 153 via passageway 307, groove 303 on valve 302 of the brake cylinder release valve 34, crosswise passageway 306, passageway 305, bore 293, passageway 308, and passageway 214 so that the chamber 212 is charged to the normal pressure carried in the brake pipe 1.

When the fluid under pressure supplied from the brake pipe 1 to the chamber 212 in the locking mechanism 153 has increased the pressure in this chamber sufficiently to overcome the initial resistance of the spring 204, the diaphragm 207 will be deflected upward until the diaphragm follower 209 contacts a stop 200a formed on the casing section 200 to lift the movable cone clutch element 203 out of clutching contact with the stationary conical surface 206, the lifting force being transmitted to the cone clutch element 203 via the diaphragm follower 209 and thrust-type ball bearing 216.

This movement of the cone clutch elements 203 out of clutching contact with the stationary conical surface 206 renders the spring 204, the lower end of which rests on the upper plate of the thrust-type ball bearing element 205, effective via this ball bearing element to rotate or "spin" the clutch element 203 on the non-self-locking type of screw thread 202 formed on the lower portion of the stem 195 as the increasing control reservoir pressure, being supplied from the brake pipe 1 thereto, and to the chamber 193 below the diaphragm 192 and the chamber 157 above the diaphragm 156, deflects these diaphragms in opposite directions against the yielding resistance of the spring 186 to, respectively, move the stem 195 upward and urge the stem 169 downward so that the diaphragm follower plate 172 abuts a stop 31a formed integral with the casing section 31 until the resistance of the spring 186 balances the fluid pressure forces acting in opposite directions thereon it being understood that these fluid pressure forces correspond to the normal fully charged pressure in the control reservoir 4 which always is the same as the normal fully charged pressure carried in the brake pipe 1.

While the diaphragm follower plate 172 abuts the stop 31a, the hollow stem 169 will occupy a position below that in which it is shown in FIG. 1B in which lower position the upper end of the stem 169 is disposed below and out of contact with the lower side of the valve 183 which is biased against the seat 182 by the spring 184 to close communication between the chamber 179 and the interior of the bore 178. In this lower position of the hollow stem 169, the chamber 166 above the diaphragm 164 of the self-lapping valve device 152 and the chamber 71 below the diaphragm 56 of the service valve device 29, which chamber 71 is connected to the chamber 166 via the passageway 167 and choke 168, are open to atmosphere via the passageway 185, bore 178, the hollow stems 169 and 171, hollow spring seat 187, chamber 158, and passageway 159. Since the chamber 230 (FIG. 1A) in the direct release valve mechanism 33 is connected to the passageway 167 via the passageway 233, the chamber 230 will also be opened to atmosphere.

As can be seen from FIG. 1A, the passageway 225 connects the chamber 223 above the diaphragm 221 of the direct release valve mechanism 33 to the passageway 62 to which fluid under pressure is supplied from the brake pipe 1. Consequently, fluid under pressure will flow from the brake pipe 1 to the chamber 223 to increase the pressure therein as the pressure in the brake pipe 1 increases.

Likewise, as can be seen from FIG. 1A, the passageway 224 connects the chamber 222 below the diaphragm 221 to the passageway 300. Consequently, fluid under pressure will flow from the brake pipe 1 to the passageway 300 as hereinbefore explained, and thence simultaneously from this passageway to the control reservoir 4 and the chamber 222. Accordingly, the chambers 222 and 223 on the opposite sides of the diaphragm 221 are simultaneously charged from the brake pipe 1 to the normal full charged pressure carried therein. Since the chambers 222 and 223 are charged to the same pressure and the chamber 230 is vented to atmosphere, as hereinbefore explained, the spring 241 is effective via the spring seat 242, stem 227, and diaphragm follower 226 to bias the diaphragm follower plate 228 against the stop 243 on the casing section 218. While diaphragm follower plate 228 is thus biased against the stop 243, the spring 257 is effective via the ball bearing element 256 to bias the double cone clutch member 250 downward until the external clutch face 251 on the clutch member 250 is in clutching contact with the clutch face 249 on the annular member 248. At this time the spring 260, one end of which rests on the ball bearing element 259, is effective to bias the external clutch face 253 on the single cone clutch member 254 against the internal clutch face 252 on the double clutch member 250. Therefore, while the spring 241 biases the diaphragm follower plate 228 into contact with the stop 243, the stem 269 and nut member 271 occupy the position shown in FIG. 1A in which the outturned flange 272 on the lower end of the nut member 271 abuts the bottom of a counterbore 412 formed in the casing section 219 and coaxial with the hereinbefore-mentioned bore 278 in this casing section. Since the head 275 of the hollow stem 276 is carried by the flange 272, when the flange 272 abuts the bottom of the counterbore 412, the stem 276 is effective to maintain the valve 288 out of seating contact with the valve seat 287 so that a communication is established between the chambers 282 and 277 via the bushing 281.

Since the chamber 282 is connected by the passageway 286 to the passageway 224 which in turn is connected to the control reservoir 4, as hereinbefore explained, fluid under pressure will flow from the control reservoir to the chamber 282 and thence to the chamber 111 below the diaphragm 106 of the inshot valve device 27 via the bushing 281, chamber 277 and passageway 285. It should be noted that flow of fluid under pressure from the passageway 401, which is connected at one end to the passageway 285, to atmosphere is prevented by the removable plug 403 (FIG. 1). Fluid under pressure thus supplied from the control reservoir 4 to the chamber 111 acts over the effective area of the lower side of the diaphragm 106 to deflect this diaphragm upward and, via the diaphragm follower 113 and stem 115, move the inshot valve 116 to its brake release position in which it is shown in FIG. 1A in which position it is effective via the stem 127 to hold the valve 128 unseated from the valve seat 104.

The quick action chamber 16 (FIG. 1A) and the various chambers in the quick service and emergency pilot valve device 20 (FIG. 1), vent valve device 21, high pressure valve device 22, spill-over check valve device 23, back-dump check valve device 24, and back-flow check valve device 25 are charged from the brake pipe 1 in substantially the manner as explained in detail in the hereinbefore-mentioned Patent No. 3,208,801.

Chamber 352 above the diaphragm 350 of the continual quick service valve device 19 is at this time open to atmosphere via passageway 354, quick service volume 17 (FIG. 1A), passageway 132, groove 131 on inshot valve 116, passageway 133, chamber 134 and choke 145. Furthermore, the chamber 352 is vented to atmosphere via the quick service and emergency pilot valve device 20 as shown in FIG. 1.

Fluid under pressure supplied to the quick action chamber 16 (FIG. 1A) flows to the chamber 353 (FIG. 1) below the diaphragm 350 of the continual quick service valve device 19 via the passageway 373, chamber 357, past unseated valve 368 (held unseated at this time by spring 366), bore 356, and passageway 355. Fluid under pressure is supplied from the quick action chamber 16 to the chamber 374 in the continual quick service valve device 19 via the passageway 373 and branch passageway 373c.

After the lapse of a period of time necessary to effect charging of the auxiliary reservoir 3, the control reservoir 4, and the various chambers in the brake control valve device 5 on those cars in the train that are provided with a brake control valve device 5, and also charging of the brake equipment on those cars provided with the well-known AB brake control valve device, the pressure of fluid in the brake pipe 1 will be stabilized by the setting of the self-lapping control valve 410 (FIG. 1) of the brake valve device 6 at a normal value such as, for example, seventy pounds per square inch, preparatory to operation of the brake control valve devices on the cars in the train to effect a brake application.

During such initial charging of the brake control valve device 5, each corresponding brake cylinder device 2 will remain vented to atmosphere via the corresponding pipe and passageway 12, passageway 80, chamber 78 (FIG. 1B), bore 86, passageways 81 and 82 in, and groove 79 on, the valve stem 51, passageway 83, exhaust choke 84, passageway and pipe 14 and retaining valve device 15 (FIG. 1A) which, it will be assumed, is in its non-retaining position. Since each chamber 121 (FIG. 1A) is connected via the passageway 123 in the inshot valve device 116, chamber 122, passageway 124, choke 125 and branch passageway 12a to the corresponding passageway 12, each chamber 121 is also vented to atmosphere.

SERVICE APPLICATION OF THE BRAKES

In effecting a service application of the brakes, initiation of such an application will be effected by the engineer moving the handle 409 (FIG. 1) of the brake valve device 6 from its running position into its application zone to a position corresponding to the degree of brake application desired, whereupon the relay valve device 411 of the brake valve device 6 operates in the manner fully described in detail in hereinbefore-mentioned Patent No. 2,958,561, to effect a reduction in the pressure in the brake pipe 1 at a service rate. In the respective brake control valve devices 5 on those of the first several cars in the trains that are provided with this type of brake control valve device, if some of the first several cars are provided with a brake control valve device 5 rather than an AB brake control valve device, this reduction in pressure in the brake pipe 1 will cause the quick service and emergency pilot valve device 20 to operate in substantially the manner described in detail in Patent No. 3,160,446, issued Dec. 8, 1964, to Glenn T. McClure and assigned to the assignee of the present application, to effect the supply of fluid under pressure from the brake pipe 1 to the quick service volume 17 (FIG. 1A) and the chamber 352 (FIG. 1 instead of to the continual quick service valve device as in Patent No. 3,160,446, to effect a further reduction in brake pipe pressure, or in other words a quick service reduction, which occurs concurrently with the reduction being effected by the engineer's brake valve device 6 on the locomotive.

The effective area of the upper side of the diaphragm 350 subject to quick service volume pressure in chamber 352 is greater than the effective area of the lower side of this diaphragm subject to quick action chamber pressure in chamber 353. Therefore, upon the supply of fluid under pressure to the chamber 352, a differential of pressure as established on the diaphragm 250 to deflect it downward to thereby move the stems 346 and 347 downward.

As stem 346 is thus moved downward, the spring 368a rendered effective to seat the valve 368 on valve seat 369 to close communication between passageways 373 and 355 thereby cutting off the quick action chamber 16 from chamber 353 below the diaphragm 350. As the stem 346 continues to be moved downward subsequent to seating of valve 368 on seat 369, the upper end of this stem 346 is moved downward out of contact with the lower side of the valve 368 whereupon the fluid under pressure in chamber 353 below diaphragm 350 is vented to atmosphere via passageway 355, bore 356, passageway 370, groove 371, and passageway 372.

Susequent to the venting of the fluid under pressure from the chamber 353 to atmosphere, the fluid under pressure in the chamber 352 further deflects the diaphragm 350 downward with a snap action so that the stem 363 quickly moves valve 377 out of seating contact with valve seat 376. When valve 377 is thus unseated, fluid under pressure is vented from a chamber 413 on the lower side of a diaphragm 414 of the quick service and emergency pilot valve device 20 to atmosphere via branch passageway 373b, passageway 373, branch passageway 373c, chamber 374, bore 375, chamber 360 and passageway and port 361 whereupon this valve device 20 operates in the same manner as the quick service and emergency valve device 17 in Patent No. 3,208,801 to cut off the supply of fluid under pressure from the brake pipe 1 to the quick service volume 17 (FIG. 1A) instead of from the brake pipe to the continual quick service valve device as is the case in Patent No. 3,208,801.

Furthermore, the fluid under pressure supplied to the quick service volume 17 will flow therefrom to the chamber 134 (FIG. 1A) above the diaphragm 144 via passageway 132, groove 131 on inshot valve 116 and passageway 133. Fluid under pressure thus supplied to the chamber 134 is effective to promptly deflect the diaphragm 144 downward against the yielding resistance of a spring 415, interposed between the diaphragm follower 149 and the casing 31, and move the interlock valve 150 downward from the position shown in FIG. 1A to a position in which the groove 161 thereon cuts off communication from passageway 137 to passageway 160.

In the lower position of the interlock valve 150, two O-rings 416 carried in two spaced apart peripheral annular grooves on the valve 150 above the groove 161 thereon are disposed one above and the other below the opening of the passageway 160 at the wall surface of the bore 151. Therefore, these O-rings 416 insure that there can be no leakage of fluid under pressure from the passageway 160, which is connected to the control reservoir 4, to the passageway 137, which is connected to the brake pipe 1 in which the pressure is at this time being reduced, until the inshot valve 116 is moved downward from the position shown in FIG. 1A to a second position in which communication is closed between passageway 140 and passageway 139 which is connected to passageway 137.

It will be noted that the chamber 134 is open to atmosphere via choke 145. Therefore, the fluid under pressure supplied to the chamber 134 from the quick service volume 17 will be slowly vented to atmosphere at a rate controlled by the size of the choke 145. It should be understood, however, that the size of the choke 145 is such that sufficient pressure is built up in the chamber 134 to insure that the diaphragm 144 is deflected downward to move the interlock valve 150 promptly to its cut-off position and maintain it in this position until the inshot valve 116 is moved downward from the position shown in FIG. 1A in a manner hereinafter described to its second position in which communication is closed between passageway 140 and passageway 139 which is connected to passageway 137.

The reduction in brake pipe pressure effected by the engineer moving the handle 409 (FIG. 1) of the brake valve device 6 from its running position to a position in its application zone corresponding to the degree of brake application desired, and the reduction in brake pipe pressure effected by operation of the quick service and emergency pilot valve device 20 occurs in the chamber 223 (FIG. 1A) in the direct release valve mechanism 33. As the pressure is thus reduced in the chamber 223 above the diaphragm 221, the control reservoir pressure present in the chamber 222 below the diaphragm is rendered effective to deflect this diaphragm 221 and diaphragm 231 in an upward direction against the yielding resistance of spring 241. Since the inner periphery of this diaphragm 221 is clamped between diaphragm follower 226 having integral therewith stem 227 and diaphragm follower plate 228 having integral therewith cylindrical member 266, the follower 226 and follower plate 228 are moved upward as the diaphragm 221 is deflected upward. This upward movement of the follower plate 228 and cylindrical member 266 is transmitted via the ball bearing 259 and spring 260 to the single cone clutch member 254 having integral therewith the stem 269. Since external clutch face 253 on the single cone clutch member 254 is in clutching contact with the internal clutch face 252 on the double cone clutch member 250, this clutch member 250, the single cone clutch member 254 and stem 269 are moved upward along with the follower 226 and the follower plate 228 in response to the upward deflection of the diaphragm 221. This upward movement of the stem 269 carries with it the nut member 271 and flange 272 integral therewith, cylindrical head 275 carried in the flange 272, and hollow stem 276.

As the stem 276 is thus moved upward, the spring 289 is rendered effective to move valve 288 into seating contact with valve seat 287, it being understood that valve 288 will contact seat 287 prior to contacting the snap ring 290 and prior to the flange 272 contacting the bottom of casing section 218. Upon movement of valve 288 into seating contact with valve seat 287, communication is closed between chamber 282, which is connected to the control reservoir 4 via passageways 286, 224 and 13 and pipe 13, and chamber 277, which is connected to the chamber 111 below diaphragm 106 in the inshot valve device 27 via passageway 285.

As the hollow stem 276 and head 275 continue to be moved upward until the flange 272 contacts the bottom of the casing section 218, the lower end of the hollow stem 276 is moved upward out of contact with the upper side of the now seated valve 288. Upon upward movement of the hollow stem 276 so that its lower end is moved out of contact with the upper side of the valve 288, fluid under pressure is completely vented from the chamber 111 below the diaphragm 106 of the inshot valve device 27 to atmosphere via passageway 285, chamber 277, interior of bushing 281, hollow stem 276, port 271a in nut member 271, chamber 264 and passageway 265 in casing section 218.

Movement of the flange 272 on the lower end of the nut member 271 into contact with the bottom of the casing section 218 prevents further upward movement of this member 271. Therefore, as the brake pipe pressure in the chamber 223 above the diaphragm 221 continues to reduce, subsequent to movement of the flange 272 into contact with the bottom of the casing section 218, the control reservoir pressure present in the chamber 222 below the diaphragm 221 further deflects this diaphragm upward to correspondingly move the diaphragm follower 226 and diaphragm follower plate 228 upward. This upward movement of the follower plate 228 is transmitted via the annular member 248 integral therewith and the clutch face 249 on member 248 to the external clutch face 251 on the double cone clutch member 250 to move this member 250 upward and thereby move the internal clutch face 252 on the clutch member 250 out of clutching contact with the external clutch face 253 on the single cone clutch member 254 which heretofore was prevented from upward movement by reason of the fact that the stem 269 at one end is integral therewith and at the other end has screw-threaded engagement with the now stationary nut member 271.

Upon upward movement of the diaphragm follower plate 228, annular member 248, and double cone clutch member 250 so that the internal clutch face 252 on double clutch member 250 is moved out of clutching contact with the external clutch face 253 on the single cone clutch member 254, this clutch member 254 is supported on the upper plate of the ball bearing element 262 which rests on the shoulder 261 on follower plate 228, and the spring 260 is rendered effective to bias the single cone clutch member 254 in an upward direction and cause this clutch member 254 and stem 269 integral therewith by reason of the non-self-locking type of external screw threads formed on the lowers end of stem 269 and corresponding non-self-locking type of internal screw threads formed in the nut member 271, to rotate or "spin" with respect to the now stationary nut member 271. This rotation or "spinning" of the clutch member 254 and stem 269 by the biasing effect of the spring 260 effects upward or longitudinal movement of the clutch member 254 and stem 269 with respect to the now stationary nut member 271 so that the single cone clutch member 254 follows the upward movement of the double cone clutch member 250, diaphragm follower 226 and follower plate 228 which continues against the yielding resistance of the spring 241 until the brake pipe pressure in the chamber 223 is reduced to a value corresponding to the degree of brake application desired, or, in other words, to the position in its application zone to which the engineer moved the handle 409 (FIG. 1) of the brake valve device 6, and the differential fluid pressure force acting in an upward direction on the diaphragm 221 is balanced by the downwardly acting force of the spring 241. It will be understood that subsequent to the cessation of upward movement of the diaphragm follower 226, diaphragm follower plate 228, annular member 248 and double cone clutch member 250, the spring 260 will continue to rotate or "spin" the single cone clutch member 254 and stem 269 integral therewith with respect to the nut member 271 to move these elements upward until the external clutch face 253 on the single cone clutch member 254 is brought into clutching contact with the internal clutch face 252 on the double cone clutch element 250. From the foregoing it is apparent that the valve 288 is seated by the spring 289 on the seat 287 and the chamber 111 in the inshot valve device 21 is subsequently vented to atmosphere in response to an intial slight upward deflection of the diaphragm 221 in response to the reduction in brake pipe pressure effected in the chamber 223 above the diaphragm 221 at the time a service brake application is made by the engineer moving the handle 409 (FIG. 1) of the brake valve device 6 from its running position to a position in its application zone corresponding to the degree of brake application desired.

The initial withdrawal or reduction of fluid under pressure locally from the brake pipe to the quick service volume on the first car or on those of the first several cars of the train, if these cars are provided with a brake control valve device 5, or the well-known AB control valve device, will cause a sufficient reduction in brake pipe pressure on the immediately succeeding car or cars to cause the respective quick service valve devices on these cars to rapidly propagate such quick action reduction in brake pipe pressure serially through the train from car to car. On each car provided with the brake control valve device 5, by virtue of the value of the spring 114 of the inshot valve device 27, the reduction in brake pipe pressure resulting from filling of the quick service volume 17 and venting to atmosphere through the choke 145, will amount to such as seven and three-quarters pounds per square inch, which reduction is effective in the chamber 49 (FIG. 1B) of the service valve device 29 to correspondingly reduce the pressure in this chamber. Therefore, the higher pressure in the chamber 58, which pressure is the same as that in the control reservoir 4, will deflect the diaphragm 53 in an upward direction. Since the valve stem 51 and the diaphragm follower 52 are integral, this upward deflection of the diaphragm 53 will move the valve stem 51 upward and cause the upper end of the valve stem 51 to first contact the bottom face of the valve 97 to close communication between the chamber 78 and atmosphere via passageway 81, passageway 82, groove 79, passageway 83, brake cylinder exhaust choke 84 (FIG. 1A), passageway and pipe 14, and retaining valve device 15. As the stem 51 continues to be moved upward, the valve 97 will be unseated from the annular valve seat 87. By unseating of the valve 97, fluid under pressure from the auxiliary reservoir 3 (FIG. 1A) is permitted to flow by way of the pipe and passageway 11, branch passageway 11a, service choke 98 and passageway 99 to the chamber 100. Fluid also flows from the passageway 11 at an unrestricted rate through the passageway 47 to the chamber 100. Fluid under pressure thus supplied from the auxiliary reservoir 3 to the chamber 100 flows from this chamber through the passageway 101 to the chamber 85 (FIG. 1B), thence past the now unseated valve 97 and through the bore 86 to the chamber 78 from which it flows through the passageway 80 and passageway and corresponding pipe 12 to the brake cylinder device 2 to provide a fast build-up of brake cylinder pressure until the pressure supplied from the passageway 12 via the branch passageway 12a, choke 125, passageway 124, chamber 122, passageway 123 in the inshot valve 116 to the chamber 121 is increased sufficiently (for example, approximately ten pounds per square inch) to deflect the diaphragm 105 and 106 downward against the yielding resistance of the spring 114 and thereby move the inshot valve 116 downward far enough for the spring 129 to move the valve 128 downward into contact with the valve seat 104. After the valve 128 is thus seated on the valve seat 104, further build-up of brake cylinder pressure is controlled at a slower rate by flow from the auxiliary reservoir 3 via pipe and passageway 11, branch passageway 11a, service choke 98, passageway 99, chamber 100, passage 101, chamber 85, past the annular valve seat 87, through bore 86, to chamber 78, and thence through passageway 80 and passageway and corresponding pipe 12 to the brake cylinder device 2. Thus a fast build-up of brake cylinder pressure is followed at a slower rate of build-up of brake pipe pressure controlled by the size of the choke 98.

At the time the inshot valve 116 is moved to its lower position in response to the supply of brake cylinder pressure to the chamber 121, the groove 131 on the inshot valve 116 is moved to a position in which communication is closed between the passageway 132 and the passageway 133 since the two O-rings 142 on the upper side of the groove 131 are now disposed one above and the other below the opening of the passageway 132 at the wall surface of the bore 117. This terminates initial quick service activity. Therefore, these O-rings 142 insure that there can be no leakage of fluid under pressure from the passageway 132 and the quick service volume 17 to the passageway 133 and thence to the chamber 134 subsequent to movement of the inshot valve 116 to its lower position at which time chamber 134 is open to atmosphere via choke 145.

Also, at the time the inshot valve 116 is moved from the position shown in FIG. 1A of the drawings to its lower position, the groove 138 thereon is moved to a position in which communication is closed between passageways 140 and 139, the groove 135 thereon is moved to a position in which communication is closed between the passageways 137 and 136, and the groove 131 thereon is moved to a position in which it establishes a communication between the passageways 136 and 133. In this lower position of the inshot valve 116, the O-ring 142 adjacent the lower end of the groove 131 thereon is disposed below the opening of the passageway 136 at the wall surface of the bore 117 and forms a seal with this wall surface to prevent leakage of fluid under pressure between the passageways 136 and 137. Since the O-ring 142 adjacent the upper end of the groove 131 on the inshot valve 116 forms a seal with the wall surface of the bore 117 above the location at which the passageway 133 opens at the wall surface of this bore, a communication is established by the groove 131 between the passageways 136 and 133 and no fluid under pressure can flow from either of these passageways along the inshot valve 116 between the periphery thereof and the wall surface of the bore 117 to the groove 135 on the inshot valve 116 or to the passageway 132.

Since the groove 131 on the inshot valve 116 in the lower position thereof establishes a sealed communication between the passageways 136 and 133, fluid under pressure will now be vented from the chamber 212 (FIG. 1B) below the diaphragm 207 of the locking mechanism 153 to atmosphere via passageways 214 and 308, bore 293, passageway 305 and cross passageway 306 in valve 302 and groove 303 on this valve, passageways 307 and 136, groove 131 (FIG. 1A) on inshot valve 116, passageway 133, chamber 134 and choke 145 until the pressure in the chamber 212 (FIG. 1B) and chamber 134 (FIG. 1A) is reduced to atmospheric pressure.

As the pressure in the chamber 212 below diaphragm 207 is reduced to atmospheric pressure in the manner just explained, the spring 204 is rendered effective, via the ball bearing element 205 and by reason of the non-self-locking type of internal threads in the movable cone type clutch element 203 and the same type of external threads 202 on the lower portion of the stem 195, to rotate or "spin" the clutch element 203 so that it moves downward along the threads 202 until it is moved into clutching contact with the stationary conical surface 206 on the casing section 200. It will be understood from FIG. 1B that the movable cone type clutch element 203 is supported on the upper plate of the ball bearing element 216 and is interposed between this upper plate and the lower plate of the ball bearing element 205 which construction enables the spring 204 to "spin" the clutch element 203 on the threads 202 and simultaneously move this clutch element 203, the ball bearing elements 205 and 216, and the diaphragm follower 209 downward to deflect the diaphragm 207 downward as fluid under pressure is vented from the chamber 212 to atmosphere until the clutch element 203 moves into clutching contact with the stationary conical surface 206 to thereby lock the stem 195 against downward movement as a result of a subsequent reduction in control reservoir pressure in the chamber 193 below the diaphragm 192 caused by leakage of fluid under pressure from the control reservoir 4. By thus locking the stem 195 and thereby the diaphragm follower 189 diaphragm follower plate 190 and diaphragm 192 against movement the original compression of the control spring 186 of the self-lapping valve device 152 by fully charged control reservoir pressure acting in chamber 193 on the effective area of the diaphragm 192 is maintained notwithstanding any leakage of fluid under pressure from the control reservoir 4 that may occur while a brake application is in effect.

As the pressure in the chamber 134 (FIG. 1A) is reduced to atmospheric pressure by flow from this chamber to atmosphere via the choke 145, the spring 415 will be rendered effective to return the diaphragm 144 and the interlock valve 150 to the position shown in FIG. 1A of the drawings.

Fluid under pressure supplied to the brake cylinder device 2 (FIG. 1A) in the manner described above increases the pressure in the chamber 78 (FIG. 1B) and is effective to establish a force that acts in a downward direction on the upper side of diaphragm 74. Upon this force slightly exceeding the force acting upward on the diaphragm 53, as a result of the reduction in pressure in the chamber 49 caused by the reduction in brake pipe pressure, the valve stem 51 will be moved downward until the spring 102 acting through the piston 93 seats the valve 97 on the seat 87. This cuts off flow of fluid under pressure from the auxiliary reservoir 3 to the brake cylinder device 2.

Therefore, after the pressure of fluid in the brake pipe 1 becomes stabilized at a value determined by the position in its application zone to which the engineer moves the handle 409 (FIG. 1) of the brake valve device 6 on the locomotive, the supply of fluid under pressure from the auxiliary reservoir 3 (FIG. 1A) to the brake cylinder device 2 on each particular car provided with a brake control device 5 will be terminated. This seating of the valve 97 (FIG. 1B) on the valve seat 87 is effective to hold the desired pressure of fluid in passageway 80 and hence in the brake cylinder device 2.

It will be understood that each well-known AB brake control valve device on those cars in the train so equipped will supply fluid under pressure from its corresponding auxiliary reservoir to its corresponding brake cylinder device to a degree in accordance with the reduction in the brake pipe pressure effected and then move to a lap position.

The degree of brake application on all cars in the train can now be increased by the engineer moving the handle 409 (FIG. 1) farther into its application zone to a position corresponding to the degree of reduction of train brake pipe pressure desired. The brake control valve devices 5 and the AB control valve devices on the cars in the train operate in response to this additional reduction in train brake pipe pressure in the manner hereinbefore explained to increase the pressure in the corresponding brake cylinder devices, to a degree in accordance with the reduction in pressure effected in the train brake pipe.

From the foregoing, it will be apparent that any particular degree of brake cylinder pressure may be supplied to each brake cylinder device 2 by operation of the service valve device 29 of the corresponding brake control valve device 5 according to the degree of reduction in brake pipe pressure effected relative to control reservoir pressure, either initially or in subsequent graduated steps, up to a maximum brake cylinder pressure, such as 50 pounds per square inch, as determined by an equalization of the pressure in each auxiliary reservoir 3 with that in the corresponding brake cylinder device 2 and corresponding to a reduction in brake pipe pressure to a full service value of such as 50 pounds per square inch.

Let it be supposed that the brake control valve device 5 has operated in the manner described above to effect the supply of fluid under pressure from the auxiliary reservoir 3 (FIG. 1A) to the brake cylinder device 2 to cause a brake application, and that the service valve device 29 (FIG. 1B) of the brake control valve device has moved to a lap position in which the valve 97 is seated on the valve seat 87 to close communication between the auxiliary reservoir 3 (FIG. 1A) and the brake cylinder device 2, and is also seated on the upper end of the valve stem 51 to close communication between the brake cylinder device 2 and atmosphere.

Furthermore, let it now be supposed that, while the service valve device 29 of the brake control valve device 5 is in its lap position and the brakes on a car provided with the brake control valve device 5 are applied, the pressure in the control reservoir 4 is reduced as the result of leakage of fluid under pressure therefrom. As the pressure in the control reservoir 4 (FIG. 1A) reduces as the result of leakage of fluid under pressure therefrom, the pressure in: (1) the chamber 58 (FIG. 1B) below the diaphragm 53 of the service valve device 29, (2) the chamber 193 below the diaphragm 192, (3) the chamber 157 above the diaphragm 156 of the self-lapping valve device 152, and (4) the chamber 222 (FIG. 1A) below the diaphragm 221 of the direct release valve mechanism 33 is likewise reduced since each of these chambers is supplied with fluid under pressure from the control reservoir 4. This reduction in pressure in the chamber 58 (FIG. 1B) below the diaphragm 53 of the service valve device 29 would cause this valve device to operate to effect a release of fluid under pressure from the brake cylinder device 2 were this reduction in pressure in chamber 58 not compensated for by the supply of fluid under pressure from the control reservoir 4 to the chamber 71 below the diaphragm 56 of the service valve device 29 in a manner now to be described to maintain a constant force on the diaphragm stack comprising the diaphragm 53 and 56 of the service valve device 29.

Likewise, this reduction in pressure in the chamber 222 (FIG. 1A) below the diaphragm 221 of the direct release valve mechanism 33 would cause this valve mechanism to operate to supply fluid under pressure from the control reservoir 4 to the chamber 111 of the inshot valve device 27 to effect operation of valve device 27 to cause an undesired release of the brake application were this reduction in pressure in the chamber 222 not compensated for by the supply of fluid under pressure from the control reservoir 4 to the chamber 230 below the diaphragm 231 of the direct release valve mechanism 33.

The reduction in pressure in the chamber 193 (FIG. 1B) below the diaphragm 192 of the self-lapping valve device 152 causes no downward deflection of this diaphragm by the control spring 186 since the stem 195 and diaphragm follower 189 integral therewith have been locked against movement in the manner hereinbefore described.

As the pressure in the chamber 157 above the diaphragm 156 of the self-lapping valve device 152 reduces as the result of leakage of fluid under pressure from the control reservoir 4, the control spring 186 is rendered effective to, via the spring seat 187, stem 171, diaphragm follower 170 integral with stem 171, and diaphragm follower plate 172, to deflect the diaphragm 156 upward. Since the stem 169 is integral with the diaphragm follower 170, this stem 169 will be moved upward by the control spring 186 simultaneously as the diaphragm 156 is deflected upward. As the stem 169 is thus moved upward, the upper end thereof will be moved into sealing contact with the lower side of valve 183 to thereby close communication between the passageway 185 and atmosphere via the bore 178, hollow stems 169 and 171, the central bore in the spring seat 187, chamber 158 and passageway 159. Since the passageway 185 is connected to: (1) the chamber 71 below the diaphragm 56 of the service valve device 29 via the passageway 167, (2) the chamber 230 (FIG. 1A) below the diaphragm 231 of the direct release valve mechanism 33 via passageways 167 and 233, and (3) the chamber 166 above the diaphragm 164 of the self-lapping valve device 152 via the passageway 167 and choke 168, communication is likewise closed between these chambers 71, 230 and 166 and atmosphere.

As the stem 169 continues to be moved upward by the control spring 186, subsequent to movement of the upper end of this stem into sealing contact with the lower side of the valve 183, this valve 183 will be lifted by the stem 169 out of contact with its seat 182. Since the chamber 179 is supplied with fluid under pressure from the control reservoir 4 (FIG. 1A) via pipe and passageway 13, passageways 224 and 300, groove 298 (FIG. 1B) on valve 296 of brake cylinder release valve device 34, and passageways 299, 160 and 181, fluid under pressure will now flow from the control reservoir 4 and the chamber 179 past the valve seat 182 and thence to the chamber 71 below the diaphragm 56 of the service valve device 29 via bore 178 and passageways 185 and 167. The passageway 167 is connected to the chamber 166 above the diaphragm 164 of the self-lapping valve device 152 via the choke 168 and to the chamber 230 (FIG. 1A) below the diaphragm 231 of the direct release valve mechanism 33 via the passageway 233. Therefore, fluid under pressure will also flow from the control reservoir 4 and chamber 179 to the chamber 166 at a restricted rate controlled by the size of the choke 168 and to the chamber 230 at an unrestricted rate.

Fluid under pressure supplied from the control reservoir 4 and chamber 179 to the chamber 166 above the diaphragm 164 of the self-lapping valve device 152 via the choke 168 increases the pressure in this chamber 166 to establish a fluid pressure force which acts in a direction to deflect the diaphragms 164 and 156 downward against the yielding resistance of the control spring 186. As the diaphragms 164 and 156 are thus deflected downward by the increase in pressure in the chamber 166, the stem 169, which is operatively connected to these diaphragms, is moved downward. As the stem 169 is thus moved downward, the spring 184 is rendered effective to move the valve 183 downward until it seats on valve seat 182 which cuts off further flow of fluid under pressure from the control reservoir 4 to the chambers 166, 71 and 230. Accordingly, it is apparent from the foregoing that as the pressure in the chambers 58, 157, 193 and 222 is reduced as a result of leakage of fluid under pressure from the control reservoir 4, the self-lapping valve device 152 operates in response to this reduction of control reservoir pressure to supply fluid under pressure from the control reservoir 4 to the chamber 71 below the diaphragm 56 of the service valve device 29 to maintain a constant force on the diaphragm stack comprising the diaphragms 56 and 53 to prevent operation of the service valve device 29 to effect a brake release, and to the chamber 230 (FIG. 1A) below the diaphragm 231 of the direct release valve mechanism 33 to maintain a constant force on the diaphragm stack comprising the diaphragm 221 and 231 to prevent operation of the direct release valve mechanism 33 to supply fluid under pressure from the control reservoir 4 to the chamber 111 below the diaphragm 106 of the inshot valve device 27 to cause this valve device to operate to effect a brake release. Therefore, any leakage of fluid under pressure from the control reservoir 4 subsequent to effecting a brake application is ineffective to cause a release of the brake application and the brakes remain applied to the degree desired notwithstanding the occurrence of leakage of fluid under pressure from the control reservoir 4 while the brake application is in effect.

DIRECT RELEASE OF THE BRAKES AFTER A SERVICE BRAKE APPLICATION

To effect a direct release of the brakes on the entire train following a service brake application thereon, the engineer will move the handle 409 (FIG. 1) of the brake valve device 6 directly and quickly from whatever position it occupies in its application zone in the direction of its running position back to this position. When the handle 409 is thus returned to its running position, the brake valve device 6 operates in the manner described in hereinbefore-mentioned Patent No. 3,208,801 to effect the supply of fluid under pressure from the main reservoir 407 to the train brake pipe that extends from car to car through the train at the usual normal rate.

If the first car or several cars in the train are provided with a brake control valve device 5, the fluid under pressure supplied by the brake valve device 6 at the usual normal rate will flow to the brake pipe 1 on each of these cars and thence via pipe and passageway 10, brake pipe strainer 26 (FIG. 1), passageway 42 and a passageway 417 to a chamber 418 above the diaphragm 414 in the quick service and emergency pilot valve device 20. This usual normal rate of supply of fluid under pressure to the chamber 418 above the diaphragm 414 is enough in excess of the rate at which fluid under pressure can flow to the chamber 413 below this diaphragm via the passageway 417, a passageway 419, and a choke 420 disposed in this passageway 419 which is connected at one end to the branch passageway 373b intermediate the ends thereof which branch passageway opens into the chamber 413, to quickly establish a differential of pressure of approximately one and one-half pounds per square inch in the chamber 418 in excess of the pressure in the chamber 413. This differential of pressure is effective to deflect the diaphragm 414 downward until a diaphragm follower plate 421, between which and a diaphragm follower 422 the inner periphery of the diaphragm 414 is clamped by any suitable means (not shown), contacts the upper end of the piston valve 391 after which this piston valve will be moved downward simultaneously with further downward deflection of the diaphragm 414. This downward deflection of the diaphragm 414 causes the stem 393 on the lower end of the piston valve 391 to move the valve 380 of the back-dump check valve device 24 against the yielding resistance of the spring 390 away from the valve seat 389 to thereby establish a communication between the chamber 381 and the interior of the counterbore 388.

It will be noted that in this lower position of the piston valve 391 the two spaced-apart O-rings 405 carried thereon above the groove 400 are disposed one above and the other below the opening of the passageway 402 at the wall surface of the bore 387 to thus form a seal that cuts off passageway 401 from the passageway 402. It will be further noted that in this lower position of the piston valve 391, the groove 400 thereon establishes a communication between the passageway 401 and the passageway 404 that at its lower end opens at the wall surface of the counterbore 388.

The control reservoir 4 (FIG. 1A) is connected to the chamber 381 (FIG. 1) via pipe and passageway 13 (FIG. 1A), passageway 386 (FIG. 1), chamber 384, and passageway 385. Therefore, when the valve 380 is unseated from valve seat 389, in the manner just explained, fluid under pressure fluid will flow from the control reservoir 4 and chamber 381 to the interior of the counterbore 388.

Part of the fluid under pressure supplied to the interior of the counterbore 388 will flow therefrom to the chamber 111 (FIG. 1A) below the diaphragm 106 of the inshot valve device 27 via passageway 404 (FIG. 1), groove 400 on piston valve 391 now in its lower position, passageway 401 and passageway 285 (FIG. 1A), and part of the fluid under pressure supplied to the interior of the counterbore 388 (FIG. 1) will flow therefrom to a chamber 423 formed in the casing section 382 via a passageway 424 that at one end opens at the wall surface of the counterbore 388 and at the opposite end into the chamber 423.

The fluid under pressure supplied to the chamber 111 (FIG. 1A) in the manner just explained acts on the effective area of the lower side of the diaphragm 106 which effective area is greater than the effective area of the upper side of the diaphragm 105 which is subject to brake cylinder pressure in chamber 121. Consequently, the fluid under pressure supplied to the chamber 111 establishes a differential fluid pressure force which acts in an upward direction and is effective to move the inshot valve 116 from its lower position to its upper position in which it is shown in FIG. 1A.

The fluid under pressure supplied to the chamber 423 (FIG. 1) in the manner explained above will move a flat disc-type valve 425 of the back-flow check valve device 25 against the yielding resistance of a spring 426 away from an annular valve seat 427 to establish a communication between the chamber 423 and a chamber 428 formed by the cooperative relation of the casing section 382 and the cover 383. Fluid under pressure in the chamber 423, which is being supplied thereto from the control reservoir 4, as just explained, will now flow to the chamber 428, into which opens one end of a passageway 429 the opposite end of which is connected to the passageway 419 intermediate the ends thereof and on the brake pipe side of the choke 420, and thence from this chamber 428 to the chamber 49 (FIG. 1B) of the service valve device 29 via passageways 429, 419, 417, 42, 41 (FIG. 1A) and 62 (FIG. 1B), and also from the passageway 42 (FIG. 1) to the brake pipe 1 (FIG. 1A) via the brake pipe strainer 26 (FIG. 1) and passageway and pipe 10 (FIG. 1A) until the pressures in the control reservoir 4, the chambers 179, 157, 193, 49 and 58 (FIG. 1B), and the brake pipe 1 (FIG. 1A) on the first car or several cars provided with the brake control valve device 5 equalize.

Upon the return of the inshot valve 116 (FIG. 1A) to its upper position in the manner explained above, fluid under pressure will flow from the brake pipe 1 to the chamber 212 (FIG. 1B) below the diaphragm 207 of the locking mechanism 153 via the pathway hereinbefore explained in detail in connection with the initial charging of the equipment whereupon the movable cone clutch element 203 is moved upward in a manner also previously described in detail out of clutching contact with the stationary conical surface 206 to effect unlocking of the stem 195, the unlocking of the stem 195 being necessary in order that a complete and direct release of the brakes can be effected by operation of the service valve device 29 as hereinbefore explained.

Since the stem 195 is now unlocked, if there be any fluid under pressure in the chamber 166 in the self-lapping valve device 152, this pressure in the chamber 166 is rendered effective to deflect the diaphragm stack comprising the diaphragms 164, 156 and 192, the spring 186 and the stem 195 downward to a position in which the diaphragm follower 172 abuts the stop 31a formed integral with the casing section 31. This downward deflection of the diaphragm stack moves the hollow stem 169 downward so that the upper end thereof is moved out of sealing contact with the lower side of the valve 183 which at this time is seated on the valve seat 182 by the spring 184. When the upper end of the hollow stem 169 is moved downward out of seating contact with the lower side of valve 183, if any fluid under pressure is present in the chamber 71 below the diaphragm 56 of the service valve device 29 it will flow to atmosphere via passageways 167 and 185, bore 178, hollow stems 169 and 171, hollow spring seat 187, chamber 158 and passageway 159.

The chamber 230 (FIG. 1A) in the direct release valve mechanism 33 is connected to the passageway 167 (FIG. 1B) via the passageway 233 and the chamber 166 in self-lapping valve device 152 is connected to the passageway 167 via the choke 168. Therefore, fluid under pressure will be vented from chambers 230 and 166 to atmosphere simultaneously as fluid under pressure is vented from the chamber 71.

Therefore, upon equalization of pressures in the chambers 49 and 58 (FIG. 1B) on the opposite sides of the diaphragm 53 of the service valve device 29 in the manner explained above, the spring 60 and the brake cylinder pressure present in chamber 78 will move the stem 51 downward to the position shown in FIG. 1B. Upon downward movement of the stem 51 to this position, the upper end thereof is moved away from the lower side of the now seated valve 97 whereupon fluid under pressure flows from the brake cylinder device 2 (FIG. 1A) to atmosphere via pipe and passageway 12, passageway 80, chamber 78 (FIG. 1B), bore 86, passageways 81 and 82 in and groove 79 on stem 51, passageway 83, brake cylinder exhaust choke 84 (FIG. 1A), passageway and pipe 14 and retaining valve device 15. Since the chamber 121 in the inshot valve device 27 is connected to the passageway 12 via the passageway 123 in the inshot valve 116, chamber 122, passageway 124, choke 125 and branch passageway 12a, the chamber 121 will be vented to atmosphere simultaneously with the brake cylinder device 2. Since the inshot valve 116 has been previously moved to its upper position prior to venting fluid at brake cylinder pressure from the chamber 121, the venting of fluid under pressure from this chamber is without effect at this time.

From the foregoing it is apparent that, upon equalization of pressure on opposite sides of the diaphragm 53 (FIG. 1B) of the service valve device 29 of the brake control valve device 5 on the first car or several cars in the train which, as has been assumed, are provided with this type of brake control valve device, an accelerated direct release of the brakes is effected on these cars since fluid under pressure is completely released from the corresponding brake cylinder device 2 to atmosphere at a rate controlled by the size of the brake cylinder exhaust choke 84.

The fluid under pressure supplied from the control reservoir 4 to the brake pipe 1 on the first car next to the locomotive and provided with a brake control valve device 5 will flow from the brake pipe on this car to the next car farther back in the train from the locomotive. This supply of fluid under pressure to the brake pipe on the next car farther back from the locomotive will hasten the increase in the pressure in the brake pipe on that car and, therefore, the release operation of the brake control valve device thereon, whether it be of the type such as the brake control valve device 5 shown in FIGS. 1, 1A and 1B of the drawings or of the type such as the well-known AB brake control valve device, to release the brakes on this adjacent car more remote from the locomotive. It will be noted, however, if the next car or several cars are equipped with the well-known AB brake control valve device, they will not operate to effect the supply of fluid under pressure from the corresponding emergency reservoir to the brake pipe, since the AB brake control valve devices are not provided with means for supplying fluid under pressure from the corresponding emergency reservoir to the brake pipe when releasing the brakes subsequent to a service brake application. Consequently, a quick release of the brakes will not run through the train from car to car from the locomotive to the last car when effecting a release of the brakes subsequent to a service brake application.

It should be understood that if the first several cars in the train are each provided with an AB brake control valve device which is not provided with a valve device for supplying fluid under pressure from the corresponding emergency reservoir to the brake pipe upon an increase in brake pipe pressure at the usual normal rate, then the flow of fluid under pressure from the brake pipe 1 to the chamber 418 (FIG. 1) in the quick service and emergency pilot valve device 20 on those cars in the train that are provided with a brake control valve device 5, but are located farther back in the train than the first several cars that are provided with an AB brake control valve device, is not at a sufficiently rapid rate in excess of the rate at which fluid under pressure may flow to the chamber 413 below the diaphragm 414 via the choke 420 to establish a differential pressure of approximately one and one half pounds per square inch in the chamber 418 in excess of the pressure in the chamber 413 to effect operation of each quick service and emergency pilot valve device 20 in the manner hereinbefore described to supply fluid under pressure from the corresponding control reservoir 4 to the corresponding chamber 49 (FIG. 1B) and brake pipe 1 to effect an accelerated direct release of the brakes on these cars.

Such fluid under pressure as is supplied to the brake pipe on the first car in the train at the hereinbeforementioned usual normal rate will flow to the brake pipe 1 on each car in the train that is provided with a brake control valve device 5 and located farther back in the train than the first car provided with an AB brake control valve device. The fluid under pressure supplied to the brake pipe 1 on each of these cars will flow therefrom at a rate that is less than the usual normal rate via pipe and passageway 10 (FIG. 1A), brake pipe strainer 26 (FIG. 1), the passageways 42, 41 (FIG. 1A), 62 and 225 to the chamber 223 above the diaphragm 221 of the direct release valve mechanism 33 to increase the pressure in the chamber 223 as the pressure in the brake pipe 1 increases.

It will be remembered that when the service brake application was effected, the diaphragm 221 was deflected in an upward direction against the yielding resistance of the spring 241 until the combined downward force exerted by the spring 241 and the reduced brake pipe pressure present in the chamber 223 balanced the combined upward force exerted by the control reservoir pressure present in the chamber 222 and acting on the effetcive area of the lower side of the diaphragm 221, and the pressure present, if there be any, in the chamber 230 and acting on the effective area of the lower side of the diaphragm 231. Therefore, when fluid under pressure flows from the brake pipe 1 to the chamber 223 above the diaphragm 221, subsequent to the engineer moving the handle 409 (FIG. 1) of the brake valve device 6 to its running position, the pressure in this chamber 223 (FIG. 1A) is increased. As the pressure in the chamber 223 is thus increased, it, in conjunction with the force of the spring 241, establishes a force acting in a downward direction on the diaphragm 221 that exceeds the combined fluid pressure forces acting in an upward direction as a result of the control reservoir pressure present in the chamber 222 acting in an upward direction on the lower side of diaphragm 221 and the pressure in the chamber 230 acting in an upward direction on the lower side of diaphragm 231. Consequently, as the pressure in the chamber 223 increases, the diaphragm 221 will be deflected downward to correspondingly move the diaphragm follower 226 and diaphragm follower plate 228 having integral therewith annular member 248 downward.

Since the spring 257 is effective via the ball bearing element 256 to bias the external clutch face 251 on the double cone clutch element 250 into clutching contact with the clutch face 249 on the annular member 248, and the spring 260 is effective to bias the external clutch face 253 on the single cone clutch member 254 against the internal clutch face 252 on the clutch element 250, the stem 269, the upper end of which is integral with the single cone clutch element 254, and nut member 271 will be moved downward simultaneously with the diaphragm follower 226 and diaphragm follower plate 228 until the flange 272 on the nut member 271 abuts the bottom of the counterbore 412. The cylindrical head 275 integral with the upper end of the hollow stem 276 is carried within the semi-circular recess 273 in the flange 272. Therefore, as the flange 272 is moved downward until it abuts the bottom of the counterbore 412, the hollow stem 276 is likewise moved downward until the lower end thereof contacts the upper side of the valve 288 to close communication between the chamber 277 and atmosphere, after which further downward movement of the stem 276 effects unseating of the valve 288 from the valve seat 287.

The chamber 282 is connected to the control reservoir 4 via passageways 286, 224, and 13, and pipe 13. Therefore, upon unseating of valve 288 from valve seat 287 in the manner just described, fluid under pressure from the control reservoir 4 and chamber 282 flows to the chamber 277 via bushing 281 and thence to the chamber 111 below the diaphragm 106 of the inshot valve device 27 via the passageway 285.

The effective area of the lower side of the diaphragm 106 is greater than the effective area of the upper side of the diaphragm 105 which at this time is subject to brake cylinder pressure in the chamber 121. Therefore, the fluid under pressure supplied from the control reservoir 4 to the chamber 111 below the diaphragm 106 establishes a fluid pressure force acting in an upward direction on the effective area of the diaphragm 106 that exceeds the fluid pressure force acting in a downward direction on the effective area of the diaphragm 105, and this preponderance of force effects upward deflection of the diaphragms 106 and 105 to move the inshot valve 116 from its lower position to its upper position in which it is shown in FIG. 1A before there is any release of fluid under pressure from the brake cylinder device 2 and the chamber 121 above the diaphragm 105.

Since the interlock valve 150 has already been moved to its upper position shown in FIG. 1A, as hereinbefore described, when the inshot valve 116 is returned to its upper position in which it is shown in FIG. 1A, fluid under pressure will flow from the brake pipe 1 to the chamber 212 (FIG. 1B) in the locking mechanism 153 via pipe and passageway 10 (FIG. 1A), strainer device 26 (FIG. 1), passageways 42 and 41, branch 41a (FIG. 1A), choke 141, passageway 140, groove 138 on inshot valve 116, passageways 139 and 137, groove 135 on inshot valve 116, passageways 136 and 307 (FIG. 1B), groove 303 on and passageways 306 and 305 in valve 302 of brake cylinder release valve device 34, bore 293, passageway 308 and passageway 214.

When fluid under pressure is thus supplied from the brake pipe 1 to the chamber 212, the pressure therein increases to deflect the diaphragm 207 of the locking mechanism 153 upward against the yielding resistance of the spring 204 to lift the cone clutch element 203 out of clutching contact with the stationary conical surface 206 in the manner hereinbefore described in detail to thereby unlock stem 195.

Subsequent to movement of the cone clutch element 203 out of clutching contact with conical surface 206, the spring 186 deflects diaphragm 192 downward to move the diaphragm follower plate 190, diaphragm follower 189 and stem 195 downward to cause rotation or "spinning" of the clutch element 203 on the nonself-locking type of screw threads 202 formed on the lower end of the stem 195 until the downwardly acting force of the spring 186 is balanced by the upwardly acting force resulting from the reduced control reservoir pressure acting in the chamber 193 on the effective area of the diaphragm 192. It will be understood that the control reservoir pressure is now less than its normal fully charged value as a result of leakage of fluid under pressure from the control reservoir 4 occurring while the service brake application was in effect and also as the result of flow of fluid under pressure from the control reservoir to the brake pipe which flow occurs while effecting the release of a service brake application in a manner hereinafter described in detail.

As the spring 186 expands in the manner just described as a result of unlocking the stem 195, the force exerted by this spring on the diaphragm 156 of the self-lapping valve device 152 is reduced whereupon the reduced control reservoir pressure present in the chamber 157 above the diaphragm 156 in cooperation with the pressure in the chamber 166 above the diaphragm 164, if there be any therein, deflects the diaphragms 156 and 164 downward to move the hollow stem 169 downward so that the upper end thereof is moved out of sealing contact with the lower side of the now seated valve 183.

Fluid under pressure will now be vented from the chambers 71, 230 and 166 to atmosphere via the pathway hereinbefore described in detail and these chambers will remain open to atmosphere.

From the foregoing, it is apparent that after the stem 195 is unlocked in response to the supply of fluid under pressure from the brake pipe 1 to the chamber 212 in the locking mechanism 153, the self-lapping valve device 152 operates to completely vent fluid under pressure from the chambers 230, 71 and 166 to atmosphere.

When the inshot valve 116 is moved upward to the position shown in FIG. 1A in the manner previously explained, fluid under pressure will flow from the control reservoir 4 to the brake pipe 1 via pipe and corresponding passageway 13, passageways 224 and 300 (FIG. 1B), groove 298 on valve 296 of brake cylinder release valve device 34, passageways 299 and 160, groove 161 (FIG. 1A) on the interlock valve 150, passageways 137 and 139, groove 138 on the inshot valve 116, passageway 140, choke 141, branch 41a, passageways 41 and 42 (FIG. 1), strainer device 26 and passageway and corresponding pipe 10. Fluid under pressure will also flow from the passageway 41 to the chamber 49 (FIG. 1B) above the diaphragm 53 of the service valve device 29 via passageway 62.

Consequently, fluid under pressure will flow from the control reservoir 4 to the chamber 49 and to the brake pipe 1 until the pressure in the control reservoir 4, the chambers 193, 157 and 179 in the self-lapping valve device 52 connected to the control reservoir 4, the chambers 49 and 58 in the service valve device 29 and the brake pipe 1 quickly equalize at a rate determined by the size of the choke 141.

It will be remembered that fluid under pressure is being concurrently vented from the chamber 71 below the diaphragm 56, if there be any therein, in the service valve device 29 in the manner previously explained. Therefore, upon equalization of pressure in the chambers 49 and 58 on the opposite sides of the diaphragm 53 in the service valve device 29 of the brake control valve device 5 on each car in the train that is located farther back from the locomotive than the first car or several cars that are provided with an AB brake control valve device, the corresponding spring 60 will move the diaphragm stack comprising diaphragms 53, 56, and 74, and the stem 51 downward to the position shown in FIG. 1B in which the upper end of the stem 51 is moved out of sealing contact with the lower side of valve 97. Upon movement of the stem 51 downward to the position shown in FIG. 1B, fluid under pressure will be completely vented from the brake cylinder device 2 (FIG. 1A) to atmosphere via the pathway hereinbefore traced in detail thereby effecting a direct and complete release of fluid under pressure from the corresponding brake cylinder device 2. Since the chamber 121 is connected to the passageway 12 via the passage 123 in the inshot valve 116, chamber 122, passageway 124, choke 125 and branch 12a, the chamber 121 will be vented to atmosphere simultaneously with the brake cylinder device 2. However, this venting of fluid under pressure from the chamber 121 is without effect since the inshot valve 116 has already been moved upward to the position shown in FIG. 1A in the manner previously explained.

It will be apparent from what has been said above that upon increasing the pressure in the train brake pipe subsequent to a service brake application, the direct release valve mechanism 33 (FIG. 1A) on each car in the train that is provided with a brake control valve device 5 operates on a slight increase in brake pipe pressure, such as two or three pounds per square inch above the reduced brake pipe pressure to connect the control reservoir 4 via the choke 141 and the passageway 62 to the chamber 49 to cause the service valve device 29 (FIG. 1B) to operate to effect a direct and complete release of fluid under pressure from the brake cylinder device (FIG. 1A) on each car in the train that is equipped with a brake control valve device 5.

As the supply of fluid under pressure to the train brake is continued by the brake valve device 6 (FIG. 1) located on the locomotive, the brake control valve devices 5 on those cars equipped with this type of brake control valve device, and those other cars in the train equipped with the well-known AB brake control valve device will all operate to effect a direct release of the brakes on each car in the train, after which the control and auxiliary reservoirs on all the cars will be charged to the normal fully charged pressure which may be for example, seventy pounds per square inch.

EMERGENCY APPLICATION OF BRAKES

In effecting an emergency application of the brakes, the handle 409 of the engineer's brake valve device 6 (FIG. 1) on the locomotive will be moved to its emergency position to cause an emergency rate of reduction in the pressure in the train pipe extending from the locomotive back through all the cars in the train.

On those cars in the train equipped with a brake control valve device 5 shown in FIGS. 1, 1A and 1B of the drawings, this reduction in brake pipe pressure at an emergency rate will cause the service application valve device 29 to operate in the manner hereinbefore described in detail to supply fluid under pressure from the corresponding auxiliary reservoir 3 (FIG. 1A) to the corresponding brake cylinder device 2.

The emergency application portion 9 (FIG. 1) of each of these brake control valve devices 5 operates in response of this rapid reduction in brake pipe pressure in the manner described in detail in the hereinbefore-mentioned Patent No. 3,160,446 to completely vent fluid under pressure from the quick action chamber 16 (FIG. 1A), to operate the vent valve device 21 (FIG. 1) to vent fluid under pressure from the brake pipe 1 to atmosphere at a rapid rate, and to cause the high pressure valve device 22 to operate to cause flow of fluid under pressure from the control reservoir 4 to the passageway 11 so that fluid under pressure from both the control reservoir 4 and the auxiliary reservoir 3 is supplied to the brake cylinder device 2 through the service valve device 29 (FIG. 1B) in substantially the same manner as described in Patent No. 3,160,446 for effecting a supply of fluid under pressure from these reservoirs to the brake cylinder device 2. With both the control reservoir 4 and the auxiliary reservoir 3 connected to the brake cylinder device 2 the resulting equalization pressure will be higher than that obtained between the auxiliary reservoir 3 and the brake cylinder device 2 when a service brake application is made. Consequently, a higher braking force is obtained upon effecting an emergency brake application than when a service brake application is made.

The well-known AB control valve devices on those cars in the train so equipped will operate in the usual manner in response to the reduction in the pressure in the brake pipe at emergency rate to effect an emergency brake application on these cars.

DIRECT RELEASE OF THE BRAKES AFTER AN EMERGENCY BRAKE APPLICATION

To effect a direct release of the brakes on all cars in the train subsequent to an emergency application of the brakes on all of the cars, the engineer will move the handle 409 (FIG. 1) of the brake valve device 6 directly and quickly from its emergency position to its running position. When the handle 409 is thus returned to its running position, the brake valve device 6 operates in the manner described in detail in the hereinbefore-mentioned Patent No. 3,208,801 to effect the supply of fluid under pressure from the main reservoir 407 to the train brake pipe that extends from car to car through the train at the hereinbefore-mentioned usual normal rate.

As explained in detail in the hereinbefore-mentioned U.S. Patent No. 3,160,446, when an emergency brake application is made, the fluid under pressure is completely vented from the quick action chamber 16 (FIG. 1A) and the chambers 418 (FIG. 1) and 413. Therefore, when fluid under pressure is subsequently supplied to the train brake pipe at the usual normal rate, it will flow from the brake pipe 1 on those cars in the train that are provided with a brake control valve device 5, regardless of their position in the train, via pipe and passageway 10 (FIG. 1A), brake pipe strainer 26 (FIG. 1) and passageways 42 and 417 to the chamber 418 in the quick service and emergency pilot valve device 20. This normal rate of supply of fluid under pressure to the chamber 418 is enough in excess of the rate at which fluid under pressure can flow from the passageway 417 to the chamber 413 below the diaphragm 414 via the passageway 419 having therein the choke 420, and branch passageway 473b to quickly establish a differential of approximately one and one-half pounds per square inch in the chamber 418 in excess of the pressure in the chamber 413. This differential of pressure is effective to promptly deflect the diaphragm 414 downward to cause unseating of the valve 380 from the seat 389 in the manner hereinbefore-described in detail. When the valve 380 is thus unseated from the valve seat 389, if the fluid under pressure in the control reservoir 4 has not been released to atmosphere by operation of the manually operated brake cylinder release valve device 34 in a manner hereinafter described in detail, the fluid under pressure remaining in the control reservoir 4 at a reduced pressure after an emergency brake application will now flow to the interior of counterbore 388 in the manner hereinbefore described in detail.

Fluid under pressure thus supplied to the interior of counterbore 388 will flow therefrom via the pathway hereinbefore described in detail to the chamber 111 in the inshot valve device 27 to cause the inshot valve 116 to be moved to its upper position in which it is shown in FIG. 1A after which the stem 195 is unlocked in the manner hereinbefore explained, whereupon the self-lapping valve device 152 operates to release fluid under pressure from the chambers 230, 71 and 166, if there by any fluid under pressure therein, to atmosphere.

Fluid under pressure thus supplied to the interior of counterbore 388 from the control reservoir 4 will also flow therefrom concurrently to the brake pipe 1 and chambers 223 and 49 via the pathway hereinbefore described to, respectively, cause the direct release valve mechanism 33 and the service valve device 29 to operate in the manner hereinbefore described.

This operation of the direct release valve mechanism 33 is effective to close communication between the chamber 111 in the inshot valve device 27 and atmosphere in order that the fluid under pressure supplied to the chamber 111 from the interior of the counterbore 388 will not be released to atmosphere and will effect return of the inshot valve 116 to its upper position.

The above-mentioned supply of fluid under pressure from the interior of the counterbore 388 to the chamber 49 causes equalization of pressure on the opposite sides of the diaphragm 53 whereupon the service valve device 29 operates to effect a direct and complete release of fluid under pressure from the brake cylinder device 2 to atmosphere.

Therefore, upon effecting a release of the brakes subsequent to an emergency brake application, the fluid under pressure, if there be any, remaining in the control reservoir 4 is dumped back into the chamber 49 to effect a direct release of the brakes and also into the brake pipe 1 to cause an accelerated recharge of the train brake pipe.

When, upon effecting a release subsequent to an emergency brake application, brake pipe pressure is increased sufficiently on the brake pipe side of the emergency piston of each AB brake control valve device on those cars in the train that are provided with this type of brake control valve device, each emergency piston moves its corresponding emergency slide valve to a position to connect the brake cylinder device and the auxiliary reservoir on the respective car to the brake pipe so that fluid under pressure flows from the brake cylinder and auxiliary reservoir to the brake pipe until these pressures are within about ten pounds per square inch of equalization. This flow of fluid under pressure from the brake cylinder and auxiliary reservoir on each car of the train that is provided with an AB type brake control valve device provides a quick initial build-up of brake pipe pressure. This build-up of brake pipe pressure together with the build-up of brake pipe pressure as a result of the fluid under pressure supplied to the brake pipe from the control reservoir 4 on each car in the train that is provided with a brake control valve device 5 results in a sufficient build-up of pressure in the train brake pipe to cause a quick release of the brakes to run serially through the train from car to car from the locomotive to the last car when effective a release of the brakes subsequent to an emergency brake application.

Subsequent to equalization of control reservoir pressure and brake pipe pressure on those cars provided with a brake control valve device 5 and a direct release of the brakes on all cars in the train, the continued supply of fluid under pressure to the train brake pipe by the engineer's brake valve device 6 (FIG. 1) on the locomotive at the hereinbefore-mentioned usual normal rate will fully recharge the control reservoir 4 on those cars in the train that are provided with a brake control valve device 5 via the pathway hereinbefore described in detail, it being remembered that the inshot valve 116 has been returned to its upper position. Also, the continued supply of fluid under pressure to the train brake pipe will fully recharge the auxiliary reservoir 3 via the auxiliary reservoir charging check valve device 35 (FIG. 1B) in the manner hereinbefore-described in detail.

It will be understood that the chambers 193, 157 and 179 (FIG. 1B) in the self-lapping valve device 152 are fully recharged simultaneously as the control reservoir 4 is fully recharged.

Upon the pressure in the train brake pipe reaching the normally fully charged value, which, as has been hereinbefore stated, may be seventy pounds per square inch, the relay valve device 411 (FIG. 1) of the brake valve device 6 on the locomotive will be effective to automatically maintain this pressure in the train brake pipe against leakage therefrom. Consequently after releasing the brakes and recharging the train brake pipe and reservoirs on each car, the engineer can effect a service or an emergency brake application as desired.

(B) *Combined accelerated direct release and graduated release operation*

Let it be supposed that at some future time, such as ten or fifteen years hence, the brake control valve device 5 shown in FIGS. 1, 1A and 1B of the drawing has superseded or replaced the well-known AB brake control valve device on all freight cars owned by the American railroads. When the brake control valve device 5 has thus completely replaced the well-known AB brake control valve device on all freight cars owned by the American railroads, the owners of these cars can, with comparative ease and with very little expense, convert these brake control valve devices 5 from a direct release type of brake control valve device to a combined accelerated direct release and graduated release type of brake control valve device in the following manner.

First, the direct release valve mechanism 33 (FIG. 1A) is removed from the bolting face 32 of the casing section 31. Next, a blanking plate 430 shown in FIG. 2 is secured to the bolting face 32 of the casing 31 by any suitable means (not shown). Finally, the plug 403 (FIG. 1) is removed from the passageway 402. Furthermore, the manually positionable selector valve device 406 (FIG. 1) of the engineer's brake valve device located on the locomotive will be manually moved in the manner explained in detail in hereinbefore-mentioned Patent No. 2,958,561 from its freight position to that one of its positions referred to in this patent as passenger position to provide for graduated application and release operation of the brake control valve devices 5 on all of the cars in the train when such operation is desired by the engineer. As shown in FIG. 2, the blanking plate 430 closes that end of each of the passageways 224, 225, 233 and 285 that opens at the surface of the bolting face 32 on the lower side of the casing section 31.

With the direct release valve mechanism 33 and plug 403 removed, it will be noted that a complete and direct release of the brakes can be obtained by operation of the quick service and emergency pilot valve device 20 in a manner hereinafter described in detail.

Since the inshot valve 116 is maintained in its lower position by brake cylinder pressure present in the chamber 121, the inshot valve 116 will not be returned to its upper position in which it is shown in FIG. 1A until either the fluid under pressure present in the chamber 121 above the diaphragm 105 has been reduced to, for example, approximately ten pounds per square inch, or the piston valve 391 (FIG. 1) is moved downward in the manner hereinbefore described to unseat the valve 380 from the seat 389 to cause flow of fluid under pressure from the control reservoir 4 (FIG. 1A) to the chamber 111 below the diaphragm 106 of the inshot valve device 27. Consequently, no dump-back of fluid under pressure from the control reservoir 4 to the brake pipe 1 and the chamber 49 (FIG. 1B) of the service valve device 29 can occur until either the brake cylinder pressure in the chamber 121 has been reduced to, for example, ten pounds per square inch or the valve 380 (FIG. 1) is unseated to provide for recharge of the brake pipe from the control reservoir 4 and a complete direct release of the brakes by operation of the service valve device 29 in response to equalization of pressures on opposite sides of the diaphragm 53 (assuming there is no fluid under pressure in the chamber 71) after the pressure in the brake pipe 1 is increased, for example, two or three pounds per square inch, upon initiating a release of the brakes subsequent to a service brake application as was the case prior to removal of the direct release valve mechanism 33. Therefore, removal of the plug 403 and the direct release valve mechanism 33, and the addition of the blanking pad 430 (FIG. 2) in its place effects the change-over of the brake control valve device 5 from a direct release type of a brake control valve device to a combined accelerated direct and graduated release type of brake control valve device which possesses the following advantages.

Freight cars provided with a brake control valve device 5 modified so as to be of the combined accelerated direct and graduated release type would not require a retaining valve device 15 since this graduated release type of brake control valve device is automatically operative in response to a reduction in the brake cylinder pressure in the chamber 78 of the service valve device 29 to maintain the brake cylinder pressure against leakage. Consequently, the present maintenance cost of retaining valve devices would be eliminated.

Furthermore, if all the cars in a train were provided with a combined accelerated direct and graduated release type of brake control valve device, the engineer on the locomotive could effect an accelerated direct release of the brakes when traveling in level terrain and when releasing the brakes subsequent to stopping the train, or he could effect graduated applications and graduated releases of the brakes when the train is traveling through mountainous territory to provide a braking force on the train in accordance with the descending grade.

Moreover, when all the cars in a train are provided with the brake control valve device 5, each car is always provided with the same amount of braking force notwithstanding leakage of fluid under pressure from the control reservoir 4 on one or more of the cars since this leakage is ineffective to cause a partial release of the brakes on those cars having a defective or leaking control reservoir 4.

INITIAL CHARGING

Assume initially that all the passageways and chambers in the brake control valve device 5 are devoid of fluid under pressure; that the various parts of the brake control valve device 5 are in the respective positions in which they are shown in the drawings; that all of the cars in a train are equipped with a brake control valve device 5; that the direct release valve device 33 has been removed from the brake control valve device 5 on each car in the train and replaced by the blanking plate 430, that the plug 403 has been removed from each brake control valve device 5, and that it is desired to initially charge the brake equipment on all of the cars in the train. To initially charge the train, the engineer will move the handle 409 (FIG. 1) of the engineer's brake valve device 6 on the locomotive to its running position, if it is not already in this position, whereupon, in the manner described in detail in Patent No. 3,208,801, fluid under pressure will be supplied at the usual normal rate for effecting the charging of the brake equipment, to the train brake pipe that extends from the locomotive back through the cars in the train. The fluid under pressure that is thus supplied to the train brake pipe will, therefore, be supplied to the brake pipe 1 and such fluid under pressure will flow therefrom into the pipe and passageway 10 in the pipe bracket 7 of the brake control valve device 5 on each car in the train. In each respective brake control valve device 5 on each car in the train, fluid under pressure will flow from the passageway 10 via a pathway hereinbefore traced in detail to the lower side of the valve 38 (FIG. 1B) of the auxiliary reservoir charging check valve device 35 to cause unseating of this valve 38 whereupon the auxiliary reservoir 3 is charged with fluid under pressure from the brake pipe 1 in the manner hereinbefore described. Likewise, the chambers 95 and 85 are charged to the pressure carried in the auxiliary reservoir 3 in the manner hereinbefore described.

Fluid under pressure will also flow to the chamber 49 (FIG. 1B) in the service valve device 29 so that the pressure in this chamber is increased as the pressure in the brake pipe 1 increases until the pressure in the brake pipe 1 is fully charged to its normal value.

Fluid under pressure also flows from the passageway 10 to the chamber 334 (FIG. 1B) above the diaphragm 33 of the manually operated brake cylinder pressure release valve device 34 via brake pipe strainer 26 (FIG. 1) passageways 42, 41 (FIG. 1A), 62 and 335. The strength of spring 339 is such that the diaphragm 333 is not deflected downward to move the valve 296 to its lowermost position until the pressure in the chamber 334 exceeds thirty pounds per square inch.

It will be understood that the inshot valve 116 (FIG. 1A) and interlock valve 150 occupy the position shown in FIG. 1A. Therefore fluid under pressure will be supplied from the brake pipe 1 to the chamber 58 (FIG. 1B) below the diaphragm 53 of the service valve device 29, to the control reservoir 4 (FIG. 1A), to the chambers 157, 179 and 193 in the self-lapping valve device 152, to the chamber 311 and the upper end of the bore 314 in the brake cylinder release valve device 34, and to the chamber 212 below the diaphragm 207 in the locking mechanism 153 in the manner hereinbefore described under initial charging for direct release operation. Consequently, the pressure in the control reservoir 4 and the chamber 58 increases simultaneously as the pressure in the brake pipe 1 and chamber 49 increases so that the service valve device 29 is maintained in its release position since the supply of fluid under pressure from the brake pipe 1 to the chamber 212 effects unlocking of the stem 195 to render the self-lapping valve device 152 operative to vent the chambers 71, 230, and 166 to atmosphere.

Fluid under pressure supplied from the brake pipe 1 to the passageway 225 (FIGS. 1a and 2) cannot flow therefrom since the end of this passageway that opens at the bolting face 32 is closed by the blanking plate 430 (FIG. 2). Likewise, fluid under pressure supplied from the control reservoir 4 to the passageway 224 cannot flow therefrom since the end of this passageway that opens at the bolting face 32 is closed by the blanking plate 430.

The quick action chamber 16 (FIG. 1A) and the various chambers in the quick service and emergency pilot valve device 20 (FIG. 1), vent valve device 21, high pressure valve device 22, spill-over check valve device 23, back-dump check valve device 24, and back-flow check valve device 25 are charged from the brake pipe 1 in substantially the manner explained in hereinbefore-mentioned Patent No. 3,208,801.

After the lapse of a period of time necessary to effect charging of the auxiliary reservoir 3 and the control reservoir 4, and the various chambers in the brake control valve device 5 on all the cars in the train, the pressure of fluid in the brake pipe 1 will be stabilized at a normal value of, such as seventy pounds per square inch, preparatory to operation of the brake control valve devices 5, to effect a brake application of all cars in the train.

During such initial charging, the brake cylinder device 2 on each car will remain vented to atmosphere in the manner hereinbefore described in detail.

GRADUATED SERVICE APPLICATION OF THE BRAKES

The brake valve device 6 (FIG. 1) is so constructed that, upon initial movement of the handle 409 by the engineer out of its running position and to the adjacent end of a service zone, a minimum reduction of seven and three-quarters pounds per square inch will always be effected in the pressure of the fluid under pressure in the train brake pipe, which minimum reduction is sufficient to effect the supply of fluid under pressure to each brake cylinder device 2 (FIG. 1A) on the train until the pressure therein is ten pounds per square inch. Consequently, to effect a graduated service application of the brakes on a train of cars, each of which is provided with a brake control valve device 5 from which the direct release valve mechanism 33 has been removed and replaced by the blanking plate 430 (FIG. 2), and the plug 403 (FIG. 1) removed, the engineer will move the handle 409 (FIG. 1) of the brake valve device 6 from its running position to a selected position in a service zone corresponding to the degree of brake application desired to effect a corresponding reduction in the pressure of the fluid in the train brake pipe at a service rate. Such reduction in brake pipe pressure will occur in the chamber 418 of the quick service and emergency pilot valve device 20 (FIG. 1) of the brake control valve device 5 on each car in the train and cause each quick service and emergency pilot valve device 20 to, as hereinbefore stated, effect the supply of fluid under pressure from the brake pipe 1 to the quick service volume 17 (FIG. 1A) and to the chamber 352 (FIG. 1) instead of to the continual quick service valve device as is the case in Patent No. 3,208,801, to hasten the reduction in brake pipe pressure being effected by the engineer's brake valve device 6 on the locomotive.

A withdrawal or reduction of fluid under pressure locally from the brake pipe 1 to the quick service volume 17 (FIG. 1A) on the first car or on the first several cars in the train effects a sufficient reduction in brake pipe pressure on the immediate adjacent car or cars farther back from the locomotive to cause the respective quick service and emergency pilot valve devices 20 (FIG. 1) and the continual quick service valve devices 19 on these cars to rapidly propagate such quick service reduction in brake pipe pressure serially through the train from car to car from the locomotive to the last car in the train.

By virtue of the value of the spring 114 (FIG. 1A) of the inshot valve device 27 of the brake control valve device 5 on each car, the reduction in brake pipe pressure, resulting from filling of the corresponding quick service volume 17 on each car and the venting of fluid under pressure from the quick service volume 17 to atmosphere through the choke 145 until the inshot valve 116 moves downward in response to an increase in brake cylinder pressure in chamber 121 to, for example, ten pounds per square inch, from the position shown in FIG. 1A to its second position in which communication is closed between passageways 132 and 133 and communication is established between passageways 136 and 133 to vent fluid under pressure from the chamber 212 (FIG. 1B) in locking mechanism 152 to cause locking of stem 195 in the manner hereinbefore explained, will amount to such as seven and three-quarters pounds per square inch. This reduction in brake pipe pressure is effective to hasten the reduction in train brake pipe pressure being effected by the engineer's operation of the brake valve device 6 (FIG. 1) on the locomotive. Consequently, the reduction in pressure thus effected in the train brake pipe is effective in the chamber 49 of the service valve device 29 of the brake control valve device 5 on each car in the train to cause each service valve device 29 to operate in the manner hereinbefore described to supply fluid under pressure from the auxiliary reservoir 3 (FIG. 1A) to the brake cylinder device 2, first at a fast rate and then at a slower rate controlled by the size of the service choke 98.

The fluid under pressure supplied via the passageways 80 and 12 in each brake control valve device 5 and the pipe 12 to the corresponding brake cylinder device 2 by operation of the service valve device 29 also flows from the corresponding passageway 12 through the branch passageway 12a, choke 125, passageway 124, chamber 122 and passageway 123 in inshot valve 116 to the chamber 121 above the diaphragm 105 of the inshot valve device 27 to deflect the diaphragms 105 and 106 downward against the yielding resistance of the spring 114 and therefore move the inshot valve 116 to its lower position upon the pressure in the chamber 121 reaching, for example, approximately ten pounds per square inch.

As hereinbefore described in detail, upon movement of the inshot valve 116 to its lower position, the groove 131 thereon closes communication between passageways 132 and 133 and establishes communication between passageways 133 and 136 to vent fluid under pressure from the chamber 212 (FIG. 1B) in the locking mechanism 153 to cause locking of stem 195. Also, in the lower position of the inshot valve 116 the groove 138 thereon closes communication between passageways 140 and 139 to cut off the control reservoir 4 from the brake pipe 1 to prevent back-flow from the control reservoir 4 to the brake pipe in which the pressure is now being reduced.

The fluid under pressure supplied to each brake cylinder device 2 by operation of the service valve device 29 of the corresponding brake control valve device 5 is effective in the chamber 78 of the service valve device 29 to move this valve device to its lap position in the manner hereinbefore described upon the pressure in the chamber 78 increasing to a value proportional to the reduction in brake pipe pressure effected in chamber 49. Movement of the service valve device 29 to its lap position cuts off the supply of fluid under pressure from the auxiliary reservoir 3 to the corresponding brake cylinder device 2. Consequently, it will be understood that each service valve device 29 supplies fluid under pressure to the corresponding brake cylinder device 2 to build up the pressure therein to a degree corresponding to the degree of brake pipe reduction effected by movement of the handle 409 of brake valve device 6 on the locomotive by the engineer to the selected position in its service zone.

If, while the service valve device 29 is in its lap position, the pressure in the control reservoir 4, the chamber 58 below the diaphragm 53 of the service valve device 29 and the chambers 193 and 157 in the self-lapping valve device 152 is reduced as the result of leakage of fluid under pressure from the control reservoir 4, the self-lapping valve device 152 will operate in the manner hereinbefore described to effect the supply of fluid under pressure from the control reservoir 4 to the chamber 71 below the diaphragm 56 of the service valve device 29 to maintain a constant fluid pressure force on the diaphragm stack comprising the diaphragms 56 and 63 to prevent operation of the service valve device 29 to release fluid under pressure from the brake cylinder device 2. Fluid under pressure flowing to the chamber 71 also flows via the choke 168 to the chamber 166 to cause operation of the self-lapping valve device 152 to lap position to cut off flow of fluid under pressure from the control reservoir 4 to the chamber 71 when the pressure in the chamber 71 has increased sufficiently to maintain a constant fluid pressure force on the diaphragm stack comprising the diaphragms 53 and 56 notwithstanding the reduction in the pressure in the chamber 58 and the control reservoir 4 as the result of leakage from the control reservoir.

After the service valve device 29 has moved to lap position to cut off flow of fluid under pressure from the auxiliary reservoir 3 to the brake cylinder device 2, the engineer may, if he so desires, increase the degree of the brake application in steps by moving the handle 409 (FIG. 1) of the brake valve device 6 on the locomotive farther into its service zone to corresponding selected positions to effect corresponding farther reductions of the pressure in the train brake pipe and consequently in the brake pipe 1 shown in the drawings. Upon each successive reduction of the pressure in the brake pipe 1, the service valve device 29 of the brake control valve device 5 on each car in the train will operate in the manner hereinbefore described in detail to again effect the supply of fluid under pressure from the corresponding auxiliary reservoir 3 to the corresponding brake cylinder device 2 until the pressure in the brake cylinder device 2 is increased to a degree proportional to the total amount of reduction of the pressure effected in the brake pipe 1. It will thus be understood that brakes may be initially applied to effect a minimum brake cylinder pressure of ten pounds per square inch or to effect a brake cylinder pressure in excess of this minimum pressure, and then the engineer, at his discretion, may subsequently increase the degree of the brake application up to a full service brake application by moving the handle 409 (FIG. 1) of the brake valve device 6 farther into its application zone.

It will be understood that after each successive brake pipe reduction and subsequent movement of the service valve device 29 to its lap position, if the pressure in the chamber 58 in the service valve device 29 is reduced as result of leakage of fluid under pressure from the control reservoir 4, the self-lapping valve device 152 will operate in the manner hereinbefore described to supply fluid under pressure to the chamber 71 in the service valve device 29 to maintain a constant fluid pressure force on the diaphragm stack comprising the diaphragms 53 and 56 thereby to prevent operation of the service valve device 29 to effect a release of fluid under pressure from the brake cylinder device 2.

ACCELERATED DIRECT RELEASE OF BRAKES SUBSEQUENT TO A SERVICE BRAKE APPLICATION

To effect an accelerated direct release of brakes subsequent to a service application thereof, the engineer will move the handle 409 (FIG. 1) of the engneer's brake valve device 6 directly and quickly to its running position to cause the supply of fluid under pressure to the train brake pipe at the usual normal rate for effecting the charging of the brake equipment and a direct release of the brakes on the cars in the train. Such fluid under pressure as is thus supplied to the train brake pipe will flow therefrom via brake pipe 1, pipe and passageway 10 (FIG. 1A), brake pipe strainer 26 (FIG. 1), passageway 42, passageway 41 (FIG. 1A) and choke 141, to the passage 140 in each brake control valve device 5.

It will be remembered that the inshot valve 116 now occupies its lower position in which the groove 138 thereon no longer establishes a communication between the passageway 140 and the passageway 139 since the O-ring seal 142 adjacent the upper end of groove 138 forms a seal with the wall surface of the bore 117 at a location below the location at which the passageway 139 opens at the wall surface of this bore 117. Therefore, the control reservoir 4 cannot equalize into the brake pipe 1 and the chamber 49 above the diaphragm 53 of the service valve device 29 via the groove 138 on the inshot valve 116 to cause the service valve device 29 to operate to effect a direct and complete release of the fluid under pressure from the brake cylinder device 2 upon the initial increase in pressure in the brake pipe 1 of two or three pounds per square inch subsequent to a service brake application.

Fluid under pressure supplied from the brake pipe 1 to the passageway 42 (FIG. 1) flows at the hereinbefore-mentioned usual normal rate to the chamber 418 in the quick service and emergency pilot valve device 20. Upon the pressure in the chamber 418 above the diaphragm 414 exceeding the pressure in the chamber 413 below this diaphragm, as the result of the supply of fluid under pressure from the brake pipe 1 to the chamber 418 at the hereinbefore-mentioned usual normal rate for effecting the charging of the brake equipment and a direct release of the brakes by, for example, one and one-half pounds per square inch, which differential is built up, as the result of the restricted flow from the brake pipe 1 to the chamber 413 via the choke 420, in approximately the same time as is required to initially increase the pressure in the brake pipe 1 two or three pounds per square inch subsequent to a service brake application, the quick service and emergency pilot valve device 20 operates in the manner hereinbefore described in detail to unseat valve 380 from valve 389. When valve 380 is thus unseated, fluid under pressure flows in the manner hereinbefore explained from the control reservoir 4 to: (1) the chamber 111 (FIG. 1A) in the inshot valve device 27, (2) the chamber 49 (FIG. 1B) in the service valve device 29, and (3) the brake pipe 1 until equalization of pressure in the control reservoir 4, the chambers 179, 157 and 193 in the self-lapping valve device 152 (FIG. 1B), the chambers 49 and 58 in the service valve device 29 and the chamber 111 in the inshot valve device 27 occurs.

This supply of fluid under pressure from the control reservoir 4 to the chamber 111 in the inshot valve device 27 is effective to cause the inshot valve 116 to be returned to its upper position shown in FIG. 1A in the manner hereinbefore described. Upon the return of the inshot valve 116 to its upper position, fluid under pressure will be supplied from the brake pipe 1 via the pathway hereinbefore described to the chamber 212 (FIG. 1B) in locking mechanism 152 to cause unlocking of the stem 195 in the manner hereinbefore described in detail.

The flow of fluid under pressure from the control reservoir 4 to the brake pipe until equalization occurs reduces the pressure in the chambers 157 and 193 in the self-lapping valve device 152 as stated above. Therefore, when the stem 195 is unlocked, the self-lapping valve device 152 operates in the manner hereinbefore described to release fluid under pressure from the chamber 71 in the service valve device 29, if there be any therein, to atmosphere.

Upon equalization of pressures in the chambers 49 and 58 on the opposite sides of the diaphragm 53, the service valve device 29, which was in lap position at the time the brake release was initiated, operates in the manner hereinbefore described in detail to effect a complete direct release of fluid under pressure from the brake cylinder device 2 (FIG. 1A). Since it has been assumed that all the cars in the train are equipped with the brake control valve device 5, it will therefore be understood that the service valve device 29 of the brake control valve device 5 on each car operates to effect a complete direct release of the brakes on that respective car and also a complete release of fluid under pressure from the corresponding chamber 121 above the diaphragm 105 of the inshot valve device 29, and the brakes on all the cars in the train are released in response to an increase in the pressure in the train brake pipe at the usual normal rate for effecting charging of the brake equipment and a direct release of the brakes, which usual normal rate is sufficient to quickly establish a one and one-half pound per square inch pressure differential of pressure on the opposite sides of the diaphragm 414 (FIG. 1).

Subsequent to an accelerated and complete direct release of a service brake application, the continued supply of fluid under pressure to the brake pipe 1 on each car from the engineer's brake valve device 6 (FIG. 1) on the locomotive will fully charge the control reservoir 4 (FIG. 1A) on each car in the train via the respective pipe and passageway 10, brake pipe strainer 26 (FIG. 1), passageways 42, 41 (FIG. 1A), branch passageway 41a, choke 141, passageway 140, groove 138 on the inshot valve 116 which is now in its upper position, passageways 139 and 137, groove 161 on the interlock valve 150, passageway 160, passageway 299 (FIG. 1B), groove 298 on valve 296 of the brake cylinder release valve device 34, passageways 300, 224 and 13 and the corresponding pipe 13.

The supply of fluid under pressure to the brake pipe 1 is effective to recharge the auxiliary reservoir 3 (FIG. 1A) via the auxiliary reservoir charging check valve device 35 (FIG. 1B) in the manner hereinbefore described in detail.

Upon the pressure in the train brake pipe reaching the normal fully charged pressure, which may be, for example, seventy pounds per square inch, the brake valve device 6 on the locomotive will be effective to automatically maintain this pressure in the train brake pipe against leakage therefrom. Consequently, after releasing the brakes and recharging the train brake pipe, the engineer can effect a service or an emergency brake application as desired.

GRADUATED RELEASE OF BRAKES TO ANY DEGREE

To effect the first step in a graduated release of the brakes to any degree desired and in any number of desired steps on all the cars in the train subsequent to a partial or a full service brake application, the engineer will move the handle 409 (FIG. 1) of the brake valve device 6 from whatever position it occupies in its service zone in the direction of its running position to a selected position in the service zone corresponding to the higher degree of pressure desired in the train brake pipe and therefore to the reduction in pressure to be effected in the brake cylinder devices on all cars in the train.

As the handle 409 of the brake valve device 6 is thus moved from whatever position it occupies in its service zone in the direction of its running position to the selected position in its service zone, the self-lapping control valve device 410 of the brake valve device 6 is operated in the manner fully described in detail in hereinbefore-mentioned Patent No. 3,208,801 to supply fluid under pressure from the main reservoir 407 to a chamber (not shown) of the relay valve device 411 which is operated thereby to effect the supply of fluid under pressure from the main reservoir 407 in a manner described in detail in the hereinbefore-mentioned Patent No. 3,208,801 to the train brake pipe at a rate which is less than the hereinbefore-mentioned normal rate. This supply of fluid under pressure to the train brake pipe at a restricted rate will flow to the brake pipe 1 on each car in the train and thence via pipe and passageway 10 (FIG. 1A), brake pipe strainer 26 (FIG. 1), passageways 42, and 417 to the chamber 418 above the diaphragm 414 of the quick service and emergency pilot valve device 20. This restricted rate of supply of fluid under pressure to the chamber 418 is less than that required to establish a differential of one and one-half pounds per square inch on the diaphragm 414 to effect deflection of this diaphragm against the yielding resistance of the spring 396 to unseat the valve 380 of the back-dump check valve device 24. Consequently, fluid under pressure will flow from the passageway 417 via the passageway 419, choke 420 and branch passageway 373b to the chamber 413 and the diaphragm 414 will not be deflected to effect unseating of the valve 380 to connect the control reservoir 4 to the chamber 49 (FIG. 1B) in the service valve device 29 and to the brake pipe 1. Fluid under pressure that is supplied to the branch passageway 373b in the manner just explained will flow therefrom via the passageway 373 to the quick action chamber 16 (FIG. 1A) to recharge this chamber to the pressure normally carried in the train brake pipe. Furthermore, the fluid under pressure supplied to the passageway 373 will flow therefrom via the branch passageway 373c to the chamber 374 so that the chamber 374 is charged to the same pressure as is carried in the brake pipe. Also, fluid under pressure will flow from the passageway 373 to the chamber 353 below the diaphragm 350 of the continual quick service valve device 19 via chamber 357, bore 356 and passageway 355. Thus the chambers 418, 413, 374 and 353 are all charged to the pressure normally carried in the train brake pipe.

Fluid under pressure supplied to the passageway 42 also flows therefrom via the passageway 41 (FIG. 1A), branch passageway 41a and choke 141 to the passageway 140. It will be remembered that the peripheral annular groove 138 on the inshot valve device 116 is now in a position in which the passageway 140 is cut off from the passageway 139 since the brake cylinder pressure in the chamber 121 is in excess of, for example, ten pounds per square inch.

Since the passageway 140 is thus cut off from the passageway 139, which is connected to the control reservoir 4 via passageway 137, groove 161 on the interlock valve 150 which is now in its upper position, passageway 160, passageway 299 (FIG. 1B), groove 298 on valve 296 of the brake cylinder release valve device 34, passageway 300, passageway 224 and passageway and corresponding pipe 13, fluid under pressure cannot flow from the control reservoir 4 to the brake pipe 1 and to the chamber 49 (FIG. 1B) in the service valve device 29 to cause an equalization of pressures on opposite sides of the diaphragm 53 which equalization, assuming there is no fluid under pressure in the chamber 71, if effected would cause the service valve device 29 to operate to completely release the fluid under pressure from the brake cylinder device 2. When fluid under pressure cannot flow from the control reservoir 4 to the chamber 49 of service valve device 29, the only pressure supplied to the chamber 49 is that from the brake pipe 1 via pipe and passageway 10, strainer device 26 (FIG. 1), passageways 42, 41 (FIG. 1A), and 62. Consequently, fluid under pressure will build up in the chamber 49 as the engineer on the locomotive moves the handle 409 (FIG. 1) of the brake valve device 6 to the selected position in the service zone. Upon the handle 409 of the brake valve device 6 reaching the selected position, the relay valve device 411 operates to cut off flow of fluid under pressure to the train brake pipe and thence to the brake pipe 1 and chamber 49 in the service valve device 29 on each respective car in the train.

It will be remembered that when a brake application was effected, fluid under pressure was supplied to the chamber 78 (FIG. 1B) until the force of this fluid under pressure acting downward on the diaphragm 74 balanced the upward force due to the difference in the pressure in the chambers 58 and 49, acting upward on the diaphragm 53 and the valve stem 51. Therefore, as the pressure in the chamber 49 is increased by the supply of fluid under pressure thereto from the brake pipe 1, this increase in pressure in the chamber 49 will be effective to deflect the diaphragm 53 downward, and thereby move the upper end of the valve stem 51 away from the lower side of the valve 97 which at this time is biased into contact with the annular seat 97 by the spring 102 acting through the piston 93. As the upper end of the valve stem 51 is thus moved downward away from the lower side of the valve 97, the brake cylinder device 2 is vented to atmosphere via pipe and passageway 12, passageway 80, chamber 78, bore 86, passageways 81 and 82 in and groove 79 on stem 51, passageway 83, choke 84, passageway and pipe 14 and retainer valve device 15 which, it may be assumed, is in a non-retaining position or has been removed since it is not necessary after conversion of the brake control valve devices 5 to graduated release-type of control valve devices. Likewise, the chamber 121 (FIG. 1A) is vented to atmosphere via the passageway 123 in the inshot valve 116, chamber 122, passageway 124, choke 125, branch passageway 12a and thence via the passageway abovetraced for the brake cylinder device 2. Fluid under pressure will thus flow from the brake cylinder device 2 and the chambers 121 and 78 to atmosphere until the pressure in the chamber 78 is reduced to such a value that the downward pressure acting on the diaphragm 74 is slightly less than the difference in pressure in the chambers 58 and 49, assuming that there is no pressure in the chamber 71, acting upward on the diaphragm 53 so that this upward differential fluid pressure force is effective to move the stem 51 upward until the upper end thereof again contacts the bottom of the valve 97 to cut off flow of fluid under pressure from the brake cylinder device 2 and the chambers 121 and 78 to atmosphere. It is, therefore, apparent that as the pressure in the chamber 49 of the service valve device 29 of the brake control valve device 5 on each car in the train increases in response to the pressure supplied thereto from the brake valve device 6 (FIG. 1) on the locomotive via the train brake pipe, each service valve device 29 will operate to reduce the pressure in the corresponding brake cylinder device 2 and the chambers 121 and 78 to a degree proportional to the increase in the pressure in the train brake pipe effected by movement of the handle 409 of the brake valve device 6 from the position it occupies in its service zone in the direction of its running position to the selected position in its service zone corresponding to the higher degree of train brake pressure desired.

To effect the second step, and each succeeding step of a graduated release of the brakes, the engineer will move the handle 409 of the brake valve device 6 from the first selected position it occupies in its service zone in the direction of its running position to another selected position in the service zone corresponding to the higher degree of pressure desired in the train brake pipe and therefore the reduced pressure to be obtained in the brake cylinder devices 2 on all cars in the train.

As the handle 409 (FIG. 1) of the brake valve device 6 is thus moved in the direction of its running position to another selected position in the service zone, the pressure in the train brake pipe will be increased in accordance with the amount of arcuate movement of the handle 409 toward its running position whereupon the service valve devices 29 of the brake control valve devices 5 on all the cars in the train operate in the manner explained above to reduce the pressure in the corresponding brake cylinder devices 2 and the chambers 121 and 78 to a degree proportional to the increase in the pressure effected in the train brake pipe.

In view of the above, it will be apparent that the engineer may, by moving the handle 409 of the brake valve device 6 in steps toward its running position, effect in successive steps a reduction of the pressure in the chambers 121 and 78 and in the brake cylinder devices on all cars in the train until the pressure therein is reduced to a low value which pressure in the chamber 121 is still sufficient to maintain the inshot valve 116 in its lower position.

When the engineer desires to effect the final step in the release of the brakes, and therefore a complete release of fluid under pressure from the chambers 121 and 78 and the brake cylinder devices 2 on all the cars in the train, he will move the handle 409 of the brake valve device 6 to its running position to effect operation of the brake valve device 6 in the manner explained in Patent No. 3,208,801 to cause the supply of fluid under pressure to the train brake pipe at the hereinbefore-mentioned usual normal rate for effecting the charging of the brake equipment and a direct release of the brakes by operation of the quick service and emergency pilot valve device 20 on each car in the train in the manner now to be described.

The fluid under pressure that is now supplied through the brake pipe 1 at the usual normal rate for effecting the charging of the brake equipment and a direct release of the brakes flows via the pathway hereinbefore described in detail to the chamber 418 (FIG. 1) in the quick service and emergency pilot valve device 20 of the brake control valve device 5 on each car in the train. Fluid under pressure thus supplied to the chamber 418 at the usual normal rate quickly establishes the one and one-half pound per square inch differential of pressure on the opposite sides of the diaphragm 414 required to deflect this diaphragm to effect the unseating of the valve 380 in the manner hereinbefore described. When the valve 380 is thus unseated, fluid under pressure will now flow from the control reservoir 4 at an unrestricted rate via passageways hereinbefore described in detail to the brake pipe 1 and to the chamber 49 above the diaphragm 53 of the service valve device 29. Therefore, the quick service and emergency pilot valve device 20 on each car in the train operates to cause the corresponding service valve device 29 to effect, as the last step in the release of the brakes, an accelerated direct release of the brakes that rapidly runs through the train from the locomotive to the last car.

Also, when the valve 380 is unseated from the valve seat 389 in response to downward deflection of the diaphragm 414, fluid under pressure flows from the control reservoir 4 to the chamber 111 (FIG. 1A) in the inshot valve device 27 via a pathway hereinbefore described. Fluid under pressure thus supplied to the chamber 111 is effective to move the inshot valve 116 to its upper position in the manner hereinbefore described.

When the inshot valve 116 of the brake control valve device 5 on each car in the train is thus returned to the position shown in FIG. 1A of the drawings, the groove 138 thereon establishes a communication between the passageways 140 and 139 and the groove 135 on this inshot valve establishes a communication between the passageways 137 and 136. Consequently, fluid under pressure will now flow from the brake pipe 1 to the chamber 212 (FIG. 1B) below the diaphragm 207 of the locking mechanism 153 via the pathway hereinbefore described to effect unlocking of the stem 195, and to the control reservoir 4 via the pathway also hereinbefore described to effect the final charging of the control reservoir and the chambers 157, 179 and 193 in the self-lapping valve device 152 up to the normal pressure carried in the train brake pipe.

When the stem 195 is thus unlocked and the pressure in the chambers 157 and 193 increased to the normal pressure carried in the train brake pipe, the self-lapping valve device 152 operates in response to the increase in pressure in these chambers to release fluid under pressure, if there be any therein, from the chamber 71 in the service valve device 29 so that upon equalization of pressures on the opposite sides of the diaphragm 53 by flow of fluid under pressure from the control reservoir 4 to the brake pipe 1, the service valve device 29 operates to effect a complete release of the brakes.

After the brakes on all the cars have been released, fluid under pressure will flow from the brake valve device 6 (FIG. 1) on the locomotive, the handle 409 of which is now in running position, to the train pipe at the usual normal rate and thence to the auxiliary reservoir 3 and control reservoir 4 via passageways hereinbefore described in detail to fully charge these reservoirs to the normal full charge value of train brake pipe pressure which, as has been hereinbefore stated, may be, for example, seventy pounds per square inch.

From the foregoing, it is apparent that the engineer, by manipulating the handle 409 (FIG. 1) of brake valve device 6 on the locomotive, can, by a series of successive steps, partly and then finally fully restore the pressure in the train brake pipe to correspondingly effect in steps a partial graduated and then finally a complete direct release of the brakes on the train.

It will be understood that, subsequent to effecting a full service brake application, if the engineer desires to effect an accelerated direct release of the brakes on the train rather than a graduated release of the brakes in steps as just explained, he may do so by moving the handle 409 of the brake valve device 6 directly from its full service position to its running position without stopping in the service zone. When the handle 409 of the brake valve device 6 reaches its running position, the brake valve device 6 operates in the manner explained in hereinbefore-mentioned patent No. 3,208,801 to cause flow of fluid under pressure to the train brake pipe at the hereinbefore-mentioned normal rate for effecting charging of the brake equipment and a complete direct release of the brakes. This rate of supply of fluid under pressure to the brake pipe 1 and thence to the chamber 418 in the quick service and emergency pilot valve device 20 of the brake control valve device 5 on each car in the train will cause operation of the quick service and emergency pilot valve device 20 of the brake control valve device 5 on all of the cars to effect, in the manner hereinbefore described in detail, a direct accelerated release of the brakes on the train.

It should be understood that, subsequent to a service brake application that is less than a full service application, this brake application may be released in the same manner as described above for effecting a release of a full service application.

From the above, it is apparent that the engineer, at his discretion and in accordance with the terrain through which the train is traveling, may, by a proper manipulation of the handle 409 of the brake valve device 6 on the locomotive, effect either a graduated release of the train brakes in a series of several successive steps followed by an accelerated direct release as the final step in the series or directly and immediately an accelerated direct brake release.

EMERGENCY APPLICATION OF THE BRAKES

To effect an emergency application of the brakes, the handle 406 (FIG. 1) of the brake valve device 6 on the locomotive will be moved to its emergency position to cause a rapid reduction at an emergency rate in the pressure in the train brake pipe extending from the locomotive back through the several cars in the train. The brake control valve devices 5 on all the cars in the train will operate in response to a reduction in brake pipe pressure at an emergency rate, subsequent to removal therefrom of the direct release valve mechanism (FIG. 1A) and the plug 403 (FIG. 1), in the same manner as prior to removal of this valve mechanism to cause an emergency application on each respective car in the train. Consequently, a detailed description of the operation of the brake control valve devices 5 need not be repeated.

RELEASE OF THE BRAKES AFTER AN EMERGENCY BRAKE APPLICATION

To effect a release of the brakes, subsequent to effecting an emergency application, the engineer will move the handle 409 of the brake valve device 6 on the locomotive from its emergency position to its running position to effect the supply of fluid under pressure to the train brake pipe at the usual normal rate for effecting the charging of the brake equipment and an accelerated direct release of the brakes on all the cars in the train. The fluid under pressure thus supplied to the train brake pipe will flow from the brake pipe 1 on each car to the chamber 418 in the quick service and emergency pilot valve device 20 of the brake control valve device 5 on each car to cause each quick service and emergency pilot valve device 20 to operate in the manner hereinbefore described in detail to effect the supply of fluid under pressure from the corresponding control reservoir 4 to the train brake pipe, to the chamber 111 of the corresponding inshot valve device 27 (FIG. 1A) and to the chamber 49 of the corresponding service valve device 29. The inshot valve 116 is thus returned to its upper position by the fluid under pressure supplied to the chamber 111 whereupon fluid under pressure flows from the brake pipe 1 to the chamber 212 to effect unlocking of the stem 195. The self-lapping valve device 152, upon unlocking of stem 195, operates to release fluid under pressure from the chamber 71, if there be any therein, to atmosphere. As pressure is released from the chamber 71, and the pressures on the opposite sides of the diaphragm 53 are equalized by flow from the control reservoir 4 to the brake pipe 1, the service valve device 29 operates to effect a complete release of fluid under pressure from the corresponding brake cylinder device 2 and therefore an accelerated direct release of the bakes on the train.

MANUAL OPERATION OF THE MANUALLY OPERATED BRAKE CYLINDER RELEASE VALVE DEVICE

It will be remembered, as hereinbefore stated, that fluid under pressure supplied to the brake pipe 1 flows to the chamber 334 (FIG. 1B) in the manually operated brake cylinder release valve device 34, and when brake pipe pressure is in excess of thirty pounds per square inch, the diaphragm 333 is deflected downward against the yielding resistance of the spring 339 until the valve 296 is moved to its lowermost position in which groove 298 thereon closes communication between the passageways 300 and 301. Therefore, as long as the pressure in the chamber 334 exceeds thirty pounds per square inch, movement of valve 302 in an upward direction by a trainman or a malicious person exerting a pull on a pull rod connected to the release valve stem 328 to move the groove 304 on the valve 302 to a position to establish a communication between the passageways 301 and 331 is ineffective to supply fluid under pressure to the chamber 332 below the diaphragm 333 which fluid under pressure, if supplied to the chamber 332, would effect an equalization of pressure on opposite sides of this diaphragm to render spring 339 effective to move diaphragm 333 and valve 296 upward to the position shown in FIG. 1A so that fluid under pressure would be vented from: (1) chamber 58 below diaphragm 53 of service valve device 29 to atmosphere via branch 160a, passageways 160 and 299, groove 298, passageway 301, groove 304, passageway 331, branch 331a, groove 297, choke 341, and passageway and port 342, (2) the chambers 157 and 193 in the self-lapping valve device 152 since one end of the passageway 160 opens into the chamber 157 and the chamber 193 is connected to the passageway 160 by the passageway 194, and (3) the control reservoir 4 which is connected to the passageway 301 via pipe and passageway 13, passageways 224 and 300, and groove 298. This venting of fluid under pressure from the chambers 157 and 193 would cause the self-lapping valve device 152 to operate to release fluid under pressure from the chamber 71, if there be any therein. Consequently, this venting of fluid under pressure from the chamber 71 and the venting of fluid under pressure from the chamber 58 in the manner described above would cause the service valve device 29 to effect an undesired direct and complete release of the brakes on the car.

When a railway freight car is detached from a train for humping operations, the brake pipe and therefore the chamber 334 in the barke cylinder release valve device 34 will be at atmospheric pressure and the valve 296 will occupy the position shown in FIG. 1B in which the groove 298 thereon establishes a communication between the passageways 300 and 301.

Furthermore, complete venting of the brake pipe to atmosphere, at the time the car is detached from the train, causes an emergency aplication of the brakes on the detached car and a reduction of pressure in the chamber 49 above the diaphragm 53 of the service valve device 29 to atmospheric pressure whereas the chamber 58 below diaphragm 53 remains charged with fluid under pressure from the control reservoir 4 via pipe and passageway 13, passageways 224 and 300, groove 298, passageways 299 and 160, and branch 160a. Therefore, to effect a complete direct release of the emergency brake application on the detached car, it will be necessary to effect equalization of pressures on opposite sides of the diaphragm 53 of the service valve device 29. A trainman may effect a complete direct release of the emergency application of the brakes on the detached car by exerting a pull on a pull rod secured to the release valve stem 328 so as to effect tilting of this stem about the periphery of its flange 327 so that the central boss 326 is effective to move the valve 302 upward only far enough for the upper end of this valve to unseat valve 310 from its seat 309 and for the groove 304 on the valve 302 to establish a communication between passageways 301 and 331 without a stem 431 extending through a bore in the valve seat member 313 and resting on the valve 310 effecting unseating of the valve 318 from its seat 320.

When the valve 310 is unseated from its seat 309, fluid under pressure from the chamber 311 and the control reservoir 4 connected thereto via pipe and passageway 13, and passageways 224, 300 and 315 flows to the chamber 212 via bore 293, passageway 308 and passageway 214 to cause unlocking of the stem 195 in the manner hereinbefore described to render the self-lapping valve device 152 operative to release fluid under pressure from the chamber 71 in the service valve device 29 if there be any fluid under pressure in this chamber.

When the groove 304 on the valve 302 establishes a communication between the passageways 301 and 331, fluid under pressure will flow from the control reservoir 4 to the chamber 332 via pipe and passageway 13, passageways 224 and 300, groove 298, passageway 301, groove 304, and passageway 331. Since the chamber 334 is now at atmospheric pressure, the fluid under pressure thus supplied to the chamber 332 will deflect the diaphragm 333 upward to move the valve 296 to its uppermost position in which the lower O-ring 343 thereon is above the location at which the end of the passageway 299 opens at the wall surface of the bore 292. With this lower O-ring 343 thus disposed above the location at which the end of the passageway 299 opens at the wall surface of the bore 292, the chamber 58 below the diaphragm 53 of the service valve device 29 will be connected to the chamber 49 above this diaphragm via branch 160a, passageways 160 and 299, bore 292, branch passageway 335a, passageway 335 and passageway 62.

As the chambers 193 and 157 in the self-lapping valve device 152 are connected to the chamber 58 via a pathway hereinbefore described in detail, the pressures in the chambers 193, 157, 58 and 49 will flow to atmosphere since while a car is being humped, the angle cocks at each end of the brake pipe on the detached car are open. This reduction in pressure on the opposite sides of the diaphragm 53 to atmospheric pressure causes the service valve device 29 to effect a direct and complete release of the brakes on the detached car.

Also, when the valve 296 is moved to its uppermost position, the O-ring 343 intermediate the grooves 297 and 298 is disposed above the opening of the branch passageway 331a at the wall surface of the bore 292 and below the choke 341 whereby the groove 298 on the valve 296 establishes a communication between the passageway 300 and the branch passageway 331a so that fluid under pressure is supplied from the control reservoir 4 to the chamber 332 to maintain the valve 296 in its uppermost position. The O-ring 343 above the upper end of groove 297 prevents flow of fluid under pressure from the chamber 332 along the periphery of valve 296 to the groove 297 thereon and thence to atmosphere via choke 341 and passageway and port 342. From the above it is apparent that the trainman only has to exert a momentary pull on one of the pull rods connected to the release valve stem 328 to effect movement of the valve 296 to its uppermost position in which fluid under pressure from the control reservoir 4 is supplied to the chamber 332 whereby this valve 296 is maintained in its uppermost position in which the chamber 58 below the diaphragm 53 of the service valve device 29 is connected to the chamber 49 above this diaphragm to cause the service valve device 29 to effect a direct and complete release of the brakes on the car as a result of equilizing the pressures on opposite sides of this diaphragm.

It will be noted that fluid under pressure may be partly or completely released from the control reservoir 4 at any time irrespective of the pressure in the chamber 334 by exerting a pull on one of the pull rods connected to the release valve stem 328 to tilt the flange 327 upward far enough to cause the valve 302 to move upward far enough to first unseat the valve 310 from the seat 309 and thereafter via the stem 431 effect unseating of valve 318 against the yielding resistance of the spring 319 from its seat 320 so that fluid under pressure from the control reservoir 4, which is present in the upper end of the counterbore 314, can flow past the valve seat 320 and thence to atmosphere via the counterbore 321 and passageway and port 322 until the pressure in the control reservoir 4 is reduced to any desired value, or completely vented to atmosphere if so desired by the trainman.

In view of the above, it is apparent that the manually operated brake cylinder release valve device 34 is always manually operable to vent fluid under pressure from the control reservoir 4 to atmosphere if desired. Furthermore, this valve device 34 is also manually operative, as when humping a car in a railway yard at which time no fluid under pressure is present in the chamber 334, to: (1) effect equalization of pressures in the chambers 49 and 53 of the service valve device 29 to cause the operation thereof to effect a complete and direct release of the brakes on the detached car without releasing to atmosphere the fluid under pressure remaining in the control reservoir 4 subsequent to effecting an emergency application of the brakes, and (2) effect supply of fluid under pressure from the control reservoir 4 to the chamber 212 in the locking mechanism 153 to cause unlocking of the stem 195 to render the self-lapping valve revice 152 operative to release fluid under pressure from the chamber 71, if there by any therein, to atmosphere thereby enabling the service valve device 29 to effect a complete and direct release of the brakes on the car upon equalization of pressures on the opposite sides of the diaphragm 53 of this service valve device.

Having now described the invention, what I claim as new and desire to secure by Letters Patent is:

1. In a fluid pressure brake control system for railway trains, in combination:
   (a) a brake pipe in which the fluid pressure therein is increased to a normally charged selected pressure for causing a release of brakes and decreased therefrom for causing an application of brakes,
   (b) a brake valve device for controlling variations of the pressure in said brake pipe,
   (c) a reservoir charged to the selected pressure normally carried in said brake pipe, and
   (d) a brake control valve device comprising:
      (i) a service valve mechanism having a first abutment subject on its opposite sides respectively to the pressure in said reservoir and said brake pipe, said valve mechanism being operative by said abutment in response to a reduction in the pressure in said brake pipe relative to the pressure in said reservoir to effect a graduated application of brakes varying in degree according to the degree of said reduction, and responsive to the degree of charging of said brake pipe to effect a corresponding graduated release of brakes, and
      (ii) means operatively responsive to a reduction of the pressure in said reservoir as the result of leakage therefrom while a brake application is in effect to prevent operation of said service valve mechanism to reduce the degree of the brake application.

2. A fluid pressure brake control system for railway trains, as claimed in claim 1, further characterized in that said service valve mechanism further comprises a second abutment having the same effective area as said first abutment and arranged coaxial therewith, and in that said means comprises a self-lapping valve means operative in response to a reduction of the pressure in said reservoir as the result of leakage therefrom to effect the supply of fluid under pressure from said reservoir to one side of said second abutment to cause a fluid pressure force to be exerted thereon in the same direction as the reservoir pressure acts on said one abutment thereby resulting in a constant fluid pressure force being maintained on said diaphragms notwithstanding a reduction in pressure in said reservoir so as to prevent operation of said service valve mechanism to reduce the degree of brake application in effect.

3. A fluid pressure brake control system for railway trains, as claimed in claim 2, further characterized in that said self-lapping valve means has two coaxially arranged movable abutments having a control spring disposed therebetween, each of said two abutments on the side opposite said spring being subject to the pressure in said reservoir, and in that said self-lapping valve means includes a fluid pressure responsive locking means operative upon a reduction of pressure in said brake pipe to lock one of said two abutments against movement notwithstanding a reduction of the pressure in said reservoir as a result of leakage therefrom whereby said self-lapping valve means is operative in accordance with the degree of reduction of pressure in said reservoir active on the other of said two abutments to supply fluid under pressure from said reservoir to the said one side of said second abutment of said service valve mechanism to prevent the operation thereof to reduce the degree of the brake application.

4. A fluid pressure brake control system for railway trains, as claimed in claim 3, further characterized in that said locking means comprises:
   (a) a clutch having a stationary member and a movable member provided with a non-self-locking type of internal screw thread,
   (b) a stem operatively connected at one end to said one abutment of said self-lapping valve means and having adjacent its opposite end a non-self-locking type of external screw thread that has screw-threaded engagement with the internal screw thread of the movable member of said clutch,
   (c) a brake-pipe-pressure operated movable abutment means for effecting movement of said movable member out of clutching contact with said stationary member, and
   (d) biasing means operative while said movable member is out of clutching contact with said stationary member and in response to a reduction in the brake pipe pressure on said movable abutment means to effect rotation of said movable member with respect to said stem and thereby longitudinal movement therealong until said movable member is moved into clutching contact with said stationary member, such clutching contact locking said stem and said one abutment of the self-lapping valve means against movement in response to a reduction in pressure in said reservoir as a result of leakage therefrom.

5. In a fluid pressure brake control system for railway trains, in combination:
   (a) a brake pipe in which fluid pressure is increased to a normally charged selected pressure for causing a release of brakes and decreased for causing an application of brakes,
   (b) a brake valve device for controlling a reduction in the pressure in said brake pipe and for controlling the charging of said brake pipe and including means for effecting the charging of said brake pipe at two different rates,
   (c) a reservoir charged to the selected pressure momentarily carried in said brake pipe, and
   (d) a brake control valve device comprising:
      (i) a service valve mechanism responsive to reducin the pressure in said brake pipe relative to the pressure in said reservoir to effect graduated aplication of brakes according to the degree of said reduction and responsive to the degree of charging of said brake pipe at the lesser of said two rates to effect a corresponding graduated release of brakes,
      (ii) fluid pressure means operatively responsive to a reduction in the pressure in said reservoir as the result of leakage therefrom while a brake application is in effect to prevent operation of said service valve mechanism to reduce the degree of the brake application,
      (iii) fluid pressure responsive locking means operative upon a reduction in the pressure in said brake pipe to render said fluid pressure means operative in accordance with the fully charged pressure in said reservoir notwithstanding a subsequent reduction in pressure therein,
      (iv) a direct release valve mechanism operatively responsive to the charging of said brake pipe at any rate to cause said service valve mechanism to effect a direct release of the brakes, and (v) means operatively responsive to the charging of said brake pipe at only the greater of said two rates, when said direct release valve mechanism is rendered non-effective, to cause said service valve mechanism to operate to effect an accelerated direct release of the brakes.

6. A fluid pressure brake control system for railway trains, as claimed in claim 5, further characterized in that said service valve mechanism comprises an abutment stack including two coaxially arranged spaced-apart abutments of equal effective area, the opposite sides of one of said abutments being subject opposingly respectively to the pressure in said brake pipe and to the pressure in said reservoir, and in that said fluid pressure means is operative in response to a reduction in the pressure in said reservoir to supply fluid under pressure from said reservoir to one side of the other of said abutments to cause a fluid pressure force to be exerted thereon in the same direction as the reservoir pressure acts on said one abutment thereby resulting in a constant fluid pressure force being maintained on said diaphragm stack notwithstanding a reduction in pressure in said reservoir so as to prevent operation of said service valve mechanism to reduce the degree of the brake application in effect.

7. A fluid pressure brake control system for railway trains, as claimed in claim 1, further characterized in that said brake control valve device further comprises a direct release valve mechanism that includes:
 (a) a casing having two passageways therein,
 (b) valve means operable to an open position to establish a communication between the two passageways in said casing,
 (c) a biasing means for biasing said valve means to a closed position to close communication between the two passageways in said casing,
 (d) a plunger element provided with a non-self-locking type of internal screw thread and movable in one direction to move said valve means against the yielding resistance of said biasing means to its open position and movable in the opposite direction to render said biasing means effective to move said valve means to its closed position,
 (e) two stops carried by said casing, each operative to limit movement of said plunger element in a respective one of said two directions,
 (f) a movable abutment stack including two coaxially arranged spaced-apart abutments of equal effective area, the opposite sides of one of said abutments being subject opposingly respectively to the pressure in said brake pipe and to the pressure in said reservoir, and one side of the other of said abutments being subject to fluid under pressure supplied by operation of said fluid pressure means in response to a reduction in the pressure in said reservoir and effective on the corresponding side of said one abutment whereby a constant fluid pressure force is maintained on said diaphragm stack notwithstanding a reduction in pressure in said reservoir, and
 (g) a clutch mechanism carried by said movable abutment stack and connecting said stack to said plunger element, said clutch mechanism comprising:
  (i) a first cone clutch member connected to said plunger element by means provided with a non-self-locking type of external screw thread that has screw-threaded engagement with the non-self-locking type of internal screwthread of said plunger element whereby said first cone clutch member is movable respectively in one direction or in an opposite direction subsequent to movement of said plunger element into abutting contact with one or the other of said two stops, said first cone clutch member being provided with an external clutch face and supported by said abutment stack for rotation with respect thereto,
  (ii) means carried by said abutment stack for effecting rotation of said first cone clutch member to cause longitudinal movement thereof in one direction with respect to said plunger element subsequent to movement of said element in one direction into abutting contact with one of said stops,
  (iii) a second cone clutch element integral with said abutment stack and provided with an internal clutch face,
  (iv) a double cone clutch element carried by said abutment stack and movable with respect thereto, said double cone clutch element being provided with an external clutch face for clutching contact with said internal clutch face provided on said second cone clutch element and with an internal clutch face for clutching contact with said external clutch face on said first cone clutch member, and
  (v) biasing means interposed between said abutment stack and said double cone clutch element for biasing said double cone clutch element in the direction to effect clutching contact between the external clutch face thereon and the internal clutch face provided on said second cone clutch element,
  (vi) said biasing means being effective subsequent to movement of said plunger element in the other of said two directions into abutting contact with the other of said stops, and while said external clutch face on said double cone clutch element is out of clutching contact with said internal clutch face provided on said second cone clutch element, to effect rotation and downward movement of said double cone clutch element and said first cone clutch element with respect to said stationary plunger element until said external clutch face on said double cone clutch element is moved into clutching contact with said internal clutch face provided on said second cone clutch element.

8. A fluid pressure brake control system for railway trains, as claimed in claim 5, further characterized in that said brake control valve device further includes a fluid pressure operated interlock valve device for controlling the supply of fluid under pressure from said brake pipe to said reservoir and vice versa and a fluid pressure operated inshot valve arranged on the brake pipe side of and in series relation with said interlock valve, and in that said brake control valve device also includes two coaxial spaced-apart movable abutments of unequal effective area operatively connected to said inshot valve, the smaller of said abutments being operable by fluid under pressure supplied by said service valve device for effecting an application of brakes to move said inshot valve from a first position in which it establishes a first communication between said brake pipe and said reservoir via said interlock valve through which communication said reservoir is charged, a second communication between said brake pipe and said fluid pressure responsive locking means, and a third communication through which fluid under pressure is supplied to said fluid pressure operated interlock valve to cause the operation thereof to cut off the supply of fluid under pressure from said brake pipe to said reservoir, to a second position in which said first, second and third communications are closed and a fourth communication is established through which fluid under pressure is vented from said locking means to atmosphere, and the larger of said abutments being operable by fluid under pressure supplied thereto from said reservoir either by operation of said direct release valve mechanism or by operation of said means operative responsive to the charging of said brake pipe at only the greater of said two rates to move said inshot valve from said second position to said first position to effect the resupply of fluid under pressure from said brake pipe to said fluid pressure responsive locking means prior to the release of a brake application by operation of said service valve mechanism responsive to the charging of said brake pipe whereby said locking means operates to render said fluid pressure means operative to cause said service valve mechanism to operate in response to an increase in the pressure in said brake pipe to effect a release of the brakes.

9. A fluid pressure brake control system for railway trains, as claimed in claim 5, further characterized in that said fluid pressure responsive locking means comprises:
  (a) a stationary clutch element,
  (b) a movable clutch element movable into and out of clutching contact with said stationary clutch element and having formed therein an internal non-self locking type of screw thread,
  (c) a movable abutment actuated by fluid under pressure supplied thereto from said brake pipe,
  (d) a first thrust-type bearing element interposed between said movable abutment and said movable clutch element,
  (e) a link member operably connected at one end to said fluid pressure means and having formed thereon adjacent its opposite end an external non-self-locking type of screw thread that has screw-threaded engagement with said internal non-self-locking type of screw thread formed in said movable clutch element,
  (f) a second thrust-type bearing element supported by said movable clutch element, and
  (g) biasing means rendered effective upon the release of fluid under pressure from said movable abutment to transmit a force to said movable clutch element via said second thrust-type bearing element to cause rotation of said movable clutch element about said link member and simultaneously longitudinal movement therealong until said movable clutch element is moved into clutching contact with said stationary clutch element to thereby lock said link member against movement, the locking of said link member rendering said fluid pressure means operative in accordance with the fully charged pressure carried in said reservoir upon the operation thereof notwithstanding a subsequent reduction of the pressure in said reservoir.

10. A fluid pressure brake control system for railway trains, as claimed in claim 5, further characterized in that said fluid pressure means comprises a self-lapping valve device including,
  (i) two movable abutments, and
  (ii) a control spring interposed between said two movable abutments each of which is subject on the side thereof opposite said spring to the pressure in said reservoir,
and in that said fluid pressure responsive locking means is operative to lock one of said abutments in response to a chosen reduction in pressure in said brake pipe against movement notwithstanding a subsequent reduction in the pressure in said reservoir.

11. A fluid pressure brake control system for railway trains, as claimed in claim 1, further characterized in that said brake control valve device is provided with a quick action chamber and a continual quick service valve device, said continual quick service valve device comprising:
  (a) a first valve mechanism for releasing fluid under pressure from said quick action chamber to atmosphere,
  (b) a movable abutment the opposite sides of which have different effective areas, the side having the lesser effective area being subject to the pressure in said quick action chamber, said abutment being operatively connected to said first valve mechanism,
  (c) a second valve mechanism operatively connected to said abutment for controlling the supply of fluid under pressure from said quick action chamber to the side of said abutment having the lesser effective area and the release of fluid under pressure from said side to atmosphere,
  (d) said movable abutment being operative by fluid under pressure supplied to the side thereof having the greater effective area to cause, respectively, operation of said second valve mechanism to release fluid under pressure from said side of said abutment having the lesser effective area to atmosphere, and operation of said first valve mechanism to release fluid under pressure from said quick action chamber to atmosphere, the release of fluid under pressure from said side of said abutment having the lesser effective area causing snap action of said first valve mechanism by said abutment.

12. A fluid pressure brake control system for railway trains, as claimed in claim 10, further characterized in that said brake control valve device further comprises:
  (a) a quick service volume having a communication with the side of said abutment of said continual quick service valve device having the greater effective area,
  (b) valve means for supplying fluid under pressure from said brake pipe to said communication to cause operation of said continual quick service valve device, and
  (c) a movable abutment subject on its respective opposite sides to the respective pressures in said brake pipe and in said quick action chamber,
  (d) said movable abutment being operatively connected to both said valve means and said means responsive to the charging of said brake pipe at only the greater of said two rates to cause said service valve device to operate to effect an accelerated direct release of the brake, said abutment being responsive to a reduction in brake pipe pressure to effect operation of said valve means and responsive to an increase in brake pipe pressure to effect operation of said means.

13. A fluid pressure brake control system for railway trains, as claimed in claim 8, further characterized in that said inshot valve device also controls the supply of fluid under pressure from said brake pipe to said fluid pressure responsive locking means and the release of fluid under pressure from said locking means to atmosphere.

14. A fluid pressure brake control system for railway trains, as claimed in claim 8, further characterized in that said brake control valve device further includes a manually operable valve device comprising:
  (a) a first valve means having three positions and interposed between said inshot valve device and said fluid pressure responsive locking means for in one position establishing a first communication from the former to the latter and manually movable to a second position to close said first communication and establish a second communication,
  (b) a second valve means for controlling a third communication between said reservoir and said fluid pressure responsive locking means, said second valve being movable to a position to open said third communication upon movement of said first valve from its said first to either its said second or its said third position, and
  (c) a third valve means for controlling a fourth communication between said reservoir and atmosphere, said third valve means being movable to a position to open said fourth communication upon movement of said first valve means to only the third one of its three positions.

15. A fluid pressure brake control system for railway trains, as claimed in claim 14, further characterized in that said manually operable valve device comprises:

(a) a movable abutment subject on one side to the pressure in said brake pipe and on the opposite side to the pressure in said second communication, (b) two springs, disposed respectively on the opposite sides of said movable abutment, for, in the absence of pressure in said brake pipe and in said second communication, biasing said abutment to a normal position, (c) valve means operably connected to said movable abutment for, in the normal position thereof, establishing a restricted communication between the opposite side of said abutment and atmosphere and an unrestricted communication between said reservoir and said second communication through which fluid under pressure from said reservoir flows to said opposite side of said abutment only subsequent to movement of said first valve to its said second position to cause said abutment, in the absence of pressure in said brake pipe, to move said valve means from its normal position to a second position to close said restricted communication between the opposite side of said abutment and atmosphere and to establish a self-maintaining communication between said reservoir and said opposite side of said abutment independently of said first valve means and second communication, and also to establish a fifth communication for effecting equalization of the opposing pressures controlling operation of said service valve device whereby said service valve device operates to effect a complete release of the brakes.

16. A fluid pressure brake control system for railway trains, as claimed in claim 15, further chracterized in that in the normal position of said valve means, fluid under pressure flows from said reservoir to said opposite side of said abutment upon movement of said first valve means to either its said second or said third position.

17. A fluid pressure brake control system for railway trains, as claimed in claim 13, further characterized by a single choke means through which the release of fluid under pressure from both said interlock valve device and said fluid pressure responsive locking means to atmosphere is effected.

18. A fluid pressure brake control system for railway trains, as claimed in claim 12, further characterized by a single choke means through which the release of fluid under pressure from both said quick service volume and said fluid pressure responsive locking means to atmosphere is effected.

19. A fluid pressure brake control system for railway trains, as claimed in claim 8, further characterized in that said brake control valve device is provided with a communication for releasing fluid under pressure from the larger of said abutments to atmosphere and with means for selectively closing or opening said communication accordingly as said direct release valve mechanism is respectively operative or inoperative.

References Cited

UNITED STATES PATENTS 33,208,801   9/1965   McClure _____ 303—36

DUANE A. REGER, *Primary Examiner.*